United States Patent
Zhang et al.

(10) Patent No.: US 10,285,069 B2
(45) Date of Patent: May 7, 2019

(54) TECHNIQUES FOR TRANSMITTING PATTERNS OF SIGNAL TRANSMISSIONS OR REFERENCE SIGNALS OVER AN UNLICENSED RADIO FREQUENCY SPECTRUM BAND

(71) Applicant: QUALCOMM Incorporated, San Diego, CA (US)

(72) Inventors: Xiaoxia Zhang, San Diego, CA (US); Tao Luo, San Diego, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/837,216

(22) Filed: Dec. 11, 2017

(65) Prior Publication Data
US 2018/0109958 A1  Apr. 19, 2018

Related U.S. Application Data

(63) Continuation of application No. 14/676,098, filed on Apr. 1, 2015, now Pat. No. 9,867,054.
(Continued)

(51) Int. Cl.
*H04W 4/00* (2018.01)
*H04W 16/14* (2009.01)
(Continued)

(52) U.S. Cl.
CPC .......... *H04W 16/14* (2013.01); *H04L 5/0048* (2013.01); *H04L 5/0094* (2013.01);
(Continued)

(58) Field of Classification Search
CPC ............... H04W 16/14; H04W 72/005; H04W 72/1263; H04W 74/04; H04L 5/0048; H04L 5/0049
See application file for complete search history.

(56) References Cited

U.S. PATENT DOCUMENTS 7,486,637 B2 * 2/2009 Goldberg .............. H04W 68/00
 370/329
8,804,677 B2  8/2014 Corson et al.
(Continued)

FOREIGN PATENT DOCUMENTS

| CN | 102377509 A | 3/2012 |
| WO | WO-2007082035 A2 | 7/2007 |
| WO | WO-2013071506 A1 | 5/2013 |

OTHER PUBLICATIONS

ISA/EP, International Search Report and Written Opinion of the International Searching Authority, Int'l Application No. PCT/US2015/024066, dated Sep. 16, 2015, European Patent Office, Rijswijk, NL, 27 pgs.
(Continued)

*Primary Examiner* — Maharishi V Khirodhar
(74) *Attorney, Agent, or Firm* — Dalei Dong; Holland & Hart

(57) ABSTRACT

Techniques are described for wireless communication. A first method may include determining a pattern of signal transmissions for transmitting instances of a signal in a time period of an unlicensed radio frequency spectrum band; determining whether the unlicensed radio frequency spectrum band is unavailable to transmit at least one instance of the signal; and changing, in response to determining the unlicensed radio frequency spectrum band is unavailable to transmit an instance of the signal, the pattern of signal transmissions for the time period. A second method may include identifying at least one reference signal pattern from a plurality of reference signal patterns based at least in part on whether a plurality of transmission time intervals are bundled; and signaling the identified at least one reference signal pattern to a device.

15 Claims, 29 Drawing Sheets

Related U.S. Application Data

(60) Provisional application No. 61/978,100, filed on Apr. 10, 2014.

(51) Int. Cl.
| | | |
|---|---|---|
| *H04W 72/00* | (2009.01) | |
| *H04W 72/12* | (2009.01) | |
| *H04L 5/00* | (2006.01) | |
| *H04W 74/04* | (2009.01) | |
| *H04W 28/08* | (2009.01) | |
| *H04W 74/08* | (2009.01) | |
| *H04L 5/14* | (2006.01) | |
| *H04L 27/00* | (2006.01) | |
| *H04W 68/00* | (2009.01) | |

(52) U.S. Cl.
CPC ..... *H04W 72/005* (2013.01); *H04W 72/1263* (2013.01); *H04W 74/04* (2013.01); *H04L 5/001* (2013.01); *H04L 5/0023* (2013.01); *H04L 5/14* (2013.01); *H04L 27/0006* (2013.01); *H04W 28/08* (2013.01); *H04W 68/005* (2013.01); *H04W 74/0808* (2013.01)

(56) References Cited

U.S. PATENT DOCUMENTS

| | | | |
|---|---|---|---|
| 9,113,483 B2* | 8/2015 | Zou | H04W 16/14 |
| 2010/0067412 A1 | 3/2010 | Kitazoe et al. | |
| 2011/0103286 A1 | 5/2011 | Montojo et al. | |
| 2011/0194551 A1 | 8/2011 | Lee et al. | |
| 2011/0274025 A1 | 11/2011 | Hsu | |
| 2011/0305295 A1 | 12/2011 | Kim et al. | |
| 2012/0002616 A1 | 1/2012 | Ishii et al. | |
| 2012/0230347 A1* | 9/2012 | Gao | H04W 72/005 |
| | | | 370/432 |
| 2013/0070659 A1 | 3/2013 | Gou et al. | |
| 2013/0242824 A1 | 9/2013 | Lee et al. | |
| 2013/0294333 A1 | 11/2013 | Chen et al. | |
| 2014/0016522 A1 | 1/2014 | Ahn et al. | |
| 2014/0036818 A1 | 2/2014 | Koskela et al. | |
| 2014/0036881 A1 | 2/2014 | Kim et al. | |
| 2014/0341038 A1* | 11/2014 | Lim | H04W 28/08 |
| | | | 370/235 |
| 2014/0376483 A1 | 12/2014 | Hong et al. | |
| 2015/0250002 A1* | 9/2015 | Sun | H04W 74/0808 |
| | | | 370/329 |
| 2015/0296385 A1 | 10/2015 | Zhang | |

OTHER PUBLICATIONS

IPEA/EP, Second Written Opinion of the International Preliminary Examining Authority, Int'l Application No. PCT/US2015/024066, dated May 24, 2016, European Patent Office, Munich, DE, 21 pgs.

ISA/EPO, Partial International Search Report of the International Searching Authority, Int'l App. No. PCT/US2015/024066, dated Jul. 1, 2015, European Patent Office, Rijswijk, NL, 5 pgs.

* cited by examiner

TECHNIQUES FOR TRANSMITTING PATTERNS OF SIGNAL TRANSMISSIONS OR REFERENCE SIGNALS OVER AN UNLICENSED RADIO FREQUENCY SPECTRUM BAND

CROSS REFERENCES

The present Application for Patent is a continuation of U.S. patent application Ser. No. 14/676,098 by Zhang et al., entitled "Techniques for Transmitting Patterns of Signal Transmissions or Reference Signals Over An Unlicensed Radio Frequency Spectrum Band," filed Apr. 1, 2015, which claims priority to U.S. Provisional Patent Application No. 61/978,100 by Zhang et al., entitled "Techniques for Transmitting Patterns of Signal Transmissions or Reference Signals Over An Unlicensed Radio Frequency Spectrum Band," filed Apr. 10, 2014, assigned to the assignee hereof, which is hereby incorporated by reference in its entirety.

FIELD OF THE DISCLOSURE

The present disclosure, for example, relates to wireless communication systems, and more particularly to techniques for transmitting patterns of signal transmissions and/or reference signals over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple UEs. A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

Some transmissions by a base station over a licensed radio frequency spectrum band are transmitted under certain conditions, and when a UE does not receive the transmissions, the UE may assume the transmissions were not needed and/or were not sent.

SUMMARY

The present disclosure, for example, relates to one or more techniques for transmitting patterns of signal transmissions and/or reference signals over an unlicensed radio frequency spectrum band.

In an example, a method for wireless communication is described. In one example, the method may include determining a pattern of signal transmissions for transmitting instances of a signal in a time period of an unlicensed radio frequency spectrum band; determining whether the unlicensed radio frequency spectrum band is unavailable to transmit at least one instance of the signal; and changing, in response to determining the unlicensed radio frequency spectrum band is unavailable to transmit an instance of the signal, the pattern of signal transmissions for the time period.

In some examples of the method, the pattern of signal transmissions may include a first scheduled signal transmission and a second scheduled signal transmission. In these examples, changing the pattern of signal transmissions may include scheduling an additional signal transmission in the pattern of signal transmissions, during a frame of the unlicensed radio frequency spectrum band occurring between the first scheduled signal transmission and the second scheduled signal transmission.

In some examples of the method, the signal may include a multicast control channel (MCCH) change notification. In some examples of the method, the signal may include a paging instance.

In some examples of the method, changing the pattern of signal transmissions may include identifying, in response to determining the unlicensed radio frequency spectrum band is unavailable to transmit the instance of the signal, a next available frame in the time period to transmit the instance of the signal over the unlicensed radio frequency spectrum band.

In some examples of the method, the unlicensed radio frequency spectrum band may be unavailable to transmit the instance of the signal during a frame in a window of a plurality of frames in the time period. In some of these examples, changing the pattern of signal transmissions may include identifying, upon determining the unlicensed radio frequency spectrum band is unavailable to transmit the instance of the signal during the frame in the window of the plurality of frames, a second frame in the window of the plurality of frames for transmission of the instance of the signal. In some examples, determining the pattern of signal transmissions for transmitting instances of the signal in the time period of the unlicensed radio frequency spectrum band may include initially scheduling transmission of the instance of the signal, during the frame in the window of the plurality of frames, based on at least one of a processing load and/or a traffic load. In some examples, the frame in the window of the plurality of frames may be other than a first frame in the window of the plurality of frames. In some examples, the window of the plurality of frames may include scheduled paging instances for multiple groups of devices.

In some examples of the method, changing the pattern of signal transmissions may include increasing a number of scheduled signal transmissions in the pattern of signal transmissions for the time period. In some examples, changing the pattern of signal transmissions may include adding to the pattern of signal transmissions a signal transmission in a clear channel assessment (CCA)-exempt transmission (CET) in the time period.

In an example, an apparatus for wireless communication is described. In one example, the apparatus may include means for determining a pattern of signal transmissions for transmitting instances of a signal in a time period of an unlicensed radio frequency spectrum band; means for determining whether the unlicensed radio frequency spectrum band is unavailable to transmit at least one instance of the signal; and means for changing, in response to determining the unlicensed radio frequency spectrum band is unavailable to transmit an instance of the signal, the pattern of signal transmissions for the time period. In some examples, the apparatus may further include means for implementing one or more aspects of the method for wireless communication described above.

In an example, another apparatus for wireless communication is described. In one example, the apparatus may include a processor, memory in electronic communication with the processor, and instructions stored in the memory. The instructions may be executable by the processor to determine a pattern of signal transmissions for transmitting instances of a signal in a time period of an unlicensed radio frequency spectrum band; to determine whether the unlicensed radio frequency spectrum band is unavailable to transmit at least one instance of the signal; and to change, in response to determining the unlicensed radio frequency spectrum band is unavailable to transmit an instance of the signal, the pattern of signal transmissions for the time period. In some examples, the instructions may also be executable by the processor to implement one or more aspects of the method for wireless communication described above.

In an example, a non-transitory computer-readable medium storing computer-executable code for wireless communications is described. The code may be executable by a processor to determine a pattern of signal transmissions for transmitting instances of a signal in a time period of an unlicensed radio frequency spectrum band; to determine whether the unlicensed radio frequency spectrum band is unavailable to transmit at least one instance of the signal; and to change, in response to determining the unlicensed radio frequency spectrum band is unavailable to transmit an instance of the signal, the pattern of signal transmissions for the time period. In some examples, the code may also be executable by the processor to implement one or more aspects of the method for wireless communication described above.

In an example, another method for wireless communication is described. In one example, the method may include monitoring a first frame in a time period of an unlicensed radio frequency spectrum band for transmission of an instance of a signal in a pattern of signal transmissions for the time period; determining the instance of the signal failed to transmit during the first frame of the unlicensed radio frequency spectrum band due to unavailability of the unlicensed radio frequency spectrum band; and in response to the determining, monitoring a second frame in the time period in the unlicensed radio frequency spectrum band for the transmission of the instance of the signal. The transmission of the instance of the signal during the second frame may be based at least in part on a change in the pattern of signal transmissions for the time period.

In some examples of the method, the determining may include determining the transmission of the instance of the signal failed to transmit during the first frame based at least in part on a blind detection of a channel usage beacon signal (CUBS) for the first frame. In these examples, the method may further include monitoring each frame in the time period, until determining at least one instance of the signal has been transmitted.

In some examples of the method, the first frame and the second frame may be frames in a window of a plurality of frames in the time period. In some of these examples, the method may include monitoring each frame in the window of the plurality of frames, until determining the instance of the signal has been transmitted. In some examples, the method may include monitoring each frame in the window of the plurality of frames, until determining the instance of the signal will not be transmitted. In some examples, the method may include monitoring the window of the plurality of frames for paging instances for multiple groups of devices, and acquiring paging information based at least in part on a paging instance associated with another device.

In some examples, the method may include detecting the transmission of the instance of the signal as part of a CET in the time period.

In some examples of the method, the signal comprises an MCCH change notification. In some of these examples, the method may include reacquiring an MCCH in a next time period of the unlicensed radio frequency spectrum band when a transmission of the signal is not detected for the time period. In some examples of the method, the signal may include a paging instance.

In an example, another apparatus for wireless communication is described. In one example, the apparatus may include means for monitoring a first frame in a time period of an unlicensed radio frequency spectrum band for transmission of an instance of a signal in a pattern of signal transmissions for the time period; means for determining the instance of the signal failed to transmit during the first frame of the unlicensed radio frequency spectrum band due to unavailability of the unlicensed radio frequency spectrum band; and means for monitoring a second frame in the time period in the unlicensed radio frequency spectrum band for the transmission of the instance of the signal, in response to the determining. The transmission of the instance of the signal during the second frame may be based at least in part on a change in the pattern of signal transmissions for the time period. In some examples, the apparatus may further include means for implementing one or more aspects of the method for wireless communication described above.

In an example, another apparatus for wireless communication is described. In one example, the apparatus may include a processor, memory in electronic communication with the processor, and instructions stored in the memory. The instructions may be executable by the processor to monitor a first frame in a time period of an unlicensed radio frequency spectrum band for transmission of an instance of a signal in a pattern of signal transmissions for the time period; to determine the instance of the signal failed to transmit during the first frame of the unlicensed radio frequency spectrum band due to unavailability of the unlicensed radio frequency spectrum band; and to monitor a second frame in the time period in the unlicensed radio frequency spectrum band for the transmission of the instance of the signal, in response to the determining. The transmission of the instance of the signal during the second frame may be based at least in part on a change in the pattern of signal transmissions for the time period. In some examples, the instructions may also be executable by the processor to implement one or more aspects of the method for wireless communication described above.

In an example, another non-transitory computer-readable medium storing computer-executable code for wireless communications is described. The code may be executable by a processor to monitor a first frame in a time period of an unlicensed radio frequency spectrum band for transmission of an instance of a signal in a pattern of signal transmissions for the time period; to determine the instance of the signal failed to transmit during the first frame of the unlicensed radio frequency spectrum band due to unavailability of the unlicensed radio frequency spectrum band; and to monitor a second frame in the time period in the unlicensed radio frequency spectrum band for the transmission of the instance of the signal, in response to the determining. The transmission of the instance of the signal during the second frame may be based at least in part on a change in the pattern of signal transmissions for the time period. In some examples, the code may also be executable by the processor to implement one or more aspects of the method for wireless communication described above.

In an example, another method for wireless communication is described. In one example, the method may include identifying at least one reference signal pattern from a plurality of reference signal patterns based at least in part on whether a plurality of transmission time intervals are bundled, and signaling the identified at least one reference signal pattern to a device.

In some examples of the method, the signaling may indicate whether a first transmission time interval is bundled with a second transmission time interval. In some examples, the second transmission time interval may be adjacent to the first transmission time interval.

In some examples of the method, the plurality of reference signal patterns may include a reference signal pattern comprising twelve reference signal tones per resource block of a transmission time interval in an unlicensed radio frequency spectrum band. In some examples, the plurality of reference signal patterns may include a reference signal pattern having eighteen reference signal tones per resource block, wherein the eighteen reference signal tones are distributed over a first transmission time interval and a second transmission time interval, and wherein the first transmission time interval and the second transmission time interval are bundled in an unlicensed radio frequency spectrum band.

In some examples of the method, the signaling may be provided via a system information block (SIB) or a downlink CET.

In an example, another apparatus for wireless communication is described. In one example, the apparatus may include means for identifying at least one reference signal pattern from a plurality of reference signal patterns based at least in part on whether a plurality of transmission time intervals are bundled, and means for signaling the identified at least one reference signal pattern to a device. In some examples, the apparatus may further include means for implementing one or more aspects of the method for wireless communication described above.

In an example, another apparatus for wireless communication is described. The apparatus may include a processor, memory in electronic communication with the processor, and instructions stored in the memory. The instructions may be executable by the processor to identify at least one reference signal pattern from a plurality of reference signal patterns based at least in part on whether a plurality of transmission time intervals are bundled, and to signal the identified at least one reference signal pattern to a device. In some examples, the instructions may also be executable by the processor to implement one or more aspects of the method for wireless communication described above.

In an example, another non-transitory computer-readable medium storing computer-executable code for wireless communications is described. The code may be executable by a processor to identify at least one reference signal pattern from a plurality of reference signal patterns based at least in part on whether a plurality of transmission time intervals are bundled, and to signal the identified at least one reference signal pattern to a device. In some examples, the code may also be executable by the processor to implement one or more aspects of the method for wireless communication described above.

In an example, another method for wireless communication is described. In one example, the method may include receiving signaling indicating whether a plurality of transmission time intervals are bundled, and receiving a reference signal distributed over each of the plurality of transmission time intervals when the plurality of transmission time intervals are bundled.

In some examples, the method may include receiving separate reference signals for each of the plurality of transmission time intervals when the plurality of transmission time intervals are not bundled. In some examples, the plurality of transmission time intervals may include a first transmission time interval and a second transmission time interval. In some examples, the second transmission time interval may be adjacent to the first transmission time interval. In some examples, the signaling may be received via a SIB or a downlink CET.

In an example, another apparatus for wireless communication is described. In one example, the apparatus may include means for receiving signaling indicating whether a plurality of transmission time intervals are bundled, and means for receiving a reference signal distributed over each of the plurality of transmission time intervals when the plurality of transmission time intervals are bundled. In some examples, the apparatus may further include means for implementing one or more aspects of the method for wireless communication described above.

In an example, another apparatus for wireless communication is described. In one example, the apparatus may include a processor, memory in electronic communication with the processor, and instructions stored in the memory. The instructions may be executable by the processor to receive signaling indicating whether a plurality of transmission time intervals are bundled, and to receive a reference signal distributed over each of the plurality of transmission time intervals when the plurality of transmission time intervals are bundled. In some examples, the instructions may also be executable by the processor to implement one or more aspects of the method for wireless communication described above.

In an example, another non-transitory computer-readable medium storing computer-executable code for wireless communications is described. The code may be executable by a processor to receive signaling indicating whether a plurality of transmission time intervals are bundled, and to receive a reference signal distributed over each of the plurality of transmission time intervals when the plurality of transmission time intervals are bundled. In some examples, the code may also be executable by the processor to implement one or more aspects of the method for wireless communication described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

A method of wireless communication is described. The method may include monitoring a window of a plurality of frames during a time period of an unlicensed radio frequency spectrum band for transmission of a paging instance, determining the paging instance failed to transmit during a first frame of the window of the unlicensed radio frequency spectrum band due to unavailability of the unlicensed radio frequency spectrum band, and monitoring a second frame of the window in the time period of the unlicensed radio frequency spectrum band for the transmission of the paging instance based at least in part on determining the paging instance failed to transmit.

An apparatus for wireless communication is described. The apparatus may include means for monitoring a window of a plurality of frames during a time period of an unlicensed radio frequency spectrum band for transmission of a paging instance, means for determining the paging instance failed to transmit during a first frame of the window of the unlicensed radio frequency spectrum band due to unavailability of the unlicensed radio frequency spectrum band, and means for monitoring a second frame of the window in the time period of the unlicensed radio frequency spectrum band for the transmission of the paging instance based at least in part on determining the paging instance failed to transmit.

Another apparatus for wireless communication is described. The apparatus may include a processor, memory in electronic communication with the processor, and instructions stored in the memory. The instructions may be operable to cause the processor to monitor a window of a plurality of frames during a time period of an unlicensed radio frequency spectrum band for transmission of a paging instance, determine the paging instance failed to transmit during a first frame of the window of the unlicensed radio frequency spectrum band due to unavailability of the unlicensed radio frequency spectrum band, and monitor a second frame of the window in the time period of the unlicensed radio frequency spectrum band for the transmission of the paging instance based at least in part on determining the paging instance failed to transmit.

A non-transitory computer-readable medium for wireless communication is described. The non-transitory computer-readable medium may include instructions operable to cause a processor to monitor a window of a plurality of frames during a time period of an unlicensed radio frequency spectrum band for transmission of a paging instance, determine the paging instance failed to transmit during a first frame of the window of the unlicensed radio frequency spectrum band due to unavailability of the unlicensed radio frequency spectrum band, and monitor a second frame of the window in the time period of the unlicensed radio frequency spectrum band for the transmission of the paging instance based at least in part on determining the paging instance failed to transmit.

Some examples of the method, apparatus, and non-transitory computer-readable medium described above may further include processes, features, means, or instructions for monitoring the window of the plurality of frames for paging instances of other devices. Some examples of the method, apparatus, and non-transitory computer-readable medium described above may further include processes, features, means, or instructions for acquiring paging information based at least in part on a second paging instance associated with another device.

Some examples of the method, apparatus, and non-transitory computer-readable medium described above may further include processes, features, means, or instructions for monitoring a sub-window within the window of the plurality of frames for the paging instance before monitoring the window of the plurality of frames for paging instances of other devices.

Some examples of the method, apparatus, and non-transitory computer-readable medium described above may further include processes, features, means, or instructions for determining that the unlicensed radio frequency spectrum band failed to transmit the paging instance to a first device during a first set of scheduled paging instances of the window associated with the first device. Some examples of the method, apparatus, and non-transitory computer-readable medium described above may further include processes, features, means, or instructions for monitoring a second set of scheduled paging instances of the window associated with a second device based at least in part on determining that the unlicensed radio frequency spectrum band failed to transmit the paging instance to a first device during a first set of scheduled paging instances. Some examples of the method, apparatus, and non-transitory computer-readable medium described above may further include processes, features, means, or instructions for acquiring paging information based at least in part on receiving a second paging instance associated with the second device during the second set of scheduled paging instances.

In some examples of the method, apparatus, and non-transitory computer-readable medium described above, the determining comprises: determining the transmission of the paging instance failed to transmit during the first frame based at least in part on a blind detection of a channel usage beacon signal (CUBS) for the first frame.

Some examples of the method, apparatus, and non-transitory computer-readable medium described above may further include processes, features, means, or instructions for monitoring each frame in the time period, until determining at least one paging instance may have been transmitted.

Some examples of the method, apparatus, and non-transitory computer-readable medium described above may further include processes, features, means, or instructions for monitoring each frame in the window of the plurality of frames, until determining the paging instance may have been transmitted.

Some examples of the method, apparatus, and non-transitory computer-readable medium described above may further include processes, features, means, or instructions for monitoring each frame in the window of the plurality of frames, until determining the paging instance will not be transmitted.

Some examples of the method, apparatus, and non-transitory computer-readable medium described above may further include processes, features, means, or instructions for detecting the transmission of the paging instance in a clear channel assessment (CCA)-exempt transmission (CET) in the time period.

Some examples of the method, apparatus, and non-transitory computer-readable medium described above may further include processes, features, means, or instructions for detecting the transmission of the paging instance in a listen-before-talk (LBT) frame in the time period.

In some examples of the method, apparatus, and non-transitory computer-readable medium described above, the transmission of the paging instance during the second frame may be based at least in part on a change in a pattern of signal transmissions for the time period.

A method of wireless communication is described. The method may include determining a pattern of signal transmissions for transmitting one or more paging instances in a time period of an unlicensed radio frequency spectrum band, determining whether the unlicensed radio frequency spectrum band is unavailable to transmit at least one paging instance during a frame in a window of a plurality of frames in the time period, and changing, in response to determining the unlicensed radio frequency spectrum band is unavailable to transmit a paging instance, the pattern of signal transmissions for the time period.

An apparatus for wireless communication is described. The apparatus may include means for determining a pattern of signal transmissions for transmitting one or more paging instances in a time period of an unlicensed radio frequency spectrum band, means for determining whether the unlicensed radio frequency spectrum band is unavailable to transmit at least one paging instance during a frame in a window of a plurality of frames in the time period, and means for changing, in response to determining the unlicensed radio frequency spectrum band is unavailable to transmit a paging instance, the pattern of signal transmissions for the time period.

Another apparatus for wireless communication is described. The apparatus may include a processor, memory in electronic communication with the processor, and instructions stored in the memory. The instructions may be operable to cause the processor to determine a pattern of signal transmissions for transmitting one or more paging instances in a time period of an unlicensed radio frequency spectrum band, determine whether the unlicensed radio frequency spectrum band is unavailable to transmit at least one paging instance during a frame in a window of a plurality of frames in the time period, and change, in response to determining the unlicensed radio frequency spectrum band is unavailable to transmit a paging instance, the pattern of signal transmissions for the time period.

A non-transitory computer-readable medium for wireless communication is described. The non-transitory computer-readable medium may include instructions operable to cause a processor to determine a pattern of signal transmissions for transmitting one or more paging instances in a time period of an unlicensed radio frequency spectrum band, determine whether the unlicensed radio frequency spectrum band is unavailable to transmit at least one paging instance during a frame in a window of a plurality of frames in the time period, and change, in response to determining the unlicensed radio frequency spectrum band is unavailable to transmit a paging instance, the pattern of signal transmissions for the time period.

In some examples of the method, apparatus, and non-transitory computer-readable medium described above, the window of the plurality of frames includes a first set of scheduled paging instances for a first device and a second set of scheduled paging instances for a second device.

Some examples of the method, apparatus, and non-transitory computer-readable medium described above may further include processes, features, means, or instructions for determining that the unlicensed radio frequency spectrum band may be unavailable to transmit a first paging instance to the first device during the first set of scheduled paging instances of the window. Some examples of the method, apparatus, and non-transitory computer-readable medium described above may further include processes, features, means, or instructions for transmitting a second paging instance during the second set of scheduled paging instances associated with the second device based at least in part on determining that the unlicensed radio frequency spectrum band may be unavailable for the first set of scheduled paging instances.

In some examples of the method, apparatus, and non-transitory computer-readable medium described above, the pattern of signal transmissions comprises a first scheduled paging instance transmission and a second scheduled paging instance transmission.

In some examples of the method, apparatus, and non-transitory computer-readable medium described above, the changing the pattern of signal transmissions comprises scheduling an additional paging instance transmission in the pattern of signal transmissions, during a frame of the unlicensed radio frequency spectrum band occurring between the first scheduled paging instance transmission and the second scheduled paging instance transmission.

In some examples of the method, apparatus, and non-transitory computer-readable medium described above, the changing the pattern of signal transmissions comprises scheduling an additional paging instance transmission in the pattern of signal transmissions, during a frame of the unlicensed radio frequency spectrum band.

Some examples of the method, apparatus, and non-transitory computer-readable medium described above may further include processes, features, means, or instructions for identifying a next available frame in the time period to transmit the paging instance over the unlicensed radio frequency spectrum band based at least in part on determining the unlicensed radio frequency spectrum band may be unavailable to transmit the paging instance. Some examples of the method, apparatus, and non-transitory computer-readable medium described above may further include processes, features, means, or instructions for transmitting the paging instance during the next available frame, wherein the changing the pattern of signal transmissions may be based at least in part on identifying the next available frame.

Some examples of the method, apparatus, and non-transitory computer-readable medium described above may further include processes, features, means, or instructions for determining that a next available listen-before-talk (LBT) frame may be available for use based at least in part on a clear channel assessment (CCA) procedure, wherein the next available frame that includes the paging instance may be the next available LBT frame.

Some examples of the method, apparatus, and non-transitory computer-readable medium described above may further include processes, features, means, or instructions for identifying, a second frame in the window of the plurality of frames for transmission of the paging instance based at least in part on determining that the unlicensed radio frequency spectrum band may be unavailable during the frame in the window, wherein changing the pattern of signal transmissions may be based at least in part on identifying the second frame.

In some examples of the method, apparatus, and non-transitory computer-readable medium described above, the determining the pattern of signal transmissions for transmitting instances of the paging instance in the time period of the unlicensed radio frequency spectrum band comprises: initially scheduling transmission of the paging instance, during the frame in the window of the plurality of frames, based on at least one of a processing load and/or a traffic load.

In some examples of the method, apparatus, and non-transitory computer-readable medium described above, the changing the pattern of signal transmissions comprises at least one of: increasing a number of scheduled paging instance transmissions in the pattern of paging instance transmissions for the time period. Some examples of the method, apparatus, and non-transitory computer-readable medium described above may further include processes, features, means, or instructions for adding to the pattern of signal transmissions a paging instance transmission in a clear channel assessment (CCA)-exempt transmission (CET) in the time period.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
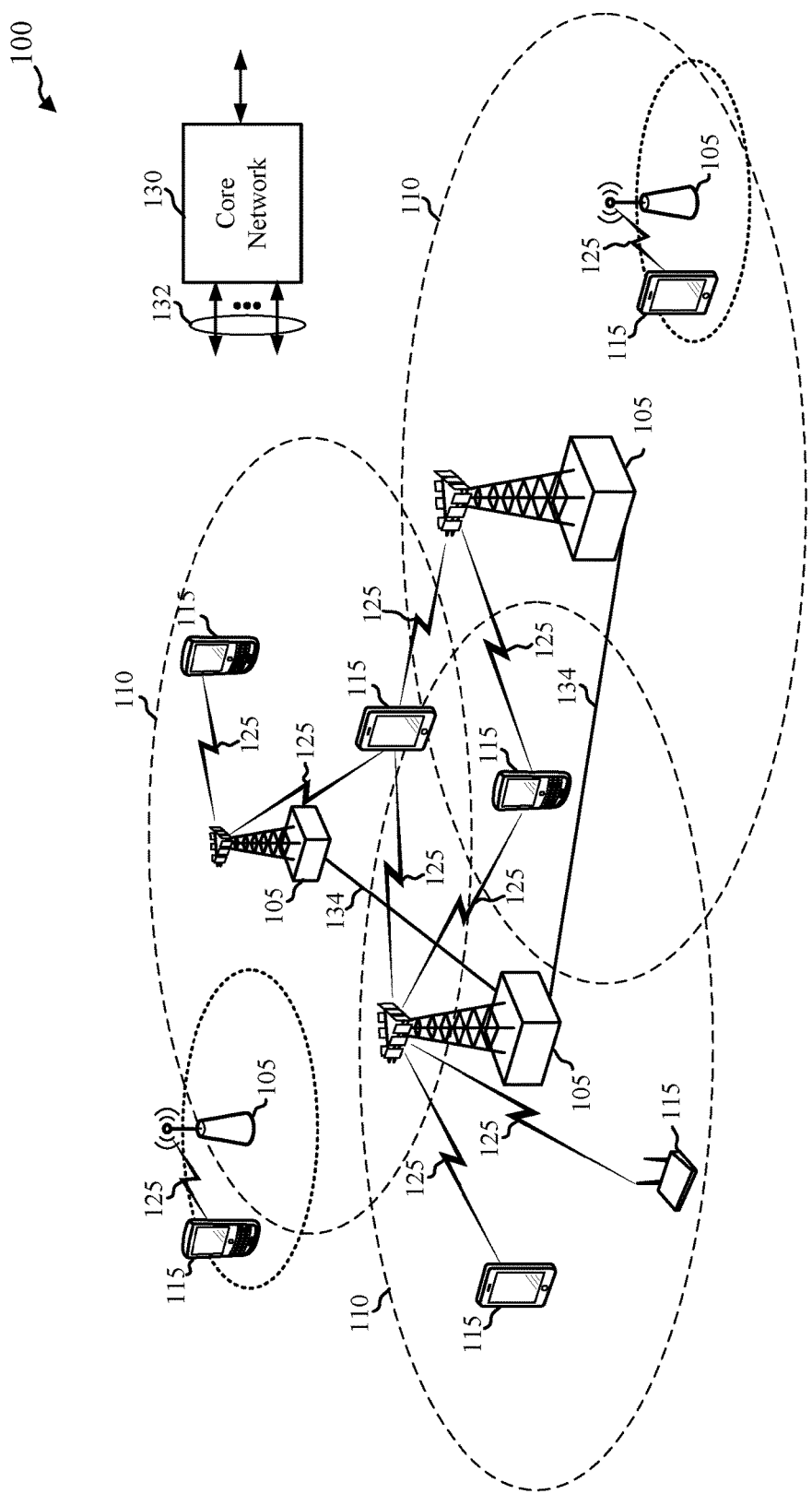
FIG. 1 shows a block diagram of a wireless communication system, in accordance with various aspects of the present disclosure.

Techniques are described in which patterns of signal transmissions and/or reference signals are transmitted over an unlicensed radio frequency spectrum band (e.g., a radio frequency spectrum band for which apparatuses may need to contend for access because the radio frequency spectrum band is available, at least in part, for unlicensed use such as Wi-Fi use and/or unlicensed LTE/LTE-A use). In some examples, the unlicensed radio frequency spectrum band may be used for cellular communications (e.g., Long Term Evolution (LTE) communications and/or LTE-Advanced (LTE-A) communications).

With increasing data traffic in cellular networks, the offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. In some cases, all communication between a base station and a UE may occur over an unlicensed radio frequency spectrum band. In these cases, in particular, ambiguity may arise when the UE monitors the unlicensed radio frequency spectrum band for a transmission, by the base station, of a signal that the base station only transmits under certain conditions. That is, when the UE does not receive the signal, there is ambiguity at the UE regarding 1) whether the base station did not have an instance of the signal to transmit, or 2) whether the base station had an instance of the signal to transmit but could not gain access to the unlicensed radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc. In some examples, the wireless communication system 100 may support at least one multimedia broadcast/multicast service (MBMS) and/or enhanced MBMS (eMBMS).

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use). In other examples, the wireless communication system 100 may support wireless communication using one or more access technologies different from LTE/LTE-A. In LTE/LTE-A communication systems, the term evolved NodeB or eNB may be used, for example, to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

Figure 2:
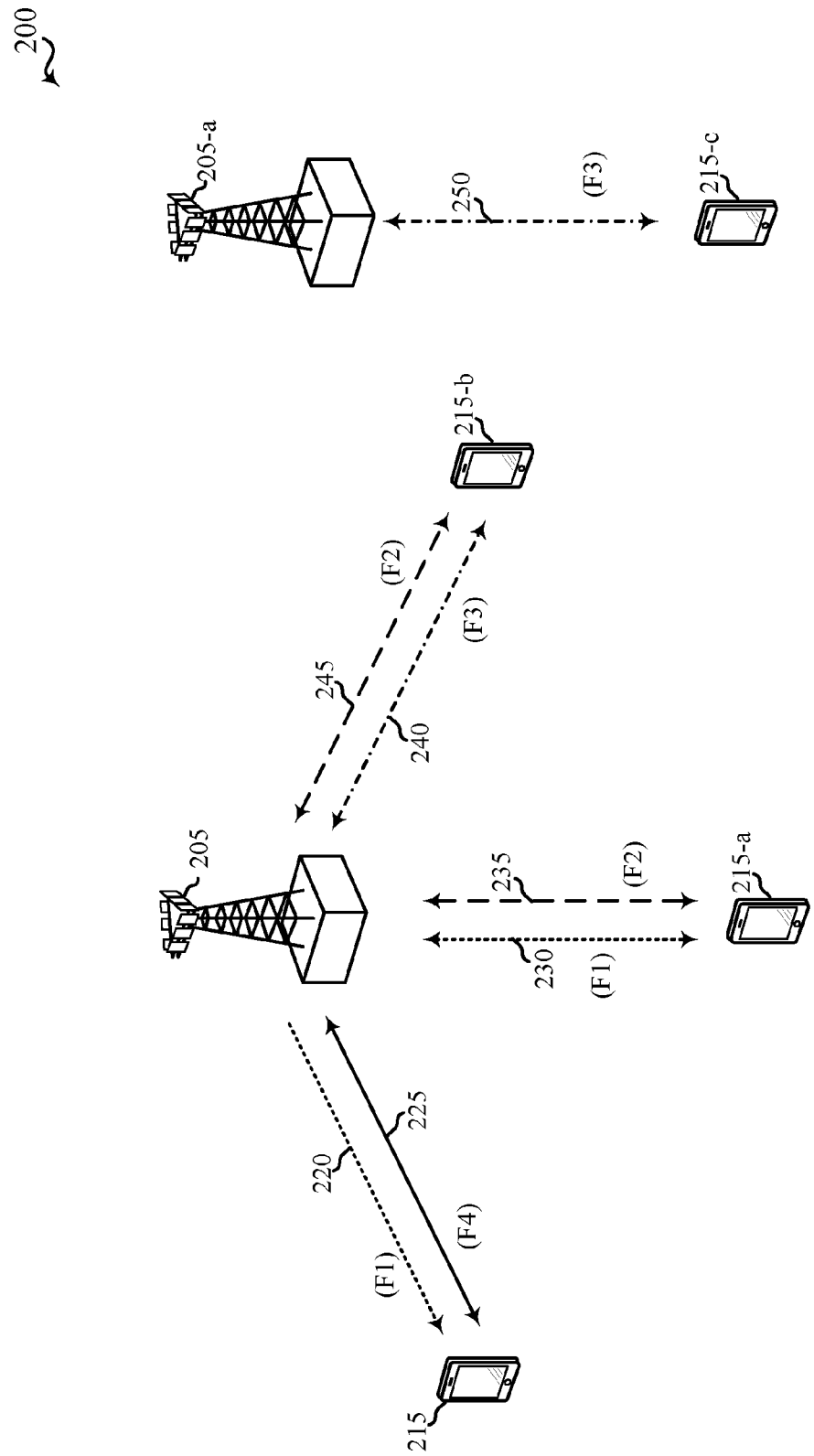
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). In some examples, the downlink channel 220 may be used to transmit emergency data from the first base station 205 to the UE 215. A supplemental downlink scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). When there is a need to transmit emergency data between the first base station 205 and the second UE 215-a or third UE 215-b, the emergency data may be transmitted over the licensed radio frequency spectrum band and/or the unlicensed radio frequency spectrum band. The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the unlicensed radio frequency spectrum band. When there is a need to transmit emergency data between the second base station 205-a and the fourth UE 215-c, the emergency data may need to be transmitted over the unlicensed radio frequency spectrum band because transmission of the emergency data over a licensed radio frequency spectrum band may not be an option. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-*a* described with reference to FIGS. 1 and/or 2, and/or one of the UEs 115, 215, 215-*a*, 215-*b*, and/or 215-*c* described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting apparatus whether a channel of an unlicensed radio frequency spectrum band is available or in use during the gating interval (also referred to as an LBT frame or a CCA frame). When a CCA indicates that the channel is available (e.g., "clear" for use) during a corresponding LBT frame, the transmitting apparatus may reserve and/or use the channel of the unlicensed radio frequency spectrum band during part or all of the LBT frame. When the CCA procedure indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure (e.g., a periodic LTE/LTE-A radio frame structure). Examples of such synchronization are shown in FIG. 3.

Figure 3:
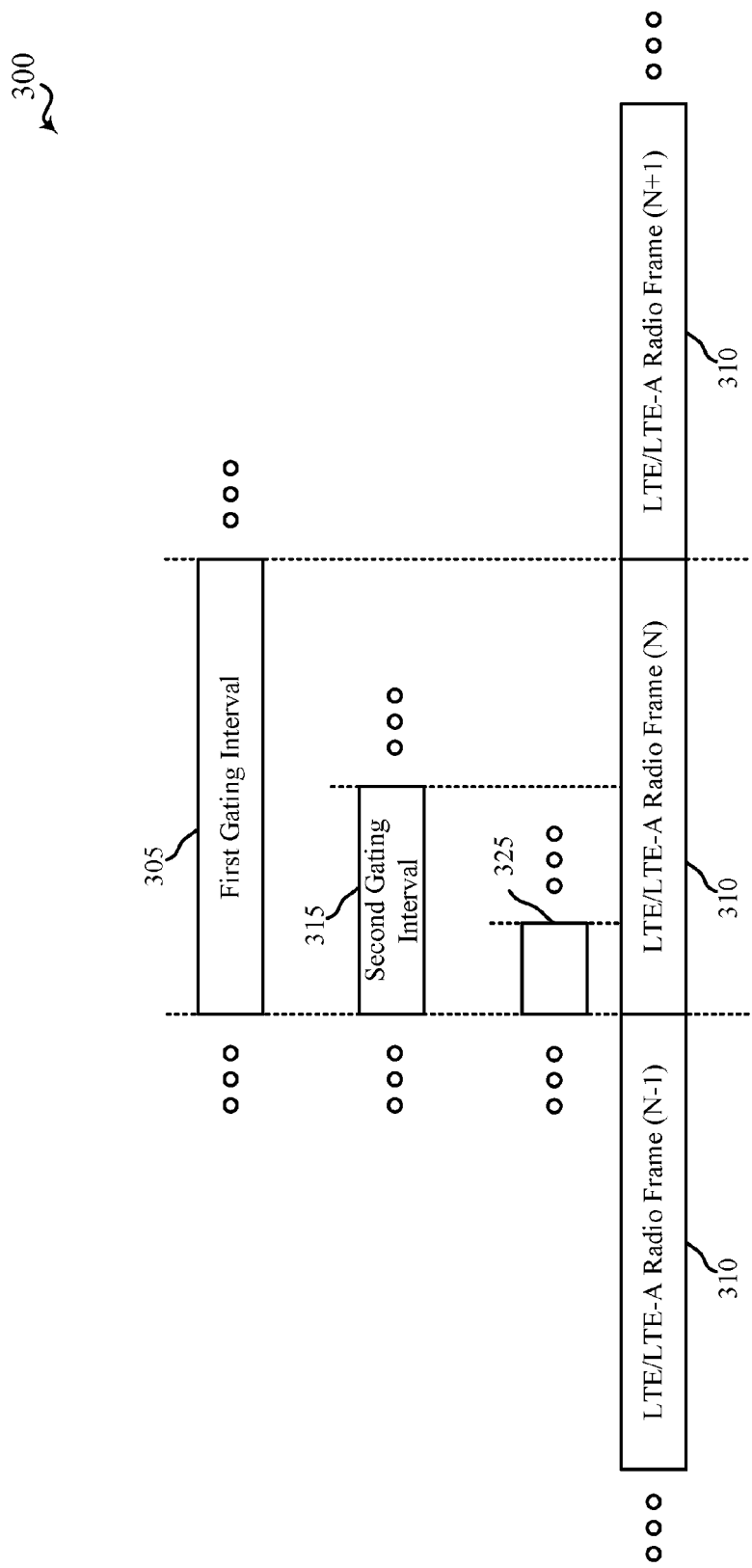
FIG. 3 shows examples of a gating interval (or LBT frame) in an unlicensed radio frequency spectrum band, in accordance with various aspects of the present disclosure.

FIG. 3 shows examples 300 of a gating interval (or LBT frame) in an unlicensed radio frequency spectrum band, in accordance with various aspects of the present disclosure. A first gating interval 305, a second gating interval 315, and/or a third gating interval 325 may be used as a periodic gating interval by an eNB or UE that supports transmissions over the unlicensed radio frequency spectrum band. Examples of such an eNB may include the base station 105, 205, and/or 205-*a* described with reference to FIGS. 1 and/or 2, and examples of such a UE may include the UE 115, 215, 215-*a*, 215-*b*, and/or 215-*c* described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic frame structure associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-fifth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of the unlicensed radio frequency spectrum band.

Figure 4:
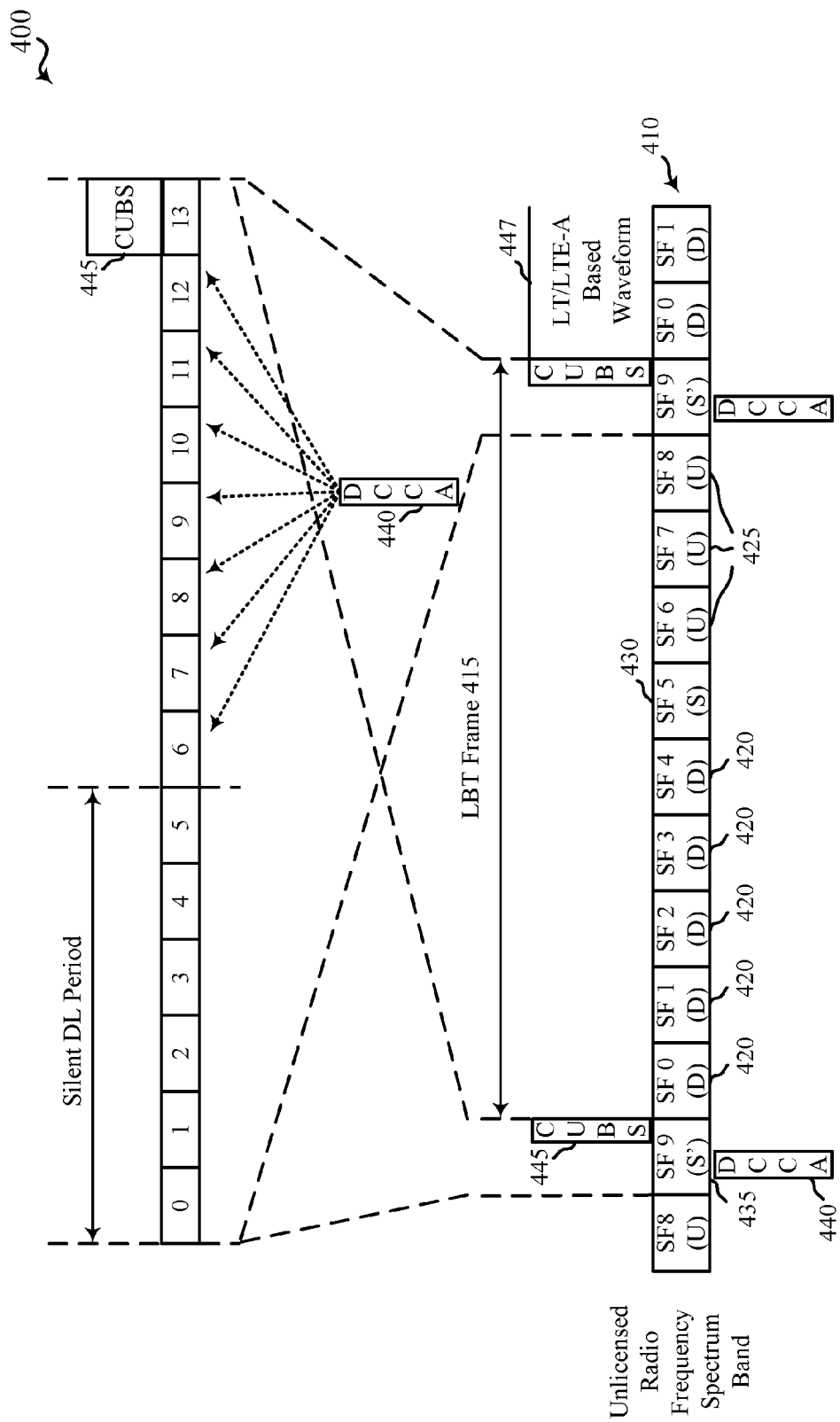
FIG. 4 shows an example of wireless communication over an unlicensed radio frequency spectrum band, in accordance with various aspects of the present disclosure.

FIG. 4 shows an example 400 of wireless communication 410 over an unlicensed radio frequency spectrum band, in accordance with various aspects of the present disclosure. An LBT frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420.

During the S' subframe 435, a downlink clear channel assessment (DCCA) 440 may be performed by one or more base stations, such as one or more of the base stations 105, 205, and/or 205-*a* described with reference to FIGS. 1 and/or 2, to reserve, for a period of time, the channel over which the wireless communication 410 occurs. Following a successful DCCA 440 by a base station, the base station may transmit a channel usage beacon signal (CUBS) 445 to provide an indication to other base stations and/or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) and/or channel state information reference signal (CSI-RS). Following the transmission of the CUBS 445, an LTE/LTE-A based waveform 447 may be transmitted, from a base station to a UE, over the unlicensed radio frequency spectrum band.

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA 440. In the example 400, the S' subframe 435 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 440, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which the DCCA 440 is performed.

Figure 5:
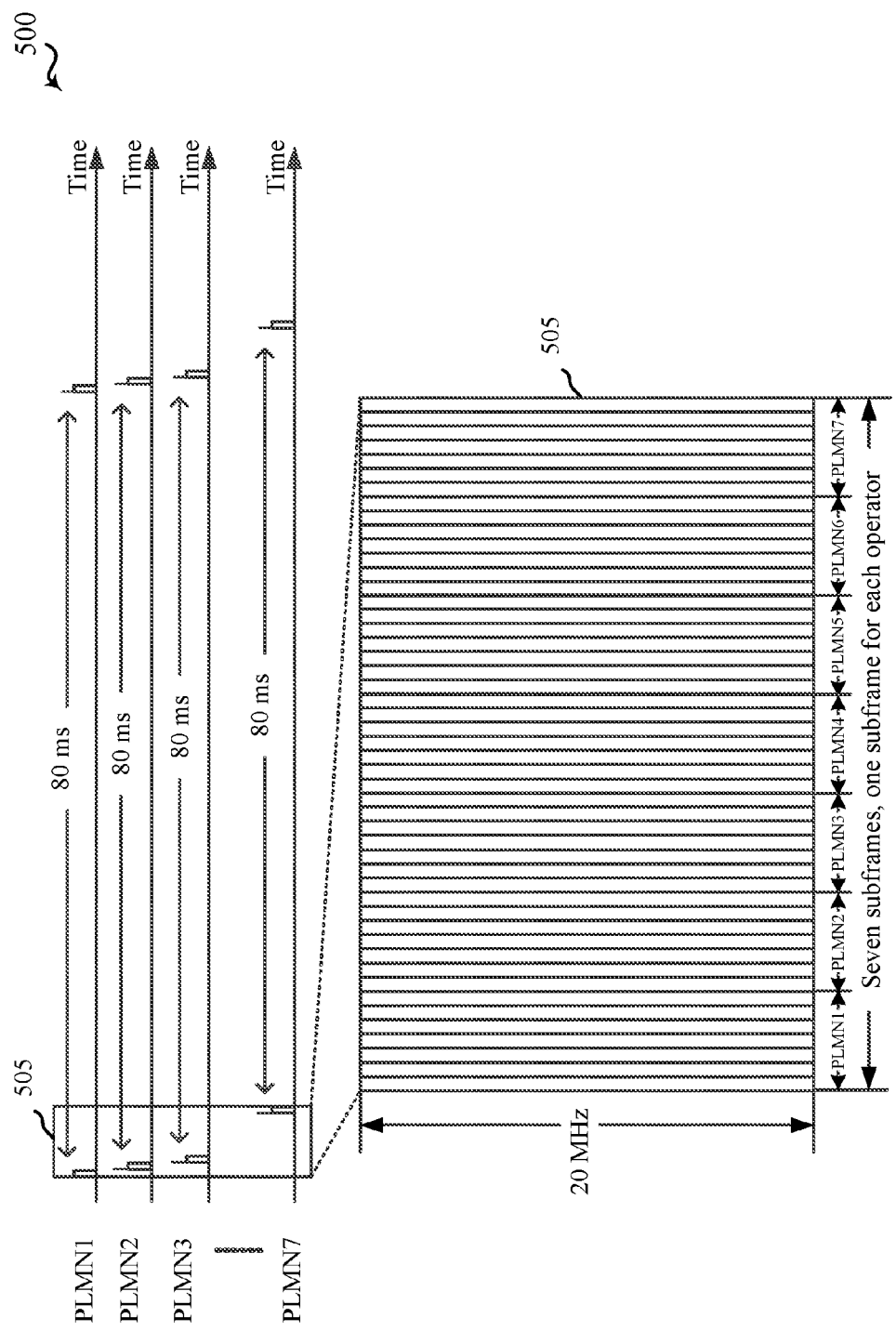
FIG. 5 shows an example of resource allocations for CCA-Exempt Transmissions (CETs) of synchronous operators in an unlicensed radio frequency spectrum band, in accordance with various aspects of the present disclosure.

FIG. 5 shows an example 500 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or an uplink CCA (UCCA)) to first gain access to the unlicensed radio frequency spectrum band. Instead, an operator is exempted from performing a CCA for the purpose of transmitting a CET.

As shown, an allocation of resources 505 for CETs may be made, for example, once every eighty milliseconds (80 ms) or once every CET period, where the CET period may have a configurable periodicity. Each of a number of operators in the unlicensed spectrum (e.g., different PLMNs) may be provided a separate subframe (shown) or subframes (not shown) for transmitting CETs. By way of example, FIG. 5 shows adjacent CET subframes for seven different operators (e.g., operators PLMN1, PLMN2, . . . , PLMN7). Such a CET transmission framework may be applicable to a downlink and/or uplink between a base station and a UE.

When deploying an eMBMS over a licensed radio frequency spectrum band, such as a licensed radio frequency spectrum band of the wireless communication system 100 and/or 200 described with reference to FIGS. 1 and/or 2, the current LTE/LTE-A specification allows for the transmission of multicast control channel (MCCH) change notifications on a physical downlink control channel (PDCCH), from a base station to a UE, to notify a UE of an eMBMS change. According to the specification, a UE that is interested in receiving an eMBMS does not need to reacquire the MCCH when a change is not indicated. Also, an eNB is not required to send an MCCH change notification when there is no change to report to its UEs. When a UE does not detect a PDCCH with an MBMS radio network temporary identifier (M-RNTI), the UE may try to find a next PDCCH instance. The UE may only update its MCCH contents when it detects a change in the PDCCH.

In the context of deploying an eMBMS over an unlicensed radio frequency spectrum band, such as an unlicensed radio frequency spectrum band of the wireless communication system 100 and/or 200 described with reference to FIGS. 1 and/or 2, there may be times when a transmitting apparatus (e.g., a base station) is scheduled to transmit a signal (e.g., an instance of an MCCH change notification), but because the unlicensed radio frequency spectrum band is unavailable (e.g., in use by another transmitting apparatus), the transmitting apparatus may be unable to gain access to the unlicensed radio frequency spectrum band to transmit the signal. Because a base station is not required to transmit a signal such as an MCCH change notification, a UE that expects to receive an MCCH change notification in a particular frame, but does not receive the MCCH change notification in the particular frame, may assume that the base station has no MCCH change notification to send during a time period when, in fact, the base station may have an MCCH change notification to send. When a base station and a UE are operating in a supplemental downlink mode of operation or a carrier aggregation mode of operation using an unlicensed radio frequency spectrum band, MCCH change notifications may be transmitted over a primary component carrier on a licensed radio frequency spectrum band to avoid ambiguity regarding whether the base station has an MCCH change notification to transmit. However, in a stand-alone mode of operation using an unlicensed radio frequency spectrum band, MCCH change notifications must be sent over the unlicensed radio frequency spectrum band. Furthermore, there may be times when it is desirable to transmit MCCH change notifications over an unlicensed radio frequency spectrum band despite the availability of a licensed radio frequency spectrum band. In this regard, a number of techniques for transmitting a pattern of signal transmissions including MCCH change notifications and/or other signals (e.g., paging instances) over an unlicensed radio frequency spectrum band are described.

In one example, a UE that does not receive an MCCH change notification within a current MCCH modification period may be configured to reacquire the MCCH during a next MCCH modification period, regardless of whether there is a change in the MCCH.

In another example, a base station may be configured to increase the number of scheduled transmissions of an MCCH change notification during an MCCH modification period. For example, when deploying an eMBMS using LTE/LTE-A communications over a licensed radio frequency spectrum band, an MCCH change notification may be scheduled and/or configured to be transmitted two or four times during an MCCH modification period. When deploying an eMBMS using LTE/LTE-A communications over an unlicensed radio frequency spectrum band, and by way of example, a number of scheduled MCCH change notifications during an MCCH modification period may be increased (e.g., to eight or sixteen MCCH notification changes). For example, when a base station fails to transmit one or more scheduled MCCH change notifications during a first portion of an MCCH modification period, because the base station fails to gain access to an unlicensed radio frequency spectrum band, the base station may increase a number of scheduled MCCH change notifications for a remaining portion of the MCCH modification period. In another example, when a base station fails to transmit one or more scheduled MCCH change notifications during a first MCCH modification period, because the base station fails to gain access to an unlicensed radio frequency spectrum band, the base station may increase a number of scheduled MCCH change notifications for a second MCCH modification period. A change in the specification of the LTE/LTE-A MBMS-NotificationConfig Information Element may be made to accommodate this example, as follows:

```
-- ASN1START
MBMS-NotificationConfig-r9 ::=          SEQUENCE {
    notificationRepetitionCoeff-r9      ENUMERATED {n2, n4, n8, n16},
    notificationOffset-r9               INTEGER (0..10),
    notificationSF-Index-r9             INTEGER (1..6)
}
--ASN1STOP
``` where the values n8 and n16 for the variable notificationRepetitionCoeff indicate examples of an increased number of scheduled transmissions of an MCCH change notification during an MCCH modification period.

In another example for deploying an eMBMS over an unlicensed radio frequency spectrum band, an MCCH change notification may be transmitted as part of a CET in an MCCH modification period. In some examples, the CET may be one of the CETs described with reference to FIG. 5. Transmission of an MCCH change notification as part of a CET may ensure that an instance of the MCCH change notification is transmitted regardless of Wi-Fi and other activity over an unlicensed radio frequency spectrum band. The maximum overhead for such a transmission may be approximately 4 ms out of every 5 seconds (e.g., <5% overhead).

In another example for deploying an eMBMS over an unlicensed radio frequency spectrum band, a scheduled MCCH change notification scheduled for transmission over the unlicensed radio frequency spectrum band in a frame that cannot be transmitted because the unlicensed radio frequency spectrum band is unavailable, may be transmitted during a next available frame of the unlicensed radio frequency spectrum band. In some examples, the delayed transmission of the MCCH change notification may use the same subframe index specified for the initially scheduled MCCH change notification (e.g., when the unlicensed radio frequency spectrum band is unavailable). In a carrier aggregation mode of operation or a supplemental downlink mode of operation over the unlicensed radio frequency spectrum band, all multicast-broadcast single-frequency network (MBSFN) subframes may need to be transmitted prior to the occurrence of a special S subframe for performing a UCCA.

A window within which a UE needs to monitor the unlicensed radio frequency spectrum band for a delayed transmission of an MCCH change notification may, in some examples, be configured to minimize UE power consumption. For example, a UE may continue to monitor the unlicensed radio frequency spectrum band until detecting an MCCH change notification, but only for a defined window of a plurality of frames. In some examples, a UE may perform a blind detection of a base station's transmissions (e.g., a blind detection of the base station's CUBS transmission) within the window, and enter a power saving mode for frames in which no CUBS transmission is detected. When a UE fails to detect a CUBS transmission of the base station for all of the frames of the window of the plurality of frames, the UE may reacquire the MCCH during a next MCCH modification period.

In another example for deploying an eMBMS over an unlicensed radio frequency spectrum band, an instance of an MCCH change notification may be scheduled for transmission during a window of a plurality of frames of the unlicensed radio frequency spectrum band, instead of during a particular frame. The length of the window may be configured to minimize UE power consumption. Within the window, the UE may continue to monitor for an MCCH change notification until such time that the UE detects an MCCH change notification or until the end of the window is reached. Alternately, the UE may continue to monitor for an MCCH change notification until such time that the UE determines an MCCH change notification will not be transmitted or until the end of the window is reached. In some examples, a UE may determine that an MCCH change notification will not be transmitted upon detecting CUBS but no MCCH change notification for a frame within the window of the plurality of frames.

Figure 6:
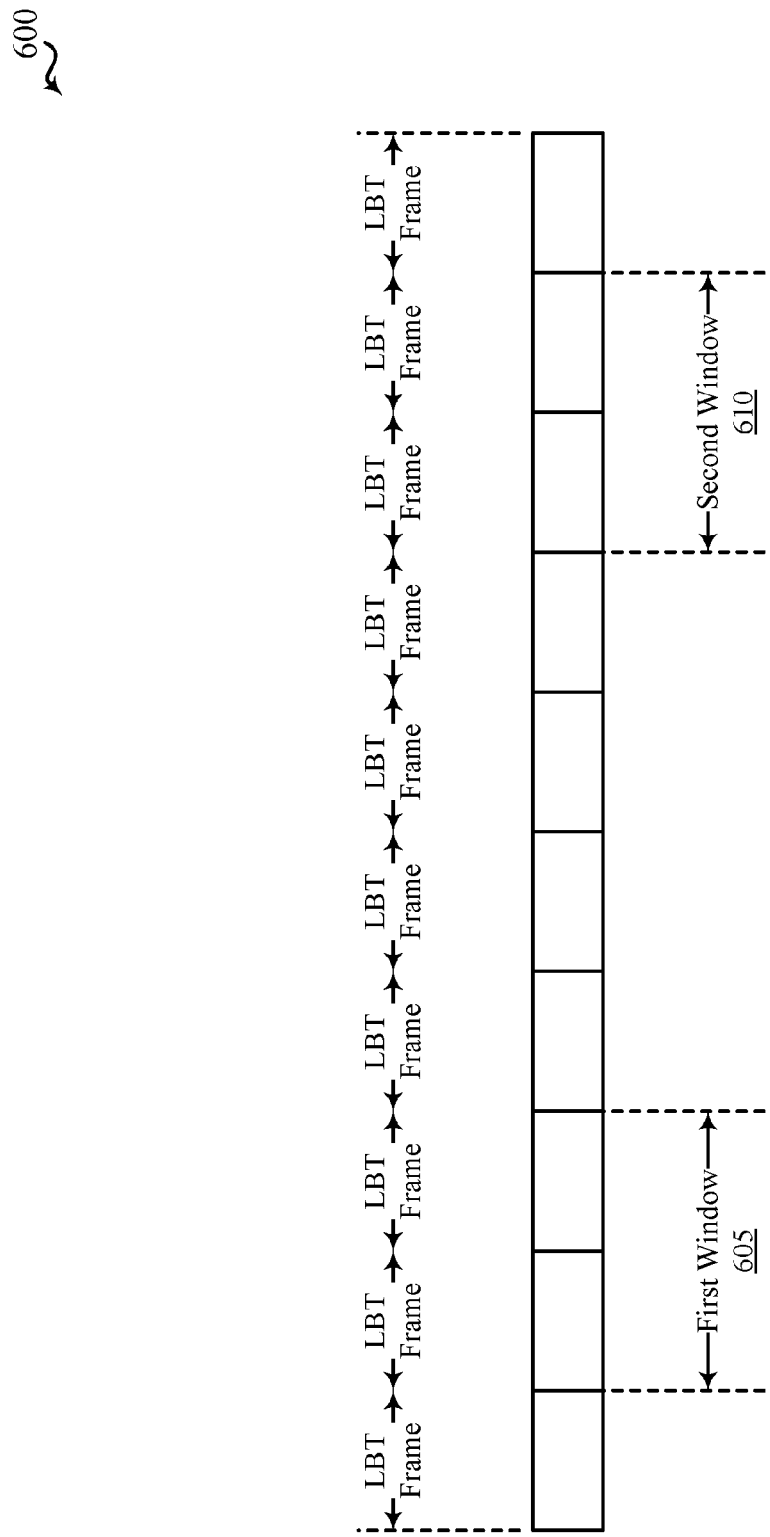
FIG. 6 shows an example progression of frames (e.g., LBT frames) in an unlicensed radio frequency spectrum band, in accordance with various aspects of the present disclosure.

FIG. 6 shows an example progression of frames 600 (e.g., LBT frames) in an unlicensed radio frequency spectrum band, in accordance with various aspects of the present disclosure. By way of example, the progression of frames 600 may correspond to an MCCH modification period. Within the modification period, and by way of example, a first window 605 and a second window 610 may be defined. A first instance of an MCCH change notification may be transmitted by a base station in any one of the frames of the first window 605, and a second instance of the MCCH change notification may be transmitted by a base station in any one of the frames of the second window 610.

A change in the specification of the LTE/LTE-A MBMS-NotificationConfig Information Element may be made to accommodate the eMBMS deployment examples that utilize a window of a plurality of frames. The change may be as follows:

```
-- ASN1START
MBMS-NotificationConfig-r9 ::=          SEQUENCE {
    notificationRepetitionCoeff-r9      ENUMERATED {n2, n4},
    notificationOffset-r9               INTEGER (0..10),
    notificationSF-Index-r9             INTEGER (1..6)
    notificationWindowLength            INTEGER (1..M)
}
--ASN1STOP
``` where the variable notificationWindowLength may be used to define the length of a window of a plurality of frames for which a UE may need to monitor an unlicensed radio frequency spectrum band during an MCCH modification period.

Although the above-described examples for transmitting a signal over an unlicensed radio frequency spectrum band have been described in the context of an MCCH change notification, the principles may also be applied to the transmission of other types of signals, such as paging instances. For example, there may be times when a paging instance cannot be transmitted over an unlicensed radio frequency spectrum band because the unlicensed radio frequency spectrum is unavailable. Using the techniques described herein, the paging instance may be transmitted during a next available frame of the unlicensed radio frequency band. In some examples, the delayed transmission of the paging instance may use the same subframe index specified for the initially scheduled paging instance. To minimize UE power consumption on paging monitoring in this example, a window of a plurality of frames may be configured, and a UE may be configured to only monitor the unlicensed radio frequency spectrum band for the paging instance during the window of the plurality of frames. In some examples, the UE may monitor the unlicensed radio frequency spectrum band until the end of the window of the plurality of frames is reached or until the paging instance is detected, whichever occurs first. In some examples, a UE monitoring the unlicensed radio frequency spectrum band for the paging instance may perform a blind detection of a base station's transmissions (e.g., a blind detection of the base station's CUBS transmissions) within the window, and enter a power saving mode for frames in which no CUBS transmission is detected. When a UE fails to detect a CUBS transmission of the base station for all of the frames of the window of the plurality of frames, the UE may monitor the unlicensed radio frequency spectrum band for a next paging instance.

In some examples, each of a plurality of paging instances may be scheduled for transmission during a respective window of a plurality of frames of the unlicensed radio frequency spectrum band. The length of the windows may be spaced apart in time and may be configured to minimize UE power consumption. Within a window of a plurality of frames, a UE may continue to monitor for a paging instance transmitted to the UE, until such time that the UE detects the paging instance or the end of the window of the plurality of frames is reached.

In yet another example, paging instances for multiple groups of devices may be scheduled within a window of a plurality of frames. In this manner, when a paging instance for a UE cannot be transmitted due to unavailability of an unlicensed radio frequency spectrum band, the UE may read a paging instance for another UE and acquire paging information without incurring a delay longer than the length of the window of the plurality of frames.

In yet another example, when paging instances for multiple groups of devices are scheduled within a window of a plurality of frames, each paging instance may be transmitted within a smaller window (e.g., a sub-window) within the window of the plurality of frames. In this manner, when a paging instance for a UE cannot be transmitted due to unavailability of an unlicensed radio frequency spectrum band, the UE may first monitor the subsequent frames in the smaller window for its own paging instance. When the UE cannot find its own paging instance, it may then read a paging instance for another UE and acquire paging information without incurring a delay longer than the length of the window of the plurality of frames.

Figure 7:
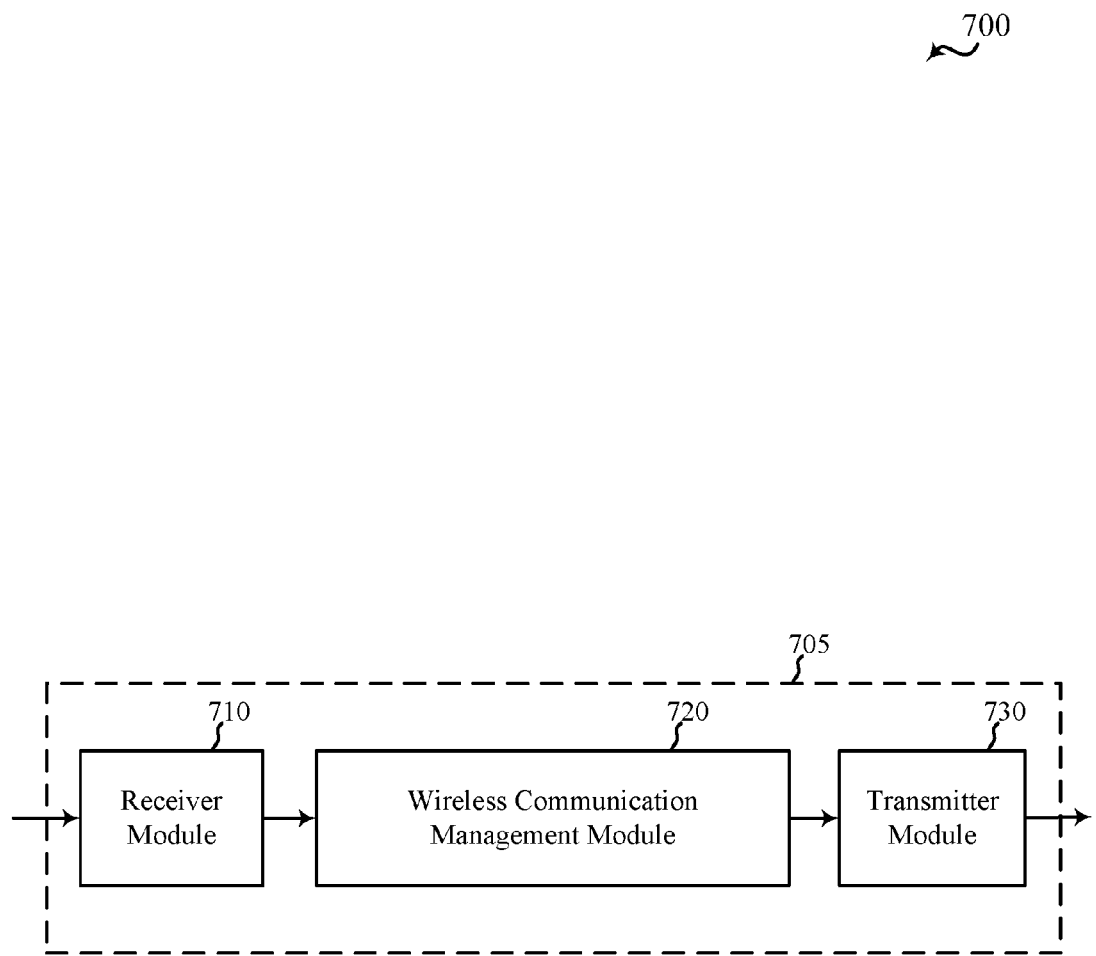
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the base stations 105, 205, and/or 205-a described with reference to FIGS. 1 and/or 2, or an example of aspects of one or more of the UEs 115, 215-a, 215-b, and/or 215-c described with reference to FIGS. 1 and/or 2. The apparatus 705 may also be a processor. The apparatus 705 may include a receiver module 710, a wireless communication management module 720, and/or a transmitter module 730. Each of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 710 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 730 may include at least one RF transmitter, such as at least one RF transmitter operable to transmit over the licensed radio frequency spectrum band and/or the unlicensed radio frequency spectrum band. The transmitter module 730 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the apparatus 705 may be configured as a base station and the wireless communication management module 720 may be used to determine a pattern of signal transmissions for transmitting instances of a signal in a time period of the unlicensed radio frequency spectrum band; determine whether the unlicensed radio frequency spectrum band is unavailable to transmit at least one instance of the signal; and change, in response to determining the unlicensed radio frequency spectrum band is unavailable to transmit an instance of the signal, the pattern of signal transmissions for the time period.

In some examples, the apparatus 705 may be configured as a UE and the wireless communication management module 720 may be used to monitor a first frame in a time period of an unlicensed radio frequency spectrum band for transmission of an instance of a signal in a pattern of signal transmissions for the time period; determine the instance of the signal was not transmitted during the first frame of the unlicensed radio frequency spectrum band due to unavailability of the unlicensed radio frequency spectrum band; and monitor a second frame in the time period in the unlicensed radio frequency spectrum band for the transmission of the instance of the signal. The second frame may be monitored in response to determining the instance of the signal was not transmitted during the first frame due to unavailability of the unlicensed radio frequency spectrum band. Transmission of the instance of the signal during the second frame may be based on a change in the pattern of signal transmissions for the time period.

In some examples, the apparatus 705 may be configured as a base station and the wireless communication management module 720 may be used to determine a reference signal pattern from a plurality of reference signal patterns based at least in part on whether a plurality of transmission time intervals are bundled; and signal the determined reference signal pattern to a device.

In some examples, the apparatus 705 may be configured as a UE and the wireless communication management module 720 may be used to receive signaling indicating whether a plurality of transmission time intervals are bundled; and receive a reference signal distributed over each of the plurality of transmission time intervals when the plurality of transmission time intervals are bundled.

Figure 8:
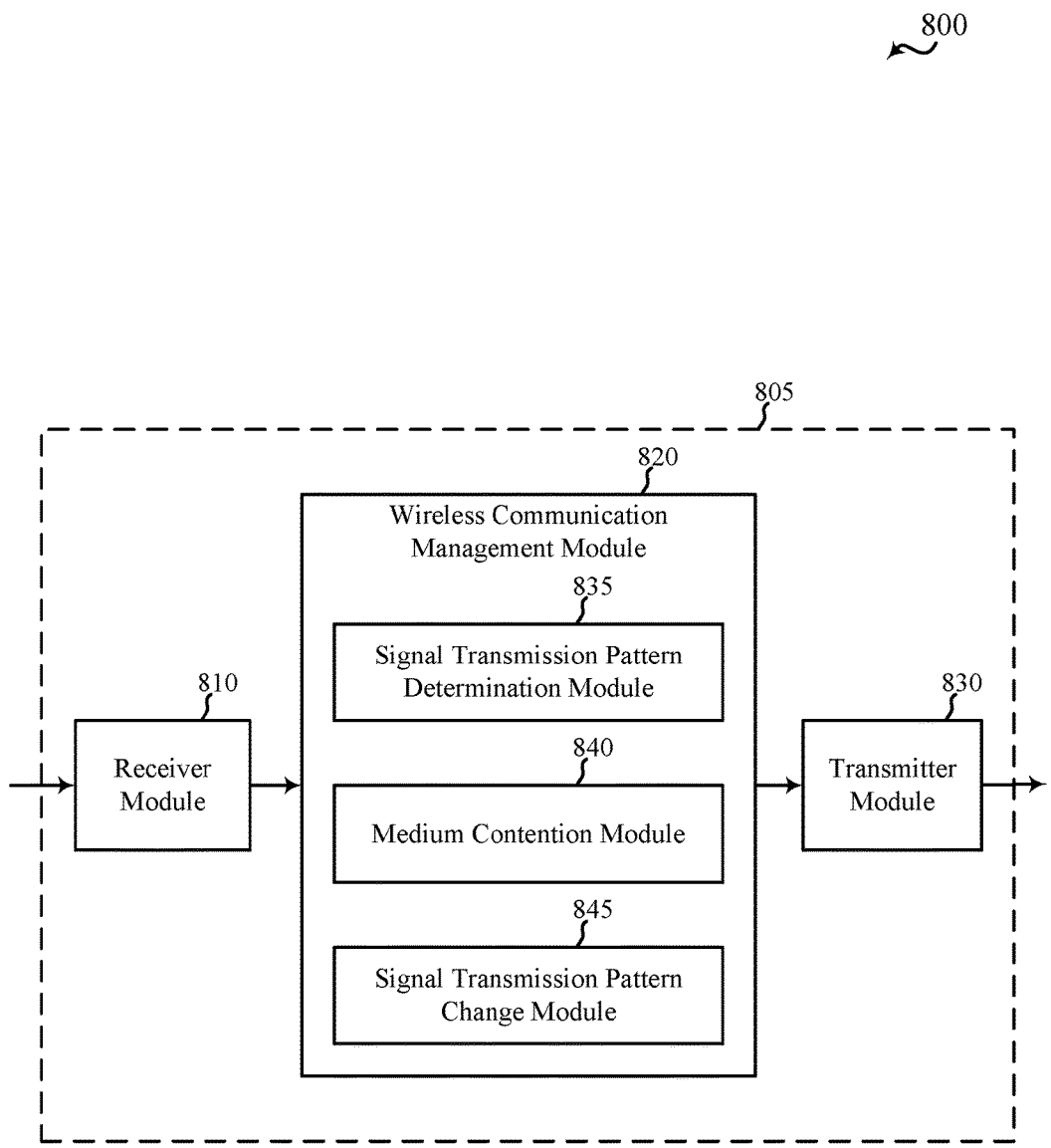
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the base stations 105, 205, and/or 205-a described with reference to FIGS. 1 and/or 2, and/or an example of aspects of the apparatus 705 described with reference to FIG. 7. The apparatus 805 may also be a processor. The apparatus 805 may include a receiver module 810, a wireless communication management module 820, and/or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may be an example of one or more aspects of the receiver module 710 described with reference to FIG. 7. In some examples, the receiver module 810 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 810 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 830 may be an example of one or more aspects of the transmitter module 730 described with reference to FIG. 7. In some examples, the transmitter module 830 may include at least one RF transmitter, such as at least one RF transmitter operable to transmit over the licensed radio frequency spectrum band and/or the unlicensed radio frequency spectrum band. The transmitter module 830 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 820 may be an example of one or more aspects of the wireless communication management module 720 described with reference to FIG. 7. The wireless communication management module 820 may include a signal transmission pattern determination module 835, a medium contention module 840, and/or a signal transmission pattern change module 845. Each of these components may be in communication with each other.

In some examples, the signal transmission pattern determination module 835 may be used to determine a pattern of signal transmissions for transmitting instances of a signal in a time period of the unlicensed radio frequency spectrum band. In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus 805 may notify at least one other apparatus (e.g., at least one UE) of the determined pattern of signal transmissions.

In some examples, the medium contention module 840 may be used to determine whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable.

In some examples, the signal transmission pattern change module 845 may be used to change, in response to a determination by the medium contention module 840 that the unlicensed radio frequency spectrum band is unavailable to transmit an instance of the signal, the pattern of signal transmissions for the time period.

In some examples, the pattern of signal transmissions may include a first scheduled signal transmission and a second scheduled signal transmission. In these examples, changing the pattern of signal transmissions may include scheduling an additional signal transmission in the pattern of signal transmissions, during a frame of the unlicensed radio frequency spectrum band occurring between the first scheduled signal transmission and the second scheduled signal transmission.

In some examples, changing the pattern of signal transmissions may include increasing a number of scheduled signal transmissions increasing a number of scheduled transmissions in the pattern of signal transmissions for the time period. For example, a number of scheduled signal transmissions of an MCCH change notification may be increased from two or four scheduled signal transmissions to eight or sixteen scheduled signal transmissions.

In some examples, changing the pattern of signal transmissions may include adding to the pattern of signal transmissions a signal transmission as part of a CET in the time period.

In some examples, the changing the pattern of signal transmissions may include changing the pattern of signal transmissions to accommodate the unlicensed radio frequency spectrum band being unavailable to transmit each of a plurality of instances of the signal.

Figure 9:
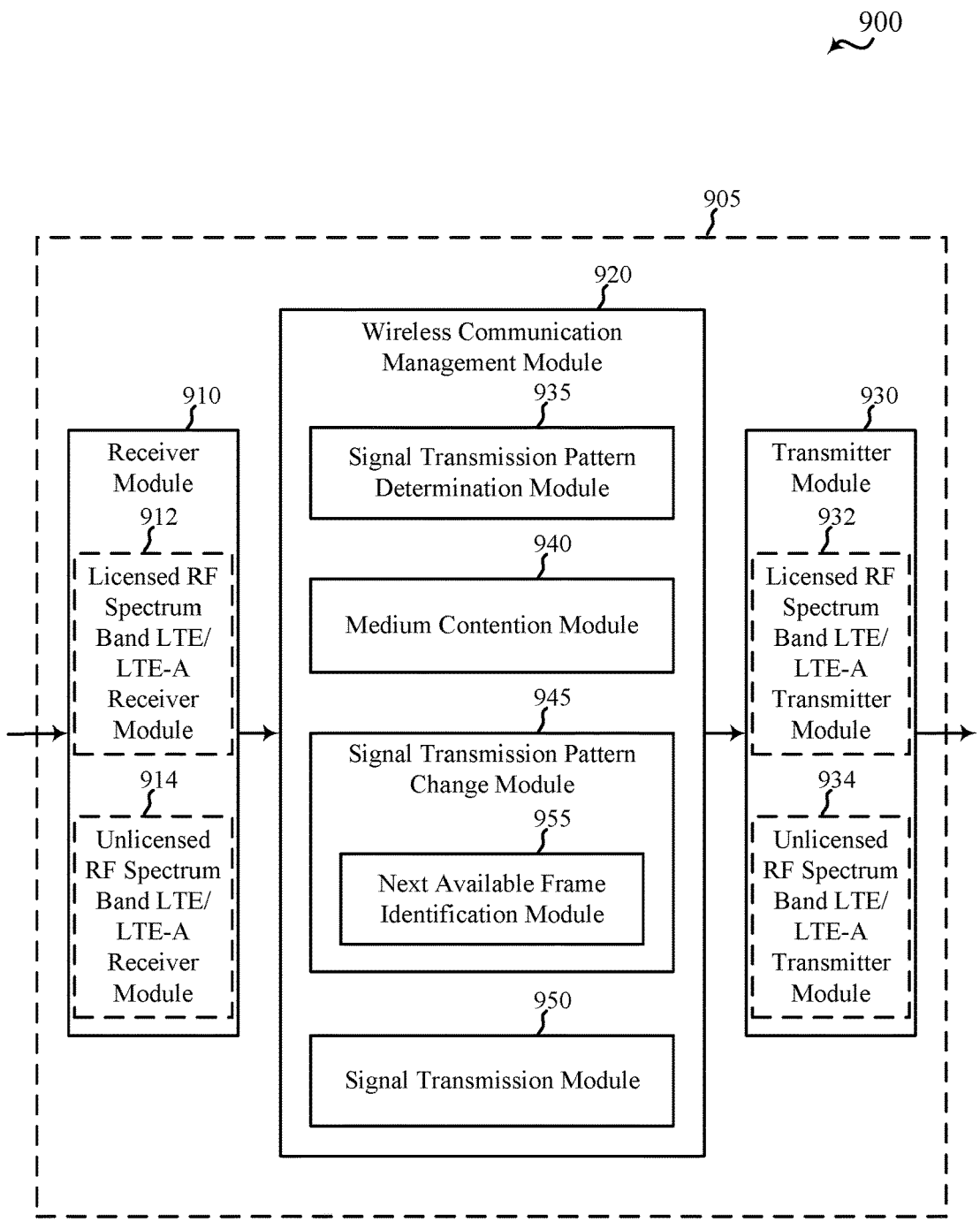
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, and/or 205-a described with reference to FIGS. 1 and/or 2, and/or an example of aspects of one or more of the apparatuses 705 and/or 805 described with reference to FIGS. 7 and/or 8. The apparatus 905 may also be a processor. The apparatus 905 may include a receiver module 910, a wireless communication management module 920, and/or a transmitter module 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may be an example of one or more aspects of the receiver module 710 and/or 810 described with reference to FIGS. 7 and/or 8. In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 910 may in some cases include separate receivers for the licensed radio frequency spectrum band and the unlicensed radio frequency spectrum band. The separate receivers may, in some examples, take the form of a licensed RF spectrum band LTE/LTE-A receiver module 912 for communicating over the licensed radio frequency spectrum band, and an unlicensed RF spectrum band LTE/LTE-A receiver module 914 for communicating over the unlicensed radio frequency spectrum band. The receiver module 910, including the licensed RF spectrum band LTE/LTE-A receiver module 912 and/or the unlicensed RF spectrum band LTE/LTE-A receiver module 914, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 930 may be an example of one or more aspects of the transmitter module 730 and/or 830 described with reference to FIGS. 7 and/or 8. In some examples, the transmitter module 930 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 930 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 932 for communicating over the licensed radio frequency spectrum band, and an unlicensed RF spectrum band LTE/LTE-A transmitter module 934 for communicating over the unlicensed radio frequency spectrum band. The transmitter module 930, including the licensed RF spectrum band LTE/LTE-A transmitter module 932 and/or the unlicensed RF spectrum band LTE/LTE-A transmitter module 934, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 920 may be an example of one or more aspects of the wireless communication management module 720 and/or 820 described with reference to FIGS. 7 and/or 8. The wireless communication management module 920 may include a signal transmission pattern determination module 935, a medium contention module 940, a signal transmission pattern change module 945, and/or a signal transmission module 950. Each of these components may be in communication with each other.

In some examples, the signal transmission pattern determination module 935 may be used to determine a pattern of signal transmissions for transmitting instances of a signal in a time period of the unlicensed radio frequency spectrum band. In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus 905 may notify at least one other apparatus (e.g., at least one UE) of the determined pattern of signal transmissions.

In some examples, the medium contention module 940 may be used to determine whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable.

In some examples, the signal transmission pattern change module 945 may be used to change, in response to a determination by the medium contention module 940 that the unlicensed radio frequency spectrum band is unavailable to transmit an instance of the signal, the pattern of signal transmissions for the time period. In some examples, the signal transmission pattern change module 945 may include a next available frame identification module 955. The next available frame identification module 955 may be used to identify, in response to the determining the unlicensed radio frequency spectrum band is unavailable to transmit the instance of the signal, a next available frame in the time period for transmission of the instance of the signal. The next available frame may be identified as such based on the medium contention module 940 successfully contending for access to the frame.

In some examples, the signal transmission module 950 may be used to transmit instances of the signal in accordance with the pattern of signal transmissions determined by the signal transmission pattern determination module 935, as changed by the signal transmission pattern change module 945, and subject to the medium contention module 940 successfully contending for access to the frames in which the instances of the signal are to be transmitted.

In some examples, a subframe index employed for transmitting the instance of the signal during a frame that is not transmitted (e.g., due to unavailability of the unlicensed radio frequency spectrum band) may also be employed for transmitting the instance of the signal during the next available frame.

In some examples, the pattern of signal transmissions may include a first scheduled signal transmission and a second scheduled signal transmission. In these examples, changing the pattern of signal transmissions may include scheduling an additional signal transmission in the pattern of signal transmissions, during a frame of the unlicensed radio frequency spectrum band occurring between the first scheduled signal transmission and the second scheduled signal transmission.

In some examples, changing the pattern of signal transmissions may include changing the pattern of signal transmissions to accommodate the unlicensed radio frequency spectrum band being unavailable to transmit each of a plurality of instances of the signal.

Figure 10:
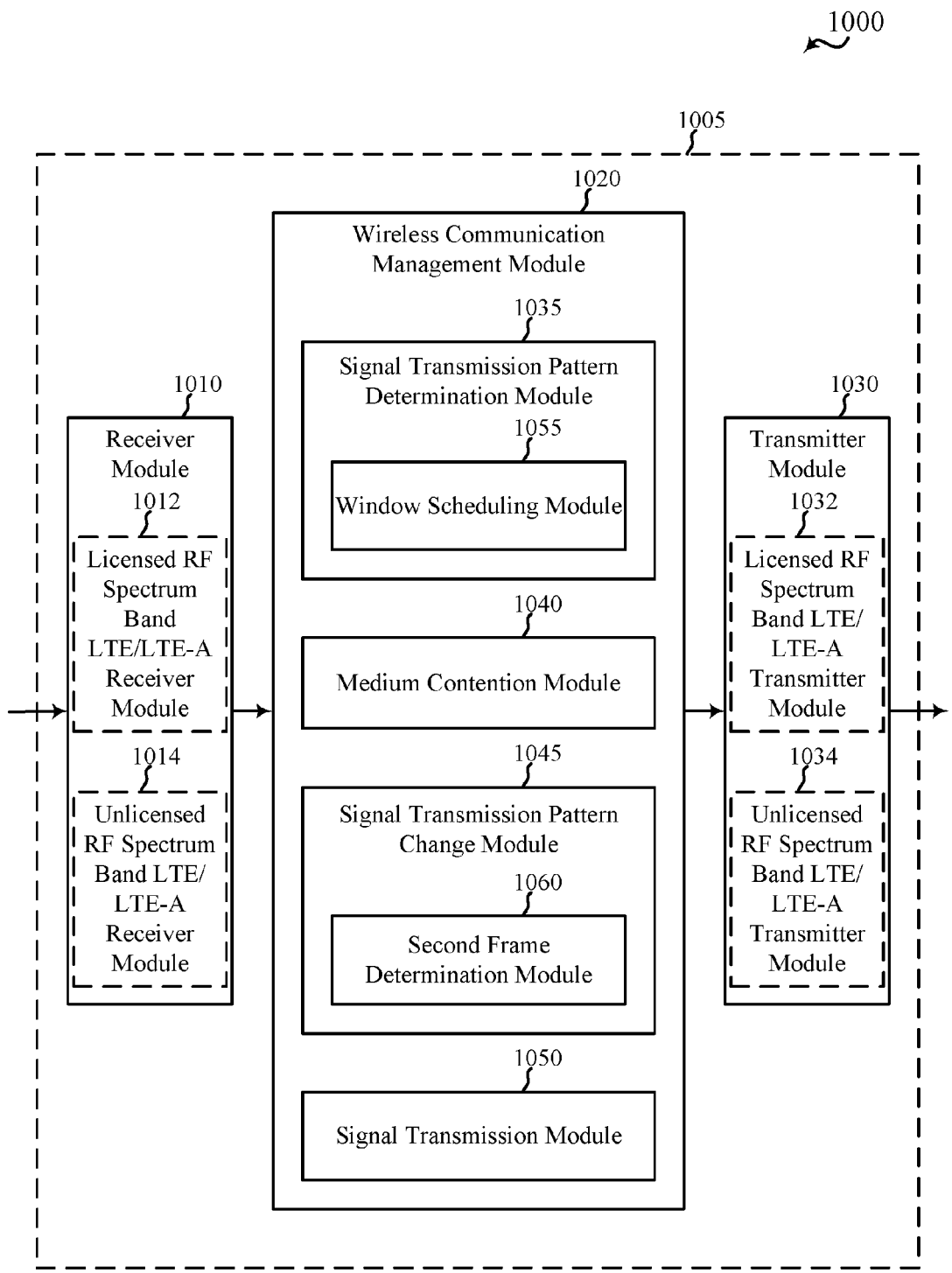
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 205, and/or 205-*a* described with reference to FIGS. 1 and/or 2, and/or an example of aspects of one or more of the apparatuses 705 and/or 805 described with reference to FIGS. 7 and/or 8. The apparatus 1005 may also be a processor. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may be an example of one or more aspects of the receiver module 710 and/or 810 described with reference to FIGS. 7 and/or 8. In some examples, the receiver module 1010 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 1010 may in some cases include separate receivers for the licensed radio frequency spectrum band and the unlicensed radio frequency spectrum band. The separate receivers may, in some examples, take the form of a licensed RF spectrum band LTE/LTE-A receiver module 1012 for communicating over the licensed radio frequency spectrum band, and an unlicensed RF spectrum band LTE/LTE-A receiver module 1014 for communicating over the unlicensed radio frequency spectrum band. The receiver module 1010, including the licensed RF spectrum band LTE/LTE-A receiver module 1012 and/or the unlicensed RF spectrum band LTE/LTE-A receiver module 1014, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1030 may be an example of one or more aspects of the transmitter module 730 and/or 830 described with reference to FIGS. 7 and/or 8. In some examples, the transmitter module 1030 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 1030 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1032 for communicating over the licensed radio frequency spectrum band, and an unlicensed RF spectrum band LTE/LTE-A transmitter module 1034 for communicating over the unlicensed radio frequency spectrum band. The transmitter module 1030, including the licensed RF spectrum band LTE/LTE-A transmitter module 1032 and/or the unlicensed RF spectrum band LTE/LTE-A transmitter module 1034, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1020 may be an example of one or more aspects of the wireless communication management module 720 and/or 820 described with reference to FIGS. 7 and/or 8. The wireless communication management module 1020 may include a signal transmission pattern determination module 1035, a medium contention module 1040, a signal transmission pattern change module 1045, and/or a signal transmission module 1050. Each of these components may be in communication with each other.

In some examples, the signal transmission pattern determination module 1035 may be used to determine a pattern of signal transmissions for transmitting instances of a signal in a time period of the unlicensed radio frequency spectrum band. In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus 1005 may notify at least one other apparatus (e.g., at least one UE) of the determined pattern of signal transmissions.

In some examples, determining the pattern of signal transmissions may include initially scheduling a transmission of an instance of the signal during a frame in a window of a plurality of frames in the time period. In some examples, the transmission of the instance of the signal may be initially scheduled in a first frame in the window of the plurality of frames (e.g., a temporally first frame in the window of the plurality of frames). In other examples, the signal transmission may be initially scheduled in a frame other than the first frame in the window of the plurality of frames (e.g., not in the temporally first frame in the window of the plurality of frames). In some examples, the transmission of the instance of the signal may be initially scheduled in the window of the plurality of frames based on at least one of a processing load and/or a traffic load. In some examples, the length of the window of the plurality of frames may be sized to minimize UE power consumption. In some examples, each of a number of different signal transmissions in the pattern of signal transmissions may be scheduled in a respective different window of a plurality of frames in the time period. The scheduling of signal transmissions within a window of a plurality of frames may in some examples be undertaken by a window scheduling module 1055 of the signal transmission pattern determination module 1035.

In some examples, the medium contention module 1040 may be used to determine whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable.

In some examples, the signal transmission pattern change module 1045 may be used to change, in response to a determination by the medium contention module 1040 that the unlicensed radio frequency spectrum band is unavailable to transmit an instance of the signal, the pattern of signal transmissions for the time period. In some examples, the signal transmission pattern change module 1045 may include a second frame identification module 1060. The second frame identification module 1060 may be used to identify, in response to the determining the unlicensed radio frequency spectrum band is unavailable to transmit the instance of the signal, a second frame in window of the plurality of frames for transmission of the instance of the signal.

In some examples, the signal transmission module 1050 may be used to transmit instances of the signal in accordance with the pattern of signal transmissions determined by the signal transmission pattern determination module 1035, as changed by the signal transmission pattern change module 1045, and subject to the medium contention module 1040 successfully contending for access to the frames in which the instances of the signal are to be transmitted.

In some examples, a subframe index employed for transmitting the instance of the signal during a frame that is not transmitted (e.g., due to unavailability of the unlicensed radio frequency spectrum band) may also be employed for transmitting the instance of the signal during the second frame in the window of the plurality of frames.

In some examples, the pattern of signal transmissions may include a first scheduled signal transmission and a second scheduled signal transmission. In these examples, changing the pattern of signal transmissions may include scheduling an additional signal transmission in the pattern of signal transmissions, during a frame of the unlicensed radio frequency spectrum band occurring between the first scheduled signal transmission and the second scheduled signal transmission. Also in these examples, the length of a first window of a plurality of frames corresponding to the first scheduled signal transmission may be sized to not overlap the second scheduled signal transmission and/or a second window of a plurality of frames corresponding to the second scheduled signal transmission.

In some examples, the window of the plurality of frames in which transmission of the instance of the signal is scheduled may include scheduled paging instances for multiple groups of devices (e.g., UEs). In these examples, a UE that misses reading its own paging instance may read a paging instance of another UE without occurring additional delay (e.g., delay longer than the length of the window of the plurality of frames).

In some examples, changing the pattern of signal transmissions may include changing the pattern of signal transmissions to accommodate the unlicensed radio frequency spectrum band being unavailable to transmit each of a plurality of instances of the signal.

Figure 11:
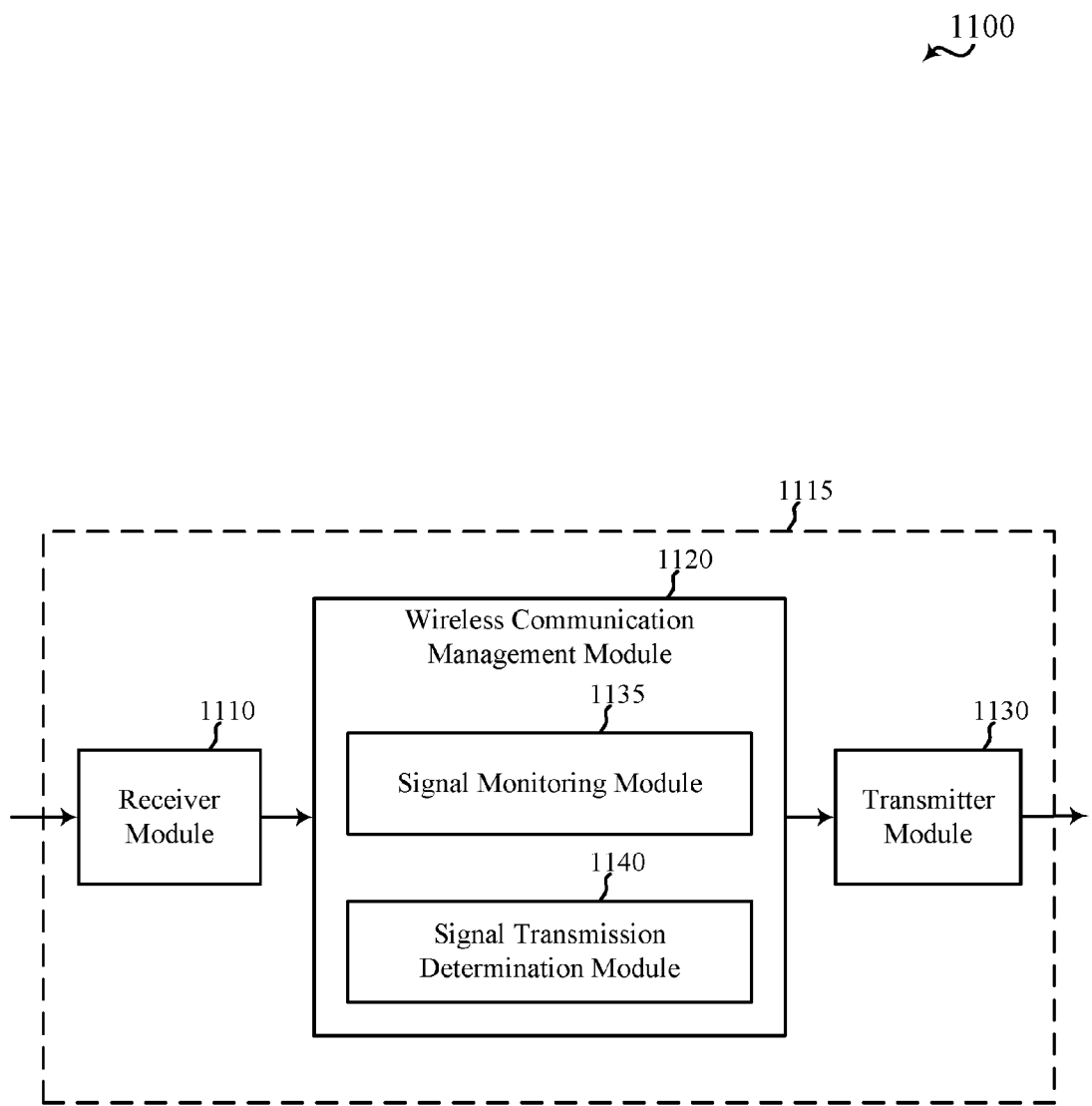
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, 215-a, 215-b, and/or 215-c described with reference to FIGS. 1 and/or 2, and/or an example of aspects of the apparatus 705 described with reference to FIG. 7. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be an example of one or more aspects of the receiver module 710 described with reference to FIG. 7. In some examples, the receiver module 1110 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 1110 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1130 may be an example of one or more aspects of the transmitter module 730 described with reference to FIG. 7. In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1120 may be an example of one or more aspects of the wireless communication management module 720 described with reference to FIG. 7. The wireless communication management module 1120 may include a signal monitoring module 1135, and/or a signal transmission determination module 1140. Each of these components may be in communication with each other.

In some examples, the signal monitoring module 1135 may be used to monitor a first frame in a time period of the unlicensed radio frequency spectrum band for transmission of an instance of a signal in a pattern of signal transmissions for the time period. In some examples, the signal may include an MCCH change notification or a paging instance. In some examples, the time period may include a plurality of contiguous frames of the unlicensed radio frequency spectrum band. In some examples, the time period may include an MCCH modification period. In some examples, the apparatus 1115 may receive a notification of the determined pattern of signal transmissions from another apparatus (e.g., from a base station).

In some examples, the signal transmission determination module 1140 may be used to determine the instance of the signal was not transmitted during the first frame of the unlicensed radio frequency spectrum band due to unavailability of the unlicensed radio frequency spectrum band. In some examples, it may be determined that the instance of the signal was not transmitted during the first frame due to unavailability of the unlicensed radio frequency spectrum band based at least in part on a blind detection of a first CUBS for the first frame. More specifically, it may be determined that the instance of the signal was not transmitted during the first frame due to unavailability of the unlicensed radio frequency spectrum band when the first CUBS for the first frame is not detected.

In some examples, the signal monitoring module 1135 may also be used to monitor a second frame in the time period of the unlicensed radio frequency spectrum band for the transmission of the instance of the signal, in response to determining the instance of the signal was not transmitted during the first frame due to unavailability of the unlicensed radio frequency spectrum band. Transmission of the instance of the signal during the second frame may be based on a change (e.g., a change made by a base station) in the pattern of signal transmissions for the time period.

In some examples, the wireless communication management module 1120 may detect a transmission of the instance of the signal in the second frame of the unlicensed radio frequency spectrum band. In some examples, the wireless communication management module 1120 may detect a transmission of the instance of the signal in a frame received subsequent to the second frame. In some examples, the wireless communication management module 1120 may detect a transmission of another instance of the signal. In some examples, the wireless communication management module 1120 may not detect a transmission of the signal for the time period. In these latter examples, the wireless communication management module 1120 may reacquire an MCCH in a next time period of the unlicensed radio frequency spectrum band.

In some examples, the change in the pattern of signal transmissions may include a transmission of the instance of the signal as part of a CET in the time period. In some examples, the wireless communication management module 1120 may detect the transmission of the instance of the signal as part of a CET in the time period.

Figure 12:
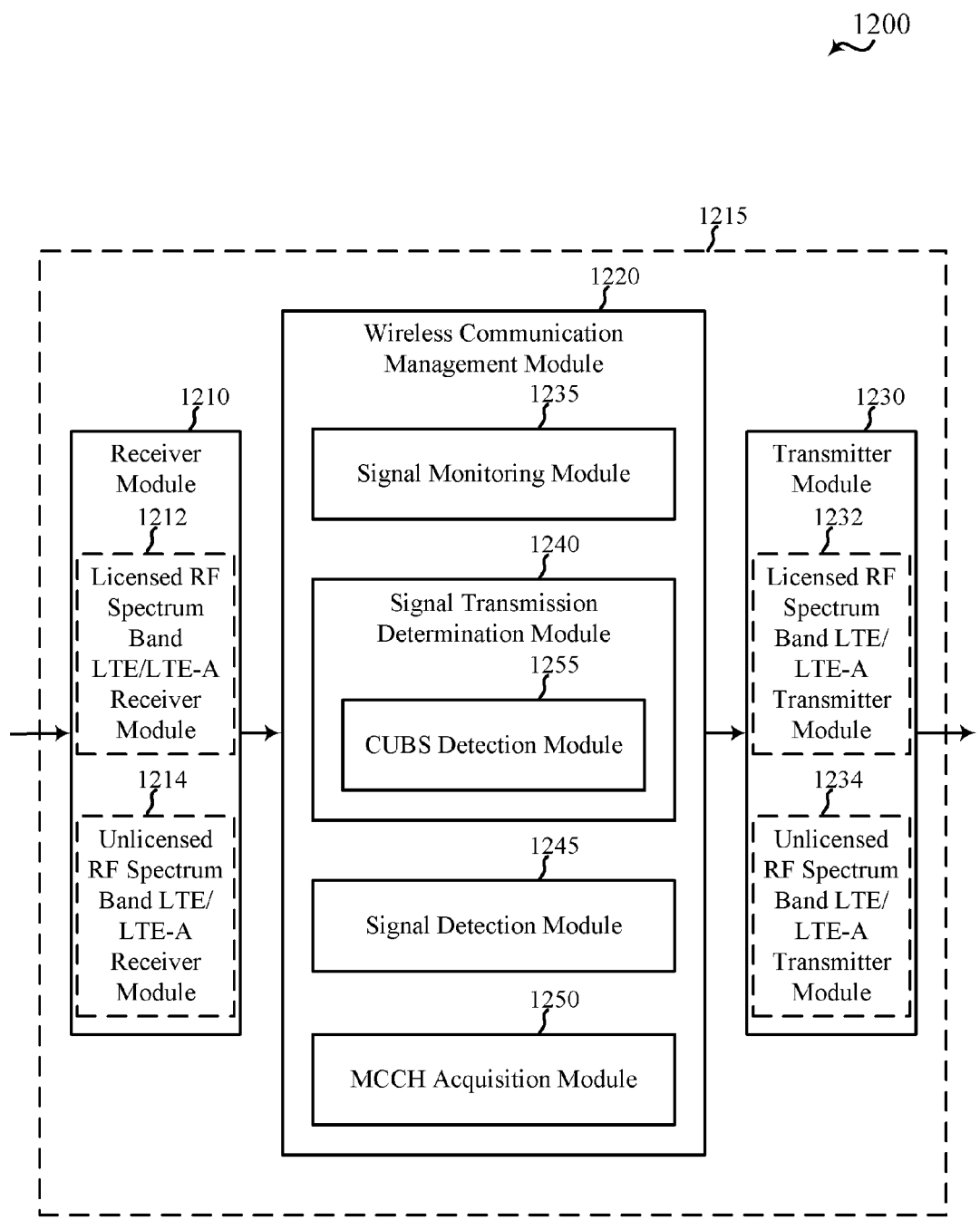
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. In some examples, the apparatus 1215 may be an example of aspects of one or more of the UEs 115, 215, 215-a, 215-b, and/or 215-c described with reference to FIGS. 1 and/or 2, and/or an example of aspects of one or more of the apparatuses 705 and/or 1105 described with reference to FIGS. 7 and/or 11. The apparatus 1215 may also be a processor. The apparatus 1215 may include a receiver module 1210, a wireless communication management module 1220, and/or a transmitter module 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be an example of one or more aspects of the receiver module 710 and/or 1110 described with reference to FIGS. 7 and/or 11. In some examples, the receiver module 1210 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 1210 may in some cases include separate receivers for the licensed radio frequency spectrum band and the unlicensed radio frequency spectrum band. The separate receivers may, in some examples, take the form of a licensed RF spectrum band LTE/LTE-A receiver module 1212 for communicating over the licensed radio frequency spectrum band, and an unlicensed RF spectrum band LTE/LTE-A receiver module 1214 for communicating over the unlicensed radio frequency spectrum band. The receiver module 1210, including the licensed RF spectrum band LTE/LTE-A receiver module 1212 and/or the unlicensed RF spectrum band LTE/LTE-A receiver module 1214, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1230 may be an example of one or more aspects of the transmitter module 730 and/or 1130 described with reference to FIGS. 7 and/or 11. In some examples, the transmitter module 1230 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 1230 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1232 for communicating over the licensed radio frequency spectrum band, and an unlicensed RF spectrum band LTE/LTE-A transmitter module 1234 for communicating over the unlicensed radio frequency spectrum band. The transmitter module 1230, including the licensed RF spectrum band LTE/LTE-A transmitter module 1232 and/or the unlicensed RF spectrum band LTE/LTE-A transmitter module 1234, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1220 may be an example of one or more aspects of the wireless communication management module 720 and/or 1120 described with reference to FIGS. 7 and/or 11. The wireless communication management module 1220 may include a signal monitoring module 1235, a signal transmission determination module 1240, a signal detection module 1245, and/or an MCCH acquisition module 1250. Each of these components may be in communication with each other.

In some examples, the signal monitoring module 1235 may be used to monitor a first frame in a time period of the unlicensed radio frequency spectrum band for transmission of an instance of a signal in a pattern of signal transmissions for the time period. In some examples, the signal may include an MCCH change notification or a paging instance. In some examples, the time period may include a plurality of contiguous frames of the unlicensed radio frequency spectrum band. In some examples, the time period may include an MCCH modification period. In some examples, the apparatus 1215 may receive a notification of the determined pattern of signal transmissions from another apparatus (e.g., from a base station).

In some examples, the signal transmission determination module 1240 may be used to determine whether the instance of the signal was not transmitted during the first frame of the unlicensed radio frequency spectrum band due to unavailability of the unlicensed radio frequency spectrum band. In some examples, the signal transmission determination module 1240 may include a CUBS detection module 1255. The CUBS detection module 1255 may be used to determine whether the instance of the signal was not transmitted during the first frame due to unavailability of the unlicensed radio frequency spectrum band based at least in part on a blind detection of a first CUBS for the first frame. More specifically, the CUBS detection module 1255 may determine, when the first CUBS for the first frame is not detected, that the instance of the signal was not transmitted during the first frame due to unavailability of the unlicensed radio frequency spectrum band. Upon determining the instance of the signal was not transmitted during the first frame, the signal transmission determination module 1240 may cause the signal monitoring module 1235 to monitor a second frame. Otherwise, the signal transmission determination module 1240 may cause the signal detection module 1245 to perform signal detection on the first frame. The second frame need not be contiguous with the first frame.

In some examples, the signal monitoring module 1235 may also be used to monitor the second frame in the time period of the unlicensed radio frequency spectrum band for the transmission of the instance of the signal, in response to determining the instance of the signal was not transmitted during the first frame due to unavailability of the unlicensed radio frequency spectrum band. Transmission of the instance of the signal during the second frame may be based on a change (e.g., a change made by a base station) in the pattern of signal transmissions for the time period.

In some examples, the signal transmission determination module 1240 may also be used to determine whether the instance of the signal was not transmitted during the second frame of the unlicensed radio frequency spectrum band due to unavailability of the unlicensed radio frequency spectrum band. In some examples, the CUBS detection module 1255 may be used to determine whether the instance of the signal was not transmitted during the second frame due to unavailability of the unlicensed radio frequency spectrum band based at least in part on a blind detection of a second CUBS for the second frame. More specifically, the CUBS detection module 1255 may determine, when the second CUBS for the second frame is not detected, that the instance of the signal was not transmitted during the second frame due to unavailability of the unlicensed radio frequency spectrum band. Upon determining the instance of the signal was not transmitted during the second frame, and upon determining the end of the time period has not been reached, the signal transmission determination module 1240 may cause the signal monitoring module 1235 to monitor at least one additional frame in the time period of the unlicensed radio frequency spectrum band for transmission of the instance of the signal and/or the transmission of another instance of the signal. Otherwise, the signal transmission determination module 1240 may cause the signal detection module 1245 to perform signal detection on the second frame.

In some examples, the signal detection module 1245 may be used to detect whether at least one instance of the signal has been transmitted. When it is determined that at least one instance of the signal has been transmitted, the signal detection module 1245 may cause the signal monitoring module 1235 to discontinue monitoring frames of the time period. When it is determined that at least one instance of the signal has not been transmitted, and that the end of the time period has been reached without detecting at least one instance of the signal, the signal detection module 1245 may cause the MCCH acquisition module 1250 to reacquire an MCCH during a next time period. When it is determined that at least one instance of the signal has not been transmitted, and that the end of the time period has not been reached, the signal detection module 1245 may perform various tasks, depending on the configuration of the signal detection module 1245. In one example, the signal detection module 1245 may cause the signal monitoring module 1235 to discontinue monitoring frames of the time period, under an assumption that if a CUBS was received for a frame but no instance of the signal was detected, the signal will not be transmitted during the time period. In another example, and when the end of the time period has not been reached, the signal detection module 1245 may cause the signal monitoring module 1235 to monitor an additional frame in the time period of the unlicensed radio frequency spectrum band for the transmission of the instance of the signal and/or the transmission of another instance of the signal.

In some examples, the MCCH acquisition module 1250 may be used to reacquire an MCCH.

Figure 13:
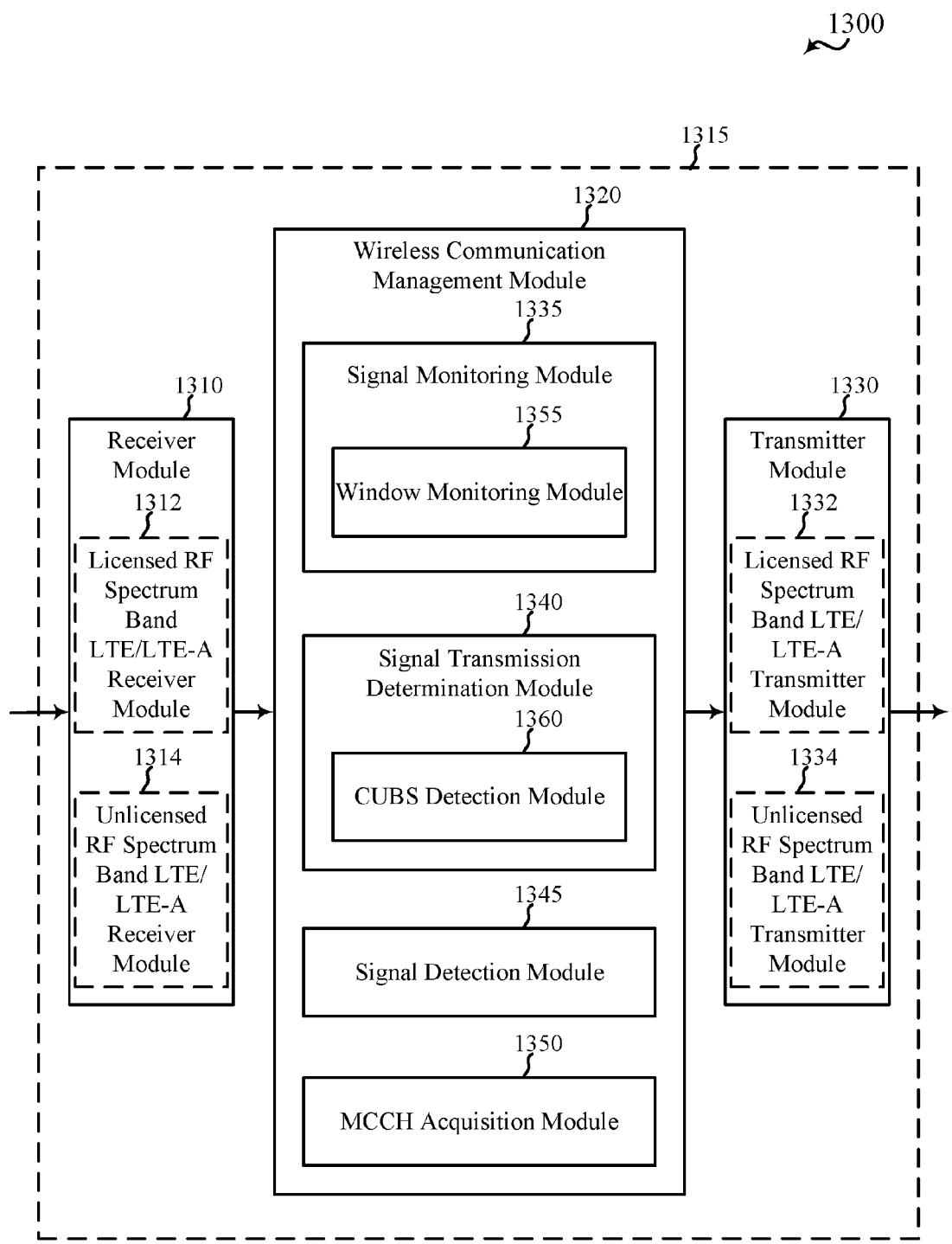
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. In some examples, the apparatus 1315 may be an example of aspects of one or more of the UEs 115, 215, 215-*a*, 215-*b*, and/or 215-*c* described with reference to FIGS. 1 and/or 2, and/or an example of aspects of one or more of the apparatuses 705 and/or 1105 described with reference to FIGS. 7 and/or 11. The apparatus 1315 may also be a processor. The apparatus 1315 may include a receiver module 1310, a wireless communication management module 1320, and/or a transmitter module 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be an example of one or more aspects of the receiver module 710 and/or 1110 described with reference to FIGS. 7 and/or 11. In some examples, the receiver module 1310 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 1310 may in some cases include separate receivers for the licensed radio frequency spectrum band and the unlicensed radio frequency spectrum band. The separate receivers may, in some examples, take the form of a licensed RF spectrum band LTE/LTE-A receiver module 1312 for communicating over the licensed radio frequency spectrum band, and an unlicensed RF spectrum band LTE/LTE-A receiver module 1314 for communicating over the unlicensed radio frequency spectrum band. The receiver module 1310, including the licensed RF spectrum band LTE/LTE-A receiver module 1312 and/or the unlicensed RF spectrum band LTE/LTE-A receiver module 1314, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1330 may be an example of one or more aspects of the transmitter module 730 and/or 1130 described with reference to FIGS. 7 and/or 11. In some examples, the transmitter module 1330 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 1330 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1332 for communicating over the licensed radio frequency spectrum band, and an unlicensed RF spectrum band LTE/LTE-A transmitter module 1334 for communicating over the unlicensed radio frequency spectrum band. The transmitter module 1330, including the licensed RF spectrum band LTE/LTE-A transmitter module 1332 and/or the unlicensed RF spectrum band LTE/LTE-A transmitter module 1334, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1320 may be an example of one or more aspects of the wireless communication management module 720 and/or 1120 described with reference to FIGS. 7 and/or 11. The wireless communication management module 1320 may include a signal monitoring module 1335, a signal transmission determination module 1340, a signal detection module 1345, and/or an MCCH acquisition module 1350. Each of these components may be in communication with each other.

In some examples, the signal monitoring module 1335 may be used to monitor a first frame in a time period of the unlicensed radio frequency spectrum band for transmission of an instance of a signal in a pattern of signal transmissions for the time period. In some examples, the signal may include an MCCH change notification or a paging instance. In some examples, the time period may include a plurality of contiguous frames of the unlicensed radio frequency spectrum band. In some examples, the time period may include an MCCH modification period. In some examples, the apparatus 1315 may receive a notification of the determined pattern of signal transmissions from another apparatus (e.g., from a base station).

In some examples, the signal transmission determination module 1340 may be used to determine whether the instance of the signal was not transmitted during the first frame of the unlicensed radio frequency spectrum band due to unavailability of the unlicensed radio frequency spectrum band. In some examples, the signal transmission determination module 1340 may include a CUBS detection module 1360. The CUBS detection module 1360 may be used to determine whether the instance of the signal was not transmitted during the first frame due to unavailability of the unlicensed radio frequency spectrum band based at least in part on a blind detection of a first CUBS for the first frame. More specifically, the CUBS detection module 1360 may determine, when the first CUBS for the first frame is not detected, that the instance of the signal was not transmitted during the first frame due to unavailability of the unlicensed radio frequency spectrum band. Upon determining the instance of the signal was not transmitted during the first frame, the signal transmission determination module 1340 may cause the signal monitoring module 1335 to monitor a second frame. Otherwise, the signal transmission determination module 1340 may cause the signal detection module 1345 to perform signal detection on the first frame. The first frame and the second frame may be frames in a window of a plurality of frames in the time period, but the second frame need not be contiguous with the first frame. In some examples, the signal monitoring module 1335 may include a window monitoring module 1355 for monitoring the bounds of the window.

In some examples, the signal monitoring module 1335 may also be used to monitor the second frame in the time period of the unlicensed radio frequency spectrum band for the transmission of the instance of the signal, in response to determining the instance of the signal was not transmitted during the first frame due to unavailability of the unlicensed radio frequency spectrum band. Transmission of the instance of the signal during the second frame may be based on a change (e.g., a change made by a base station) in the pattern of signal transmissions for the time period.

In some examples, the signal transmission determination module 1340 may also be used to determine whether the instance of the signal was not transmitted during the second frame of the unlicensed radio frequency spectrum band due to unavailability of the unlicensed radio frequency spectrum band. In some examples, the CUBS detection module 1360 may be used to determine whether the instance of the signal was not transmitted during the second frame due to unavailability of the unlicensed radio frequency spectrum band based at least in part on a blind detection of a second CUBS for the second frame. More specifically, the CUBS detection module 1360 may determine, when the second CUBS for the second frame is not detected, that the instance of the signal was not transmitted during the second frame due to unavailability of the unlicensed radio frequency spectrum band. Upon determining the instance of the signal was not transmitted during the second frame, and upon determining the end of the window of the plurality of frames has not been reached, the signal transmission determination module 1340 may cause the signal monitoring module 1335 to monitor at least one additional frame in the time period of the unlicensed radio frequency spectrum band for transmission of the instance of the signal. Otherwise, the signal transmission determination module 1340 may cause the signal detection module 1345 to perform signal detection on the second frame.

In some examples, the signal detection module 1345 may be used to detect whether at least one instance of the signal has been transmitted. When it is determined that at least one instance of the signal has been transmitted, the signal detection module 1345 may cause the signal monitoring module 1335 to discontinue monitoring frames of the time period. When it is determined that at least one instance of the signal has not been transmitted, and that the end of the window of the plurality of frames has been reached (as determined by the window monitoring module 1355) without detecting at least one instance of the signal, the signal detection module 1345 may cause the MCCH acquisition module 1350 to reacquire an MCCH during a next time period. When it is determined that at least one instance of the signal has not been transmitted, and that the end of the window of the plurality of frames has not been reached, the signal detection module 1345 may perform various tasks, depending on the configuration of the signal detection module 1345. In one example, the signal detection module 1345 may cause the signal monitoring module 1335 to discontinue monitoring frames of the time period, under an assumption that if a CUBS was received for a frame but no instance of the signal was detected, the signal will not be transmitted during the time period. In another example, and when the end of the window of the plurality of frames has not been reached, the signal detection module 1345 may cause the signal monitoring module 1335 to monitor an additional frame in the window of the plurality of frames for transmission of the instance of the signal.

In some examples, the MCCH acquisition module 1350 may be used to reacquire an MCCH.

In some examples, the change in the pattern of signal transmissions may include a transmission of the instance of the signal in a subsequent frame of the window of the plurality of frames.

In some examples, the first frame may not be the frame that is temporally first within the window of the plurality of frames.

In some examples, the change in the pattern of signal transmissions may include a transmission of the instance of the signal as part of a CET in the time period. In some examples, the signal detection module 1345 may detect the transmission of the instance of the signal as part of a CET in the time period.

In examples of the apparatus 1315 in which the signal includes a paging instance, the signal monitoring module 1335 may include monitoring the window of the plurality of frames for paging instances for multiple groups of devices, and acquiring paging information based at least in part on a paging instance associated with another device.

Figure 14:
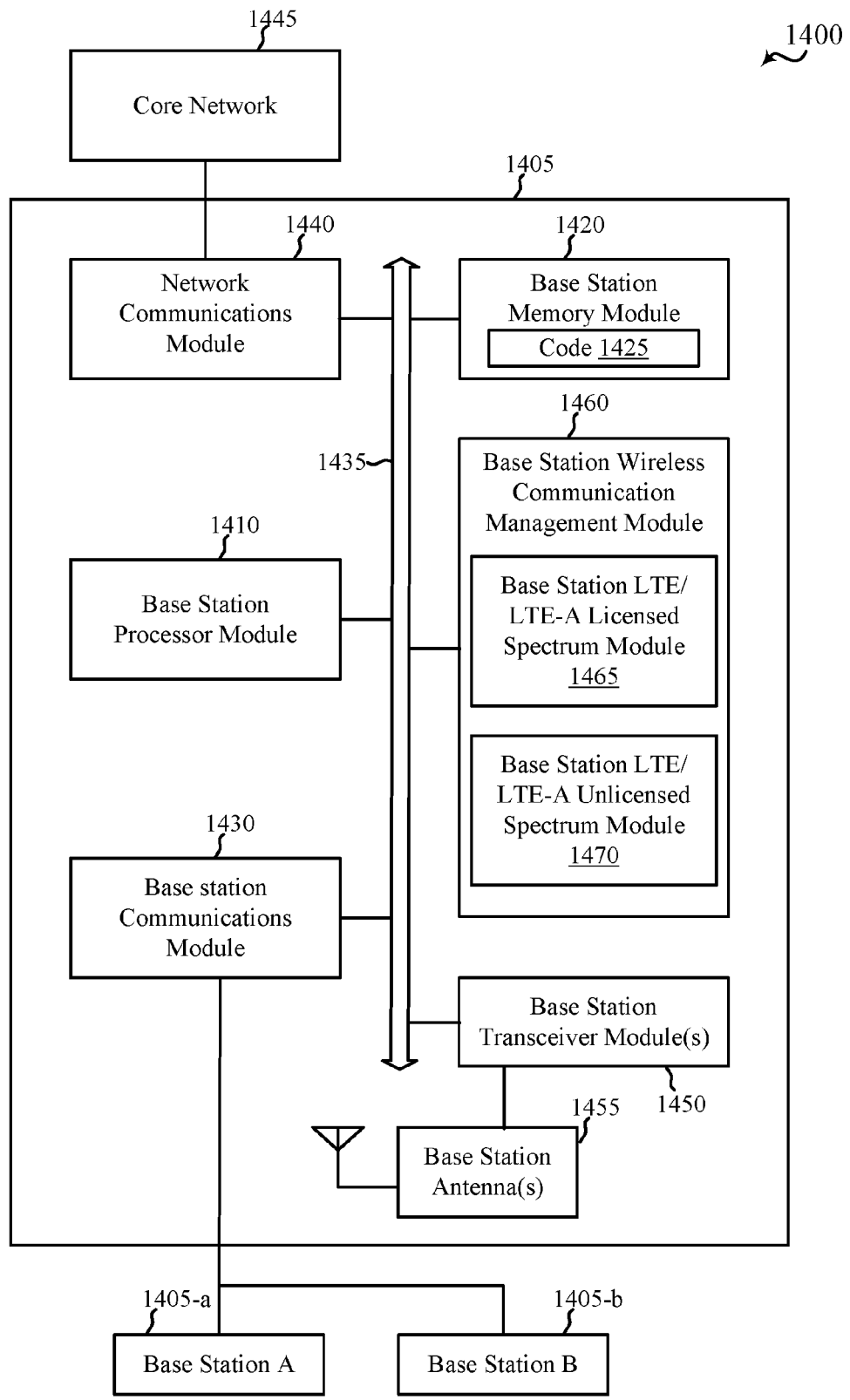
FIG. 14 shows a block diagram of a base station (e.g., a base station forming part or all of an eNB) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of aspects of one or more of the base stations 105, 205, and/or 205-*a* described with reference to FIGS. 1 and/or 2, and/or aspects of one or more of the apparatuses 705, 805, 905, 1005, and/or 2605 when configured as a base station, as described with reference to FIGS. 7, 8, 9, 10, and/or 26. The base station 1405 may be configured to implement or facilitate at least some of the base station and/or apparatus features and functions described with reference to FIGS. 1, 2, 3, 4, 5, 6, 7, 8, 9, 10, 22, 23, 24, 25, and/or 26.

The base station 1405 may include a base station processor module 1410, a base station memory module 1420, at least one base station transceiver module (represented by base station transceiver module(s) 1450), at least one base station antenna (represented by base station antenna(s) 1455), and/or a base station wireless communication management module 1460. The base station 1405 may also include one or more of a base station communications module 1430 and/or a network communications module 1440. Each of these components may be in communication with each other, directly or indirectly, over one or more buses 1435.

The base station memory module 1420 may include random access memory (RAM) and/or read-only memory (ROM). The base station memory module 1420 may store computer-readable, computer-executable code 1425 containing instructions that are configured to, when executed, cause the base station processor module 1410 to perform various functions described herein related to wireless communication (e.g., functions relating to transmitting patterns of signal transmissions and/or reference signals over an unlicensed radio frequency spectrum band, etc.). Alternatively, the code 1425 may not be directly executable by the base station processor module 1410 but be configured to cause the base station 1405 (e.g., when compiled and executed) to perform various of the functions described herein.

The base station processor module 1410 may include an intelligent hardware device, e.g., a central processing unit (CPU), a microcontroller, an ASIC, etc. The base station processor module 1410 may process information received through the base station transceiver module(s) 1450, the base station communications module 1430, and/or the network communications module 1440. The base station processor module 1410 may also process information to be sent to the transceiver module(s) 1450 for transmission through the antenna(s) 1455, to the base station communications module 1430, for transmission to one or more other base stations 1405-*a* and 1405-*b*, and/or to the network communications module 1440 for transmission to a core network 1445, which may be an example of one or more aspects of the core network 130 described with reference to FIG. 1. The base station processor module 1410 may handle, alone or in connection with the base station wireless communication management module 1460, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The base station transceiver module(s) 1450 may include a modem configured to modulate packets and provide the modulated packets to the base station antenna(s) 1455 for transmission, and to demodulate packets received from the base station antenna(s) 1455. The base station transceiver module(s) 1450 may, in some examples, be implemented as one or more base station transmitter modules and one or more separate base station receiver modules. The base station transceiver module(s) 1450 may support communications in the first radio frequency spectrum band and/or the second radio frequency spectrum band. The base station transceiver module(s) 1450 may be configured to communicate bi-directionally, via the antenna(s) 1455, with one or more UEs or apparatuses, such as one or more of the UEs 115, 215, 215-*a*, 215-*b*, and/or 215-*c* described with reference to FIGS. 1 and/or 2, and/or one or more of the apparatuses 705, 1105, 1205, 1305, and/or 2705 described with reference to FIGS. 7, 11, 12, 13, and/or 27. The base station 1405 may, for example, include multiple base station antennas 1455 (e.g., an antenna array). The base station 1405 may communicate with the core network 1445 through the network communications module 1440. The base station 1405 may also communicate with other base stations, such as the base stations 1405-*a* and 1405-*b*, using the base station communications module 1430.

The base station wireless communication management module 1460 may be configured to perform and/or control some or all of the features and/or functions described with reference to FIGS. 1, 2, 3, 4, 5, 6, 7, 8, 9, 10, 22, 23, 24, 25, and/or 26 related to wireless communication (e.g., functions relating to transmitting patterns of signal transmissions and/or reference signals over an unlicensed radio frequency spectrum band, etc.) over the first radio frequency spectrum band and/or the second radio frequency spectrum band. For example, the base station wireless communication management module 1460 may be configured to support a supplemental downlink mode, a carrier aggregation mode, and/or a standalone mode using the first radio frequency spectrum band and/or the second radio frequency spectrum band. The base station wireless communication management module 1460 may include a base station LTE/LTE-A licensed spectrum module 1465 configured to handle LTE/LTE-A communications in the first radio frequency spectrum band, and a base station LTE/LTE-A unlicensed spectrum module 1470 configured to handle LTE/LTE-A communications in the second radio frequency spectrum band. The base station wireless communication management module 1460, or portions of it, may include a processor, and/or some or all of the functions of the base station wireless communication management module 1460 may be performed by the base station processor module 1410 and/or in connection with the base station processor module 1410. In some examples, the base station wireless communication management module 1460 may be an example of the wireless communication management module 720, 820, 920, 1020, and/or 2620 described with reference to FIGS. 7, 8, 9, 10, and/or 26.

Figure 15:
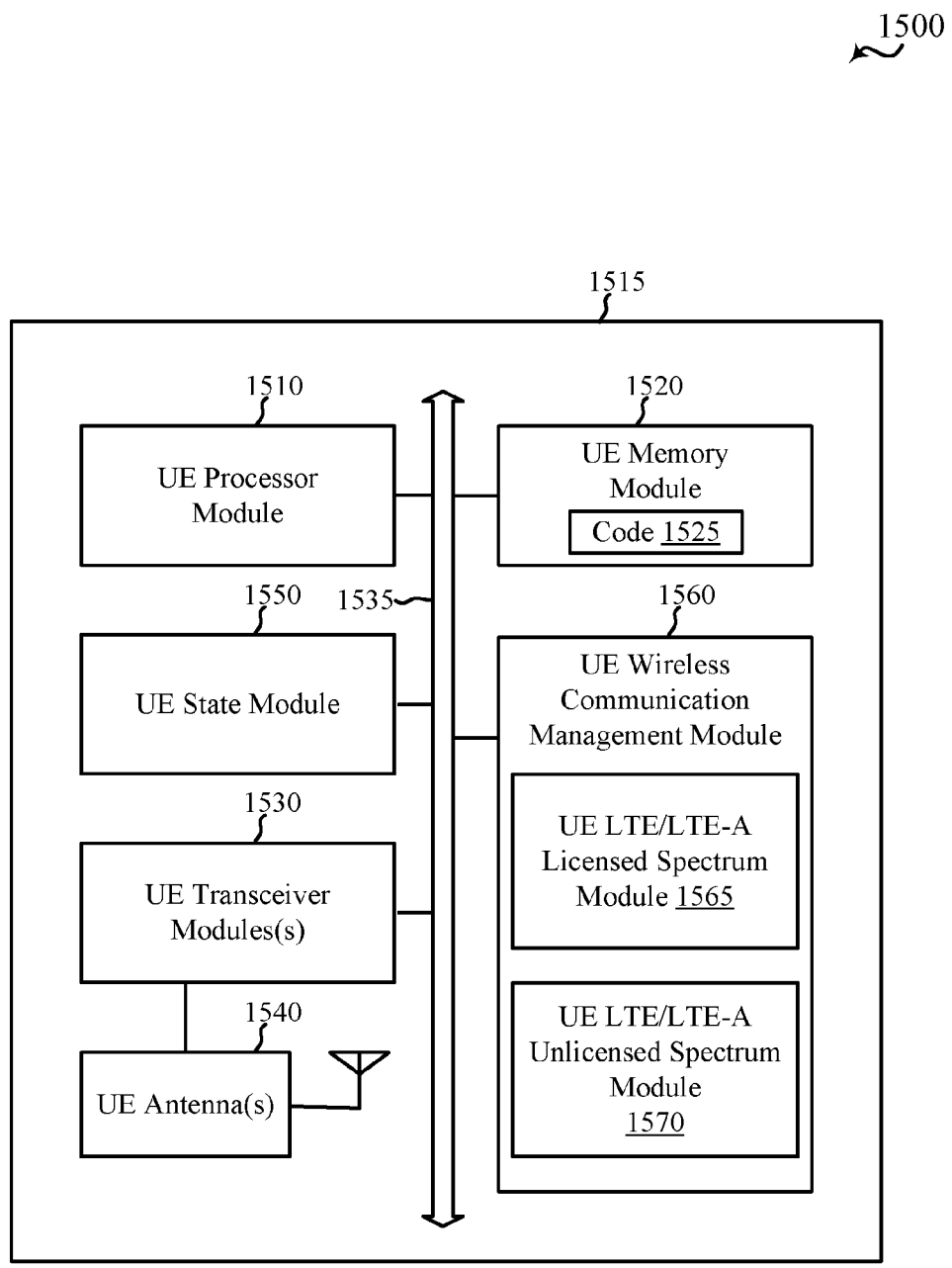
FIG. 15 shows a block diagram of a UE for use in wireless communication, in accordance with various aspects of the present disclosure.

FIG. 15 shows a block diagram 1500 of a UE 1515 for use in wireless communication, in accordance with various aspects of the present disclosure. The UE 1515 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1515 may, in some examples, have an internal power supply (not shown), such as a small battery, to facilitate mobile operation. In some examples, the UE 1515 may be an example of aspects of one or more of the UEs 115, 215, 215-*a*, 215-*b*, and/or 215-*c* described with reference to FIGS. 1 and/or 2, and/or aspects of one or more of the apparatuses 705, 1115, 1215, 1315, and/or 2715 when configured as a UE, as described with reference to FIGS. 7, 11, 12, 13, and/or 27. The UE 1515 may be configured to implement at least some of the UE and/or apparatus features and functions described with reference to FIGS. 1, 2, 3, 4, 5, 6, 7, 11, 12, 13, 22, 23, 24, 25, and/or 27.

The UE 1515 may include a UE processor module 1510, a UE memory module 1520, at least one UE transceiver module (represented by UE transceiver module(s) 1530), at least one UE antenna (represented by UE antenna(s) 1540), and/or a UE wireless communication management module 1560. Each of these components may be in communication with each other, directly or indirectly, over one or more buses 1535.

The UE memory module 1520 may include RAM and/or ROM. The UE memory module 1520 may store computer-readable, computer-executable code 1525 containing instructions that are configured to, when executed, cause the UE processor module 1510 to perform various functions described herein related to wireless communication (e.g., functions relating to the reception of patterns of signal transmissions and/or reference signals over an unlicensed radio frequency spectrum band, etc.). Alternatively, the code 1525 may not be directly executable by the UE processor module 1510 but be configured to cause the UE 1515 (e.g., when compiled and executed) to perform various of the functions described herein.

The UE processor module 1510 may include an intelligent hardware device, e.g., a CPU, a microcontroller, an ASIC, etc. The UE processor module 1510 may process information received through the UE transceiver module(s) 1530 and/or information to be sent to the UE transceiver module(s) 1530 for transmission through the UE antenna(s) 1540. The UE processor module 1510 may handle, alone or in connection with the UE wireless communication management module 1560, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The UE transceiver module(s) 1530 may include a modem configured to modulate packets and provide the modulated packets to the UE antenna(s) 1540 for transmission, and to demodulate packets received from the UE antenna(s) 1540. The UE transceiver module(s) 1530 may, in some examples, be implemented as one or more UE transmitter modules and one or more separate UE receiver modules. The UE transceiver module(s) 1530 may support communications in the first radio frequency spectrum band and/or the second radio frequency spectrum band. The UE transceiver module(s) 1530 may be configured to communicate bi-directionally, via the UE antenna(s) 1540, with one or more of the base stations 105, 205, 205-*a*, and/or 1405 described with reference to FIGS. 1, 2, and/or 14, and/or one or more of the apparatuses 705, 805, 905, 1005, and/or 2605 described with reference to FIGS. 7, 8, 9, 10, and/or 26. While the UE 1515 may include a single UE antenna, there may be examples in which the UE 1515 may include multiple UE antennas 1540.

The UE state module 1550 may be used, for example, to manage transitions of the UE 1515 between an RRC idle state and an RRC connected state, and may be in communication with other components of the UE 1515, directly or indirectly, over the one or more buses 1535. The UE state module 1550, or portions of it, may include a processor, and/or some or all of the functions of the UE state module 1550 may be performed by the UE processor module 1510 and/or in connection with the UE processor module 1510.

The UE wireless communication management module 1560 may be configured to perform and/or control some or all of the features and/or functions described with reference to FIGS. 1, 2, 3, 4, 5, 6, 7, 11, 12, 13, 22, 23, 24, 25, and/or 27 related to wireless communication (e.g., functions relating to the reception of patterns of signal transmissions and/or reference signals over an unlicensed radio frequency spectrum band, etc.) over the first radio frequency spectrum band and/or the second radio frequency spectrum band. In some examples, the UE wireless communication management module 1560 may be configured to support a supplemental downlink mode, a carrier aggregation mode, and/or a standalone mode using the first spectrum and/or the second spectrum. The UE wireless communication management module 1560 may include a UE LTE/LTE-A licensed spectrum module 1565 configured to handle LTE/LTE-A communications in the first radio frequency spectrum band, and a UE LTE/LTE-A unlicensed spectrum module 1570 configured to handle LTE/LTE-A communications in the second radio frequency spectrum band. The UE wireless communication management module 1560, or portions of it, may include a processor, and/or some or all of the functions of the UE wireless communication management module 1560 may be performed by the UE processor module 1510 and/or in connection with the UE processor module 1510. In some examples, the UE wireless communication management module 1560 may be an example of the wireless communication management module 720, 1120, 1220, and/or 1320 described with reference to FIGS. 7, 11, 12, and/or 13.

Figure 16:
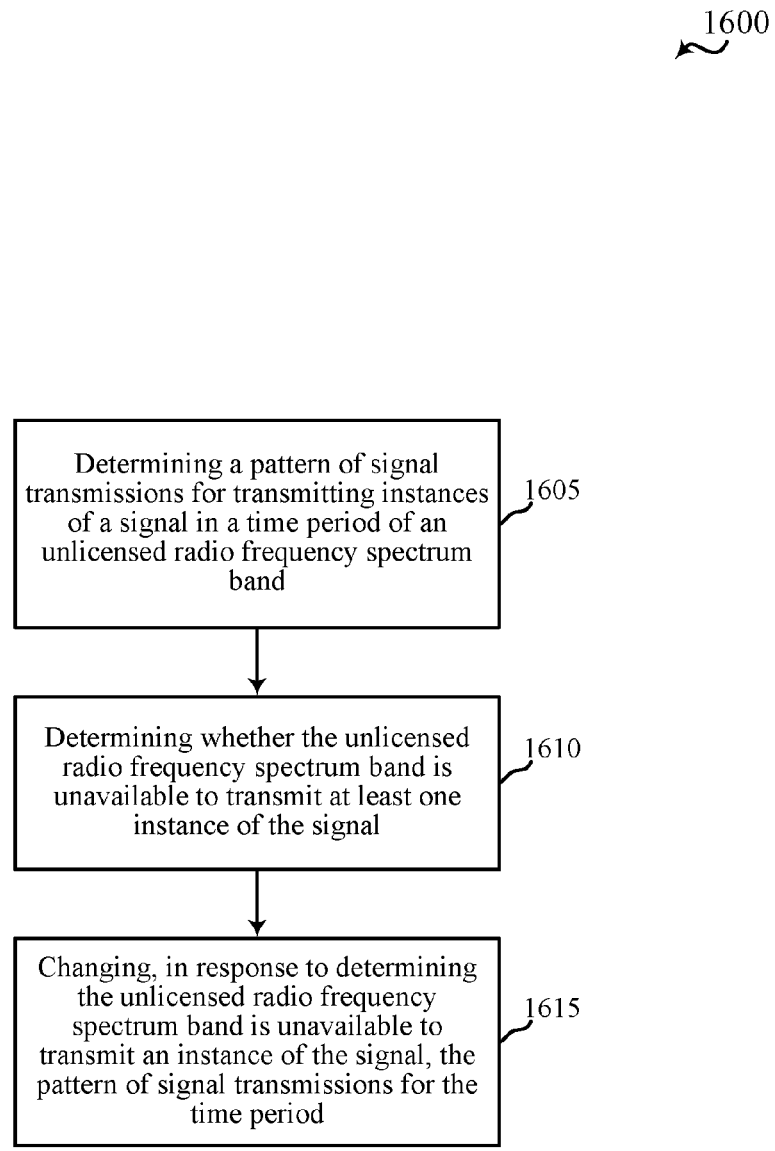
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 205, 205-*a*, and/or 1405 described with reference to FIGS. 1, 2, and/or 14, and/or aspects of one or more of the apparatuses 705, 805, 905, and/or 1005 described with reference to FIGS. 7, 8, 9, and/or 10. In some examples, a base station and/or apparatus may execute one or more sets of codes to control the functional elements of the base station and/or apparatus to perform the functions described below.

At block 1605, the method 1600 may include determining a pattern of signal transmissions for transmitting instances of a signal in a time period of an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a base station) performing the method 1600 may notify at least one other apparatus (e.g., at least one UE) of the determined pattern of signal transmissions. The operation(s) at block 1605 may be performed using the wireless communication management module 720, 820, 920, 1020, and/or 1460 described with reference to FIGS. 7, 8, 9, 10, and/or 14, and/or the signal transmission pattern determination module 835, 935, and/or 1035 described with reference to FIGS. 8, 9, and/or 10.

At block 1610, the method 1600 may include determining whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable. The operation(s) at block 1610 may be performed using the wireless communication management module 720, 820, 920, 1020, and/or 1460 described with reference to FIGS. 7, 8, 9, 10, and/or 14, and/or the medium contention module 840, 940, and/or 1040 described with reference to FIGS. 8, 9, and/or 10.

At block 1615, the method 1600 may include changing, in response to determining the unlicensed radio frequency spectrum band is unavailable to transmit an instance of the signal, the pattern of signal transmissions for the time period. The operation(s) at block 1615 may be performed using the wireless communication management module 720, 820, 920, 1020, and/or 1460 described with reference to FIGS. 7, 8, 9, 10, and/or 14, and/or the signal transmission pattern change module 845, 945, and/or 1045 described with reference to FIGS. 8, 9, and/or 10.

In some examples of the method 1600, the pattern of signal transmissions may include a first scheduled signal transmission and a second scheduled signal transmission. In these examples, the changing the pattern of signal transmissions may include scheduling an additional signal transmission in the pattern of signal transmissions, during a frame of the unlicensed radio frequency spectrum band occurring between the first scheduled signal transmission and the second scheduled signal transmission.

In some examples of the method 1600, the changing the pattern of signal transmissions may include increasing a number of scheduled signal transmissions in the pattern of signal transmissions for the time period. For example, a number of scheduled signal transmissions of an MCCH change notification may be increased from two or four scheduled signal transmissions to eight or sixteen scheduled signal transmissions.

In some examples of the method 1600, the changing the pattern of signal transmissions may include adding to the pattern of signal transmissions a signal transmission as part of a CET in the time period.

In some examples of the method 1600, the changing the pattern of signal transmissions at block 1615 may include changing the pattern of signal transmissions as described with reference to FIGS. 17 and/or 18.

In some examples of the method 1600, the changing the pattern of signal transmissions may include changing the pattern of signal transmissions to accommodate the unlicensed radio frequency spectrum band being unavailable to transmit each of a plurality of instances of the signal.

Thus, the method 1600 may provide for wireless communication. It should be noted that the method 1600 is just one implementation and that the operations of the method 1600 may be rearranged or otherwise modified such that other implementations are possible.

Figure 17:
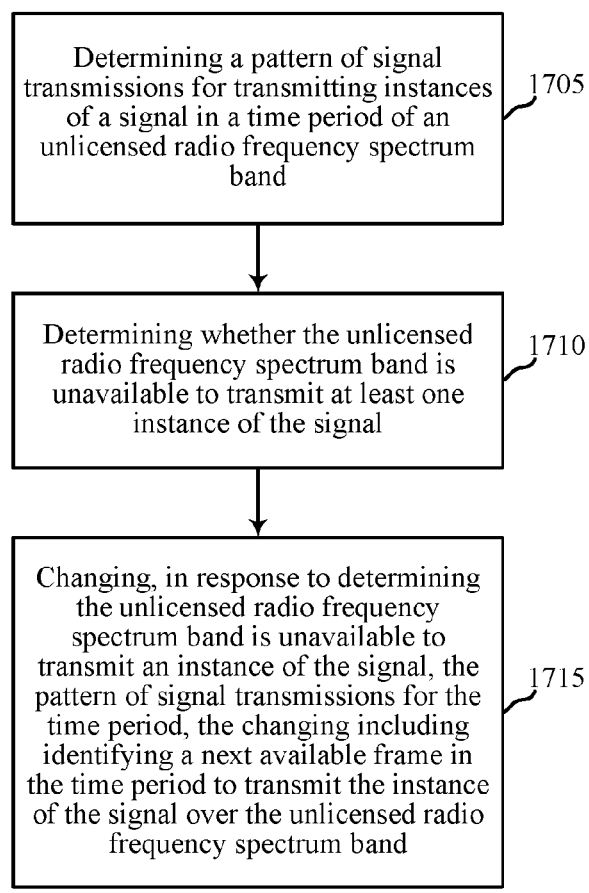
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-*a*, and/or 1405 described with reference to FIGS. 1, 2, and/or 14, and/or aspects of one or more of the apparatuses 705, 805, and/or 905 described with reference to FIGS. 7, 8, and/or 9. In some examples, a base station and/or apparatus may execute one or more sets of codes to control the functional elements of the base station and/or apparatus to perform the functions described below.

At block 1705, the method 1700 may include determining a pattern of signal transmissions for transmitting instances of a signal in a time period of an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/ LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a base station) performing the method 1700 may notify at least one other apparatus (e.g., at least one UE) of the determined pattern of signal transmissions. The operation(s) at block 1705 may be performed using the wireless communication management module 720, 820, 920, and/or 1460 described with reference to FIGS. 7, 8, 9, and/or 14, and/or the signal transmission pattern determination module 835 and/or 935 described with reference to FIGS. 8 and/or 9.

At block 1710, the method 1700 may include determining whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable. The operation(s) at block 1710 may be performed using the wireless communication management module 720, 820, 920, and/or 1460 described with reference to FIGS. 7, 8, 9, and/or 14, and/or the medium contention module 840 and/or 940 described with reference to FIGS. 8 and/or 9.

At block 1715, the method 1700 may include changing, in response to determining the unlicensed radio frequency spectrum band is unavailable to transmit an instance of the signal, the pattern of signal transmissions for the time period. The changing may include identifying, in response to the determining the unlicensed radio frequency spectrum band is unavailable to transmit the instance of the signal, a next available frame in the time period for transmission of the instance of the signal over the unlicensed radio frequency spectrum band. The operation(s) at block 1715 may be performed using the wireless communication management module 720, 820, 920, and/or 1460 described with reference to FIGS. 7, 8, 9, and/or 14, the signal transmission pattern change module 845 and/or 945 described with reference to FIGS. 8 and/or 9, and/or the next available frame identification module 955 described with reference to FIG. 9.

In some examples of the method 1700, a subframe index employed for transmitting the instance of the signal during a frame that is not transmitted (e.g., due to unavailability of the unlicensed radio frequency spectrum band) may also be employed for transmitting the instance of the signal during the next available frame.

In some examples of the method 1700, the pattern of signal transmissions may include a first scheduled signal transmission and a second scheduled signal transmission. In these examples, the changing the pattern of signal transmissions may include scheduling an additional signal transmission in the pattern of signal transmissions, during a frame of the unlicensed radio frequency spectrum band occurring between the first scheduled signal transmission and the second scheduled signal transmission.

In some examples of the method 1700, the changing the pattern of signal transmissions may include changing the pattern of signal transmissions to accommodate the unlicensed radio frequency spectrum band being unavailable to transmit each of a plurality of instances of the signal.

Thus, the method 1700 may provide for wireless communication. It should be noted that the method 1700 is just one implementation and that the operations of the method 1700 may be rearranged or otherwise modified such that other implementations are possible.

Figure 18:
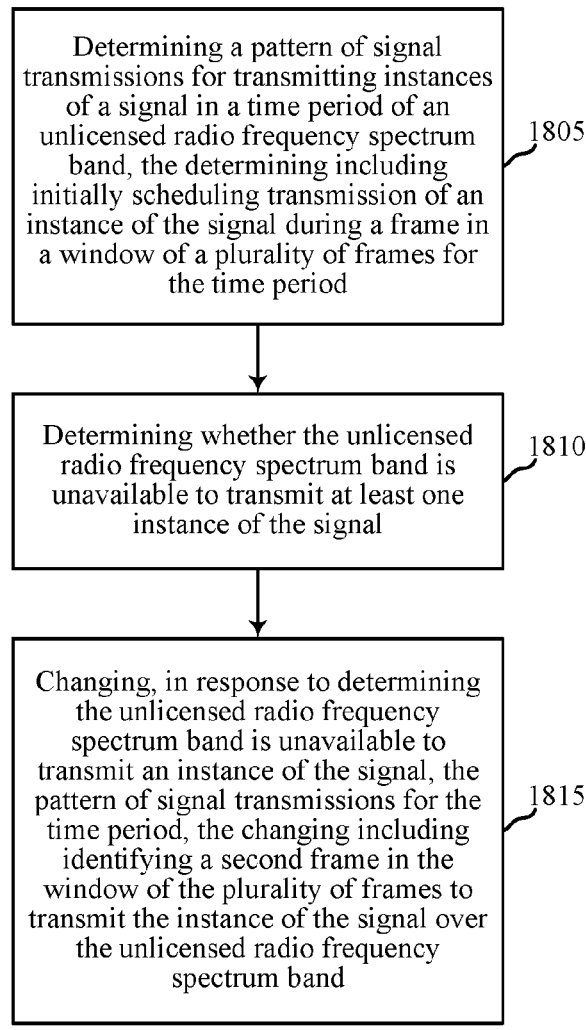
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-a, and/or 1405 described with reference to FIGS. 1, 2, and/or 14, and/or aspects of one or more of the apparatuses 705, 805, and/or 1005 described with reference to FIGS. 7, 8, and/or 10. In some examples, a base station and/or apparatus may execute one or more sets of codes to control the functional elements of the base station and/or apparatus to perform the functions described below.

At block 1805, the method 1800 may include determining a pattern of signal transmissions for transmitting instances of a signal in a time period of an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/ LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a base station) performing the method 1800 may notify at least one other apparatus (e.g., at least one UE) of the determined pattern of signal transmissions.

In some examples of the method 1800, the determining the pattern of signal transmissions at block 1805 may include initially scheduling a transmission of an instance of the signal during a frame in a window of a plurality of frames in the time period. In some examples, the transmission of the instance of the signal may be initially scheduled in a first frame in the window of the plurality of frames (e.g., a temporally first frame in the window of the plurality of frames). In other examples, the signal transmission may be initially scheduled in a frame other than the first frame in the window of the plurality of frames (e.g., not in the temporally first frame in the window of the plurality of frames). In some examples, the transmission of the instance of the signal may be initially scheduled in the window of the plurality of frames based on at least one of a processing load and/or a traffic load. In some examples, the length of the window of the plurality of frames may be sized to minimize UE power consumption. In some examples, each of a number of different signal transmissions in the pattern of signal transmissions may be scheduled in a respective different window of a plurality of frames in the time period.

The operation(s) at block 1805 may be performed using the wireless communication management module 720, 820, 1020, and/or 1460 described with reference to FIGS. 7, 8, 10, and/or 14, the signal transmission pattern determination module 835 and/or 1035 described with reference to FIGS.

8 and/or 10, and/or the window scheduling module 1055 described with reference to FIG. 10.

At block 1810, the method 1800 may include determining whether the unlicensed radio frequency spectrum band is unavailable to transmit at least one instance of the signal. In some examples, it may be determined whether the unlicensed radio frequency spectrum band is unavailable by contending for access to the unlicensed radio frequency spectrum band. In some examples, an apparatus such as a base station may contend for access to the unlicensed radio frequency spectrum by performing a CCA. When the CCA is successful, the unlicensed radio frequency spectrum band may be deemed available, and when the CCA is not successful, the unlicensed radio frequency spectrum band may be deemed unavailable. The operation(s) at block 1810 may be performed using the wireless communication management module 720, 820, 1020, and/or 1460 described with reference to FIGS. 7, 8, 10, and/or 14, and/or the medium contention module 840 and/or 1040 described with reference to FIGS. 8 and/or 10.

At block 1815, the method 1800 may include changing, in response to determining the unlicensed radio frequency spectrum band is unavailable to transmit the instance of the signal, the pattern of signal transmissions for the time period. The changing may include identifying, upon the determining the unlicensed radio frequency spectrum band is unavailable to transmit the instance of the signal during the frame in the window of the plurality of frames, a second frame in the window of the plurality of frames for transmission of the instance of the signal. The operation(s) at block 1815 may be performed using the wireless communication management module 720, 820, 1020, and/or 1460 described with reference to FIGS. 7, 8, 10, and/or 14, the signal transmission pattern change module 845 and/or 1045 described with reference to FIGS. 8 and/or 10, and/or the second frame identification module 1060 described with reference to FIG. 10.

In some examples of the method 1800, a subframe index employed for transmitting the instance of the signal during a frame that is not transmitted (e.g., due to unavailability of the unlicensed radio frequency spectrum band) may also be employed for transmitting the instance of the signal during the second frame in the window of the plurality of frames.

In some examples of the method 1800, the pattern of signal transmissions may include a first scheduled signal transmission and a second scheduled signal transmission. In these examples, the changing the pattern of signal transmissions may include scheduling an additional signal transmission in the pattern of signal transmissions, during a frame of the unlicensed radio frequency spectrum band occurring between the first scheduled signal transmission and the second scheduled signal transmission. Also in these examples, the length of a first window of a plurality of frames corresponding to the first scheduled signal transmission may be sized to not overlap the second scheduled signal transmission and/or a second window of a plurality of frames corresponding to the second scheduled signal transmission.

In some examples of the method 1800, the window of the plurality of frames in which transmission of the instance of the signal is scheduled may include scheduled paging instances for multiple groups of devices (e.g., UEs). In these examples, a UE that misses reading its own paging instance may read a paging instance of another UE without occurring additional delay (e.g., delay longer than the length of the window of the plurality of frames).

In some examples of the method 1800, the changing the pattern of signal transmissions may include changing the pattern of signal transmissions to accommodate the unlicensed radio frequency spectrum band being unavailable to transmit each of a plurality of instances of the signal.

Thus, the method 1800 may provide for wireless communication. It should be noted that the method 1800 is just one implementation and that the operations of the method 1800 may be rearranged or otherwise modified such that other implementations are possible.

In some examples, aspects of one or more of the methods 1600, 1700, and/or 1800 may be combined.

Figure 19:
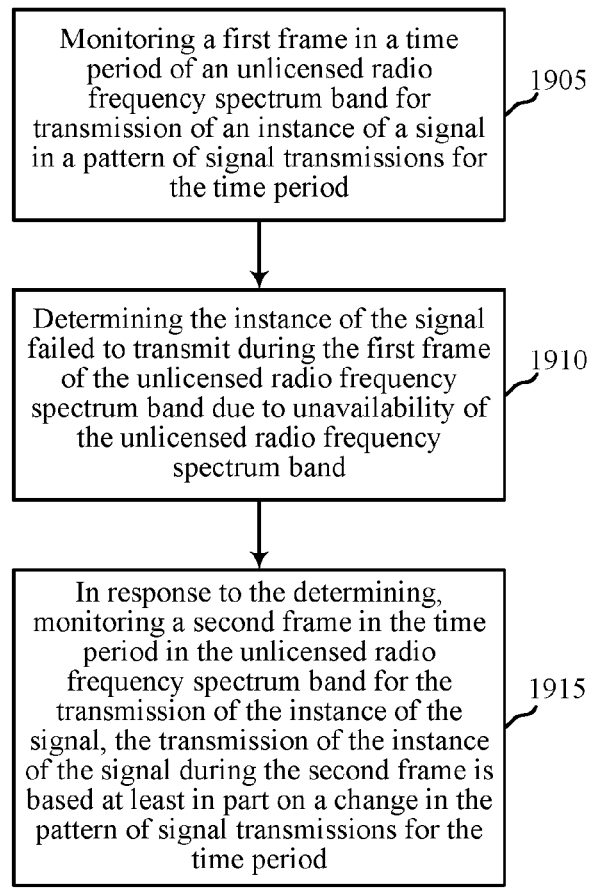
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115, 215, 215-a, 215-b, 215-c, and/or 1515 described with reference to FIGS. 1, 2, and/or 15, and/or aspects of one or more of the apparatuses 705, 1115, 1215, and/or 1315 described with reference to FIGS. 7, 11, 12, and/or 13. In some examples, a UE and/or apparatus may execute one or more sets of codes to control the functional elements of the UE and/or apparatus to perform the functions described below.

At block 1905, the method 1900 may include monitoring a first frame in a time period of an unlicensed radio frequency spectrum band for transmission of an instance of a signal in a pattern of signal transmissions for the time period. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a UE) performing the method 1900 may receive a notification of the determined pattern of signal transmissions from another apparatus (e.g., from a base station). The operation(s) at block 1905 may be performed using the wireless communication management module 720, 1120, 1220, 1320, and/or 1560 described with reference to FIGS. 7, 11, 12, 13, and/or 15, and/or the signal monitoring module 1135, 1235, and/or 1335 described with reference to FIGS. 11, 12, and/or 13.

At block 1910, the method 1900 may include determining the instance of the signal was not transmitted during the first frame of the unlicensed radio frequency spectrum band due to unavailability of the unlicensed radio frequency spectrum band. In some examples, it may be determined that the instance of the signal was not transmitted during the first frame due to unavailability of the unlicensed radio frequency spectrum band based at least in part on a blind detection of a first CUBS for the first frame. More specifically, it may be determined that the instance of the signal was not transmitted during the first frame due to unavailability of the unlicensed radio frequency spectrum band when the first CUBS for the first frame is not detected. The operation(s) at block 1910 may be performed using the wireless communication management module 720, 1120, 1220, 1320, and/or 1560 described with reference to FIGS. 7, 11, 12, 13, and/or 15, and/or the signal transmission determination module 1140, 1240, and/or 1340 described with reference to FIGS. 11, 12, and/or 13.

At block 1915, the method 1900 may include monitoring a second frame in the time period of the unlicensed radio frequency spectrum band for the transmission of the instance of the signal, in response to determining the instance of the signal was not transmitted during the first frame due to unavailability of the unlicensed radio frequency spectrum band. Transmission of the instance of the signal during the second frame may be based on a change in the pattern of signal transmissions for the time period. The operation(s) at block 1915 may be performed using the wireless communication management module 720, 1120, 1220, 1320, and/or 1560 described with reference to FIGS. 7, 11, 12, 13, and/or 15, and/or the signal monitoring module 1135, 1235, and/or 1335 described with reference to FIGS. 11, 12, and/or 13.

In some examples of the method 1900, the method 1900 may include detecting a transmission of the instance of the signal in the second frame of the unlicensed radio frequency spectrum band. In some examples of the method 1900, the method 1900 may include detecting a transmission of the instance of the signal in a frame received subsequent to the second frame. In some examples of the method 1900, the method 1900 may include detecting a transmission of another instance of the signal. In some examples of the method 1900, a transmission of the signal may not be detected for the time period. In these latter examples, the method 1900 may include reacquiring an MCCH in a next time period of the unlicensed radio frequency spectrum band. In some examples of the method 1900, the MCCH may be reacquired using the wireless communication management module 1220 and/or 1320 described with reference to FIGS. 12 and/or 13, and/or the MCCH acquisition module 1250 and/or 1350 described with reference to FIGS. 12 and/or 13.

In some examples of the method 1900, the change in the pattern of signal transmissions may include a transmission of the instance of the signal as part of a CET in the time period. In some examples of the method 1900, the method 1900 may include detecting the transmission of the instance of the signal as part of a CET in the time period.

In some examples of the method 1900, the change in the pattern of signal transmissions may include a change in the pattern of signal transmissions as described with reference to FIGS. 20 and/or 21.

Thus, the method 1900 may provide for wireless communication. It should be noted that the method 1900 is just one implementation and that the operations of the method 1900 may be rearranged or otherwise modified such that other implementations are possible.

Figure 20:
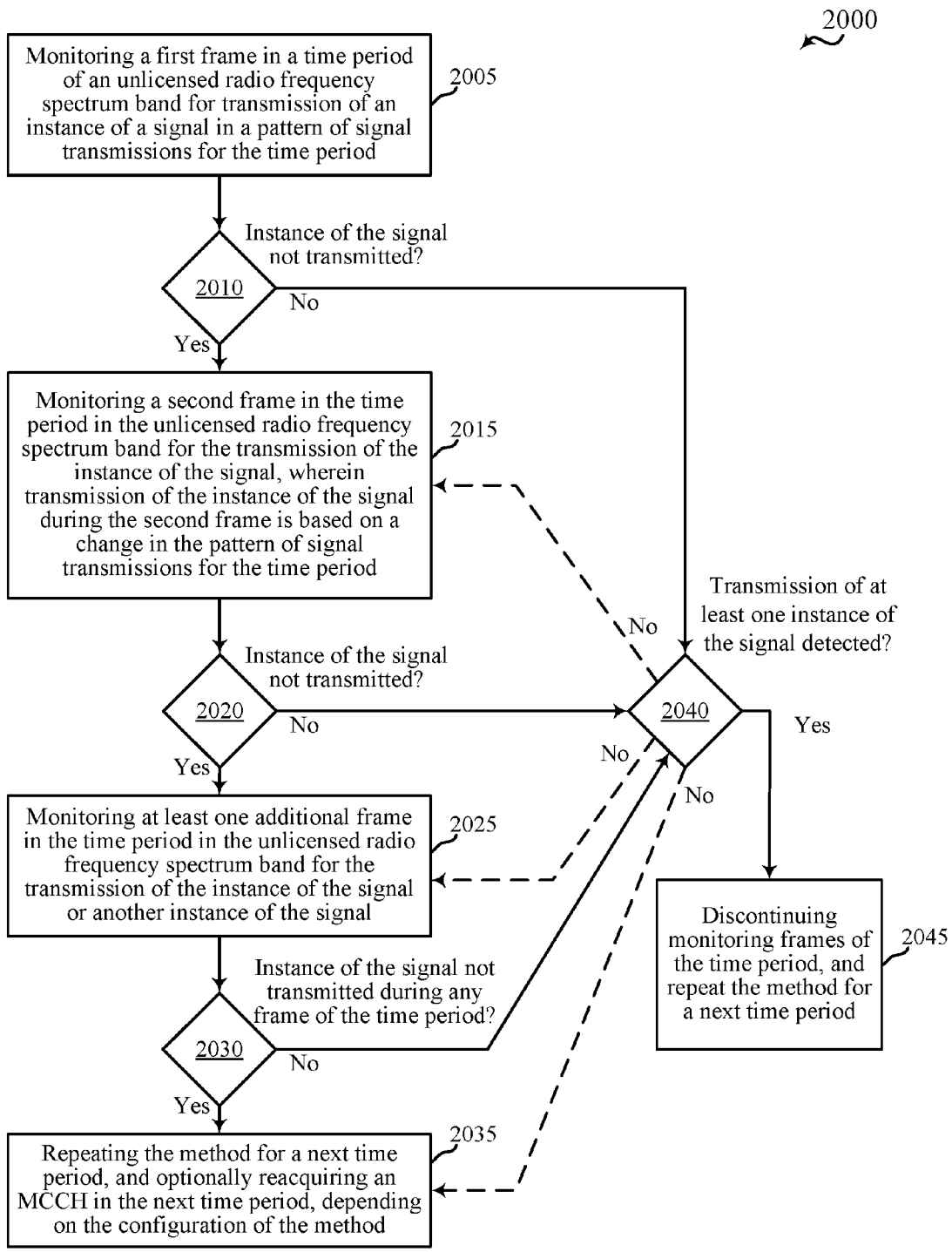
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the UEs 115, 215, 215-*a*, 215-*b*, 215-*c*, and/or 1515 described with reference to FIGS. 1, 2, and/or 15, and/or aspects of one or more of the apparatuses 705, 1115, and/or 1215 described with reference to FIGS. 7, 11, and/or 12. In some examples, a UE and/or apparatus may execute one or more sets of codes to control the functional elements of the UE and/or apparatus to perform the functions described below.

At block 2005, the method 2000 may include monitoring a first frame in a time period of an unlicensed radio frequency spectrum band for transmission of an instance of a signal in a pattern of signal transmissions for the time period. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a UE) performing the method 2000 may receive a notification of the determined pattern of signal transmissions from another apparatus (e.g., from a base station). The operation(s) at block 2005 may be performed using the wireless communication management module 720, 1120, 1220, and/or 1560 described with reference to FIGS. 7, 11, 12, and/or 15, and/or the signal monitoring module 1135 and/or 1235 described with reference to FIGS. 11 and/or 12.

At block 2010, the method 2000 may include determining whether the instance of the signal was not transmitted during the first frame of the unlicensed radio frequency spectrum band due to unavailability of the unlicensed radio frequency spectrum band. In some examples, it may be determined whether the instance of the signal was not transmitted during the first frame due to unavailability of the unlicensed radio frequency spectrum band based at least in part on a blind detection of a first CUBS for the first frame. More specifically, it may be determined that the instance of the signal was not transmitted during the first frame due to unavailability of the unlicensed radio frequency spectrum band when the first CUBS for the first frame is not detected.

When it is determined at block 2010 that the instance of the signal was not transmitted during the first frame due to unavailability of the unlicensed radio frequency spectrum band, the method 2000 may proceed to block 2015. Otherwise, the method 2000 may proceed to block 2040. The operation(s) at block 2010 may be performed using the wireless communication management module 720, 1120, 1220, and/or 1560 described with reference to FIGS. 7, 11, 12, and/or 15, the signal transmission determination module 1140 and/or 1240 described with reference to FIGS. 11 and/or 12, and/or the CUBS detection module 1255 described with reference to FIG. 12.

At block 2015, the method 2000 may include monitoring a second frame in the time period of the unlicensed radio frequency spectrum band for the transmission of the instance of the signal, in response to determining the instance of the signal was not transmitted during the first frame due to unavailability of the unlicensed radio frequency spectrum band. Transmission of the instance of the signal during the second frame may be based on a change in the pattern of signal transmissions for the time period. The operation(s) at block 2015 may be performed using the wireless communication management module 720, 1120, 1220, and/or 1560 described with reference to FIGS. 7, 11, 12, and/or 15, and/or the signal monitoring module 1135 and/or 1235 described with reference to FIGS. 11 and/or 12.

At block 2020, the method 2000 may include determining whether the instance of the signal was not transmitted during the second frame of the unlicensed radio frequency spectrum band due to unavailability of the unlicensed radio frequency spectrum band. In some examples, it may be determined whether the instance of the signal was not transmitted during the second frame due to unavailability of the unlicensed radio frequency spectrum band based at least in part on a blind detection of a second CUBS for the second frame. More specifically, it may be determined that the instance of the signal was not transmitted during the second frame due to unavailability of the unlicensed radio frequency spectrum band when the second CUBS for the second frame is not detected.

When it is determined at block 2020 that the instance of the signal was not transmitted during the second frame due to unavailability of the unlicensed radio frequency spectrum band, and when the end of the time period has not been reached, the method 2000 may proceed to block 2025. Otherwise, the method 2000 may proceed to block 2040. The operation(s) at block 2020 may be performed using the wireless communication management module 720, 1120, 1220, and/or 1560 described with reference to FIGS. 7, 11, 12, and/or 15, the signal transmission determination module 1140 and/or 1240 described with reference to FIGS. 11 and/or 12, and/or the CUBS detection module 1255 described with reference to FIG. 12.

At block 2025, the method 2000 may include monitoring at least one additional frame in the time period of the unlicensed radio frequency spectrum band, if any, for the transmission of the instance of the signal and/or a transmission of another instance of the signal. The monitoring at block 2025 may be performed in response to determining the instance of the signal was not transmitted during the second frame due to unavailability of the unlicensed radio frequency spectrum. The operation(s) at block 2025 may be performed using the wireless communication management module 720, 1120, 1220, and/or 1560 described with reference to FIGS. 7, 11, 12, and/or 15, and/or the signal monitoring module 1135 and/or 1235 described with reference to FIGS. 11 and/or 12.

At block 2030, the method 2000 may include determining whether the instance of the signal or another instance of the signal was not transmitted during the at least one additional frame due to unavailability of the unlicensed radio frequency spectrum band. In some examples, it may be determined whether the instance of the signal or another instance of the signal was not transmitted during one of the additional frames due to unavailability of the unlicensed radio frequency spectrum band based at least in part on a blind detection of an additional CUBS for the additional frame. More specifically, it may be determined that the instance of the signal or another instance of the signal was not transmitted during one of the additional frames due to unavailability of the unlicensed radio frequency spectrum band when an additional CUBS for the one of the additional frames is not detected.

When it is determined at block 2030 that the instance of the signal or another instance of the signal was not transmitted during any frame of the time period due to unavailability of the unlicensed radio frequency spectrum band, the method 2000 may proceed to block 2035. Otherwise, the method 2000 may proceed to block 2040. The operation(s) at block 2030 may be performed using the wireless communication management module 720, 1120, 1220, and/or 1560 described with reference to FIGS. 7, 11, 12, and/or 15, the signal transmission determination module 1140 and/or 1240 described with reference to FIGS. 11 and/or 12, and/or the CUBS detection module 1255 described with reference to FIG. 12.

In some examples, the operation(s) performed at block 2025 and block 2030 may be performed iteratively, for each of the at least one additional frame, if any.

At block 2035, the method 2000 may include repeating the method 2000 for a next time period, and optionally reacquiring an MCCH in the next time period, depending on the configuration of the method 2000. The operation(s) at block 2035 may be performed using the wireless communication management module 720, 1120, 1220, and/or 1560 described with reference to FIGS. 7, 11, 12, and/or 15, the signal monitoring module 1235 described with reference to FIG. 12, and/or the MCCH acquisition module 1250 described with reference to FIG. 12.

At block 2040, the method 2000 may include detecting whether at least one instance of the signal has been transmitted. When it is determined at block 2040 that at least one instance of the signal has been transmitted, the method 2000 may proceed to block 2045, where the method 2000 may discontinue monitoring frames of the time period and repeat the method 2000 for a next time period. When it is determined at block 2040 that at least one instance of the signal has not been transmitted, and that the end of the time period has been reached without detecting at least one instance of the signal, the method 2000 may proceed to block 2035. When it is determined at block 2040 that at least one instance of the signal has not been transmitted, and that the end of the time period has not been reached, the method 2000 may follow various paths, depending on the configuration of the method 2000. In one example, the method 2000 may proceed to block 2045 in all cases, under an assumption that if a CUBS was received for a frame but no instance of the signal was detected, the signal will not be transmitted during the time period. In another example, and when block 2040 is reached from block 2010 before the end of the time period, the method 2000 may proceed to block 2015. In another example, and when block 2040 is reached from block 2020 before the end of the time period, the method 2000 may proceed to block 2025. In another example, and when block 2040 is reached from block 2030 before the end of the time period, the method 2000 may proceed with another iteration of the operation(s) performed at blocks 2025 and 2030.

The operation(s) at block 2040 may be performed using the wireless communication management module 720, 1120, 1220, and/or 1560 described with reference to FIGS. 7, 11, 12, and/or 15, and/or the signal detection module 1245 described with reference to FIG. 12.

In some examples of the method 2000, the change in the pattern of signal transmissions may include a transmission of the instance of the signal as part of a CET in the time period. In some examples of the method 2000, the method 2000 may include detecting the transmission of the instance of the signal as part of a CET in the time period.

Thus, the method 2000 may provide for wireless communication. It should be noted that the method 2000 is just one implementation and that the operations of the method 2000 may be rearranged or otherwise modified such that other implementations are possible.

Figure 21:
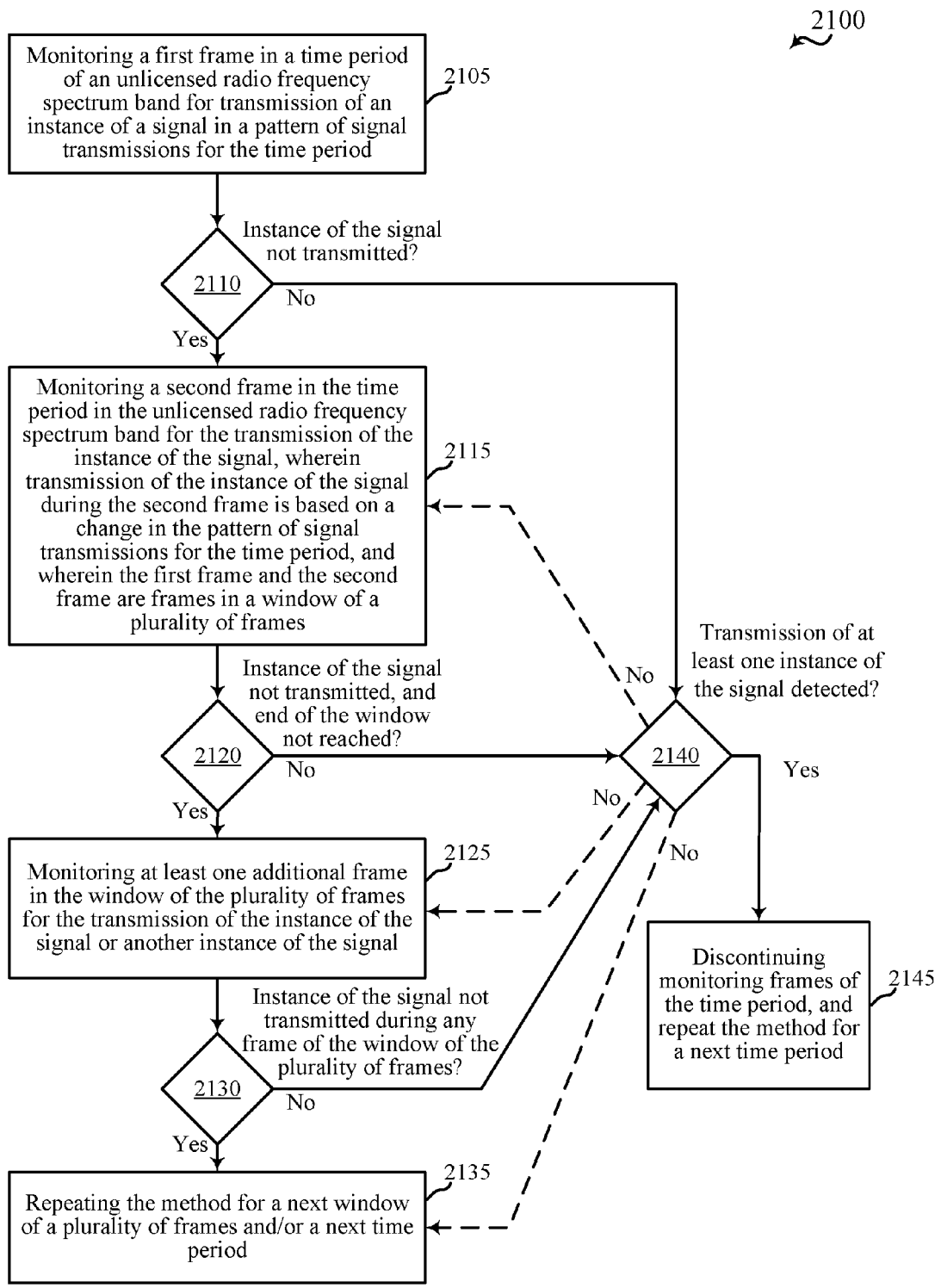
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the UEs 115, 215, 215-*a*, 215-*b*, 215-*c*, and/or 1515 described with reference to FIGS. 1, 2, and/or 15, and/or aspects of one or more of the apparatuses 705, 1115, and/or 1315 described with reference to FIGS. 7, 11, and/or 13. In some examples, a UE and/or apparatus may execute one or more sets of codes to control the functional elements of the UE and/or apparatus to perform the functions described below.

At block 2105, the method 2100 may include monitoring a first frame in a time period of an unlicensed radio frequency spectrum band for transmission of an instance of a signal in a pattern of signal transmissions for the time period. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). In some examples, the signal may include an MCCH change notification or a paging instance. In some examples, the time period may include a plurality of contiguous frames of the unlicensed radio frequency spectrum band. In some examples, the time period may include an MCCH modification period. In some examples, an apparatus (e.g., a UE) performing the method 2300 may receive a notification of the determined pattern of signal transmissions from another apparatus (e.g., from a base station). The operation(s) at block 2105 may be performed using the wireless communication management module 720, 1120, 1320, and/or 1560 described with reference to FIGS. 7, 11, 13, and/or 15, and/or the signal monitoring module 1135 and/or 1335 described with reference to FIGS. 11 and/or 13.

At block 2110, the method 2100 may include determining whether the instance of the signal was not transmitted during the first frame of the unlicensed radio frequency spectrum band due to unavailability of the unlicensed radio frequency spectrum band. In some examples, it may be determined whether the instance of the signal was not transmitted during the first frame due to unavailability of the unlicensed radio frequency spectrum band based at least in part on a blind detection of a first CUBS for the first frame. More specifically, it may be determined that the instance of the signal was not transmitted during the first frame due to unavailability of the unlicensed radio frequency spectrum band when the first CUBS for the first frame is not detected.

When it is determined at block 2110 that the instance of the signal was not transmitted during the first frame due to unavailability of the unlicensed radio frequency spectrum band, the method 2100 may proceed to block 2115. Otherwise, the method 2100 may proceed to block 2140. The operation(s) at block 2110 may be performed using the wireless communication management module 720, 1120, 1320, and/or 1560 described with reference to FIGS. 7, 11, 13, and/or 15, the signal transmission determination module 1140 and/or 1340 described with reference to FIGS. 11 and/or 13, and/or the CUBS detection module 1360 described with reference to FIG. 13.

At block 2115, the method 2100 may include monitoring a second frame in the time period of the unlicensed radio frequency spectrum band for the transmission of the instance of the signal, in response to determining the instance of the signal was not transmitted during the first frame due to unavailability of the unlicensed radio frequency spectrum band. The first frame and the second frame may be frames in a window of a plurality of frames in the time period. Transmission of the instance of the signal during the second frame may be based on a change in the pattern of signal transmissions for the time period. The operation(s) at block 2115 may be performed using the wireless communication management module 720, 1120, 1320, and/or 1560 described with reference to FIGS. 7, 11, 13, and/or 15, the signal monitoring module 1135 and/or 1335 described with reference to FIGS. 11 and/or 13, and/or the window monitoring module 1355 described with reference to FIG. 13.

At block 2120, the method 2100 may include determining whether the instance of the signal was not transmitted during the second frame of the unlicensed radio frequency spectrum band due to unavailability of the unlicensed radio frequency spectrum band. In some examples, it may be determined whether the instance of the signal was not transmitted during the second frame due to unavailability of the unlicensed radio frequency spectrum band based at least in part on a blind detection of a second CUBS for the second frame. More specifically, it may be determined that the instance of the signal was not transmitted during the second frame due to unavailability of the unlicensed radio frequency spectrum band when the second CUBS for the second frame is not detected.

When it is determined at block 2120 that the instance of the signal was not transmitted during the second frame due to unavailability of the unlicensed radio frequency spectrum band, and when the end of the window of the plurality of windows has not been reached, the method 2100 may proceed to block 2125. Otherwise, the method 2100 may proceed to block 2140. The operation(s) at block 2120 may be performed using the wireless communication management module 720, 1120, 1320, and/or 1560 described with reference to FIGS. 7, 11, 13, and/or 15, the signal transmission determination module 1140 and/or 1340 described with reference to FIGS. 11 and/or 13, and/or the CUBS detection module 1360 described with reference to FIG. 13.

At block 2125, the method 2100 may include monitoring at least one additional frame in the window of the plurality of frames, if any, for the transmission of the instance of the signal. The monitoring at block 2125 may be performed in response to determining the instance of the signal was not transmitted during the second frame due to unavailability of the unlicensed radio frequency spectrum. The operation(s) at block 2125 may be performed using the wireless communication management module 720, 1120, 1320, and/or 1560 described with reference to FIGS. 7, 11, 13, and/or 15, the signal monitoring module 1135 and/or 1335 described with reference to FIGS. 11 and/or 13, and/or the window monitoring module 1355 described with reference to FIG. 13.

At block 2130, the method 2100 may include determining whether the instance of the signal was not transmitted during the at least one additional frame due to unavailability of the unlicensed radio frequency spectrum band. In some examples, it may be determined whether the instance of the signal was not transmitted during one of the additional frames due to unavailability of the unlicensed radio frequency spectrum band based at least in part on a blind detection of an additional CUBS for the additional frame. More specifically, it may be determined that the instance of the signal was not transmitted during one of the additional frames due to unavailability of the unlicensed radio frequency spectrum band when an additional CUBS for the one of the additional frames is not detected.

When it is determined at block 2130 that the instance of the signal was not transmitted during any frame of the window of the plurality of frames due to unavailability of the unlicensed radio frequency spectrum band, the method 2100 may proceed to block 2135. Otherwise, the method 2100 may proceed to block 2140. The operation(s) at block 2130 may be performed using the wireless communication management module 720, 1120, 1320, and/or 1560 described with reference to FIGS. 7, 11, 13, and/or 15, the signal transmission determination module 1140 and/or 1340 described with reference to FIGS. 11 and/or 13, and/or the CUBS detection module 1360 described with reference to FIG. 13.

In some examples, the operation(s) performed at block 2125 and block 2130 may be performed iteratively, for each of the at least one additional frame, if any.

At block 2135, the method 2100 may include repeating the method 2100 for a next window of a plurality of frames and/or a next time period. The operation(s) at block 2135 may be performed using the wireless communication management module 720, 1120, 1320, and/or 1560 described with reference to FIGS. 7, 11, 13, and/or 15, the signal monitoring module 1135 and/or 1335 described with reference to FIGS. 11 and/or 13, and/or the window monitoring module 1355 described with reference to FIG. 13.

At block 2140, the method 2100 may include detecting whether at least one instance of the signal has been transmitted. When it is determined at block 2140 that at least one instance of the signal has been transmitted, the method 2100 may proceed to block 2145, where the method 2100 may discontinue monitoring frames of the time period and repeat the method 2100 for a next time period. When it is determined at block 2140 that at least one instance of the signal has not been transmitted during the window of the plurality of frames, and that the end of the window of the plurality of frames (and/or the end of the time period) has been reached without detecting at least one instance of the signal, the method 2100 may proceed to block 2135. When it is determined at block 2140 that at least one instance of the signal has not been transmitted, and that the end of the window of the plurality of frames has not been reached, the method 2100 may follow various paths, depending on the configuration of the method 2100. In one example, the method 2100 may proceed to block 2145 in all cases, under an assumption that if a CUBS was received for a frame but no instance of the signal was detected, the signal will not be transmitted during the time period. In another example, and when block 2140 is reached from block 2110 before the end of the window of the plurality of frames, the method 2100 may proceed to block 2115. In another example, and when block 2140 is reached from block 2120 before the end of the window of the plurality of frames, the method 2100 may proceed to block 2125. In another example, and when block 2140 is reached from block 2130 before the end of the window of the plurality of frames, the method 2100 may proceed with another iteration of the operation(s) performed at blocks 2125 and 2130.

The operation(s) at block 2140 may be performed using the wireless communication management module 720, 1120, 1320, and/or 1560 described with reference to FIGS. 7, 11, 13, and/or 15, and/or the signal detection module 1345 described with reference to FIG. 13.

In some examples of the method 2100, the change in the pattern of signal transmissions may include a transmission of the instance of the signal in a subsequent frame of the window of the plurality of frames.

In some examples of the method 2100, the first frame referenced at block 2105 and block 2110 may not be temporally first within the window of the plurality of frames.

In some examples of the method 2100, the change in the pattern of signal transmissions may include a transmission of the instance of the signal as part of a CET in the time period. In some examples of the method 2100, the method 2100 may include detecting the transmission of the instance of the signal as part of a CET in the time period.

In examples of the method 2100 in which the signal includes a paging instance, the method 2100 may include monitoring the window of the plurality of frames for paging instances for multiple groups of devices, and acquiring paging information based at least in part on a paging instance associated with another device.

Thus, the method 2100 may provide for wireless communication. It should be noted that the method 2100 is just one implementation and that the operations of the method 2100 may be rearranged or otherwise modified such that other implementations are possible.

In some examples, aspects of one or more of the methods 1900, 2000, and/or 2100 may be combined.

Turning now to the impact of transmission timing interval duration on reference signal transmissions, it is noted that LTE/LTE-A radio frames transmitted over a licensed radio frequency spectrum band employ a transmission time interval (TTI) of one subframe or one millisecond. An LBT frame transmitted over an unlicensed radio frequency spectrum band may also employ a TTI of one subframe or one millisecond, as shown, for example, in FIG. 4, where the LBT frame 415 has TTI's of one subframe or one millisecond.

An LBT frame having TTI's of one subframe or one millisecond provides commonality with an LTE/LTE-A radio frame structure. However, there may transmissions over an unlicensed radio frequency spectrum band for which a one subframe or one millisecond TTI may be inefficient. For example, CETs having durations of less than one millisecond have been proposed (e.g., a downlink CET having four OFDM symbols, which may be extended to seven OFDM symbols, has been proposed; and an uplink CET having six OFDM symbols or seven OFDM symbols has been proposed). By way of further example, special subframes such as the S' subframe 435 and S subframe 430 described with reference to FIG. 4, in which a DCCA 440 and an uplink CCA (UCCA) may be respectively performed, may have a duration of less than one millisecond. In the case of an S' subframe 435, it has been proposed that half of the S' subframe 435 (e.g., 0.5 ms or one slot) be allocated to an uplink transmission opportunity. In the case of an S subframe 430, it has been proposed that part of the S subframe 430 (e.g., four OFDM symbols) be allocated to a downlink transmission opportunity. As another example, a downlink transmission and/or uplink transmission of less than one millisecond may be employed when detecting radar signals.

The MBSFN reference signal (MBSFN-RS) used for LTE/LTE-A networks (e.g., transmissions over a licensed radio frequency spectrum band) is based on a TTI of one subframe or one millisecond. If a TTI of less than one subframe or one millisecond is employed for transmissions over an unlicensed radio frequency spectrum band, a new MBSFN-RS may be needed. Examples of a new MBSFN-RS are shown in FIGS. 22 and/or 23.

Figure 22:
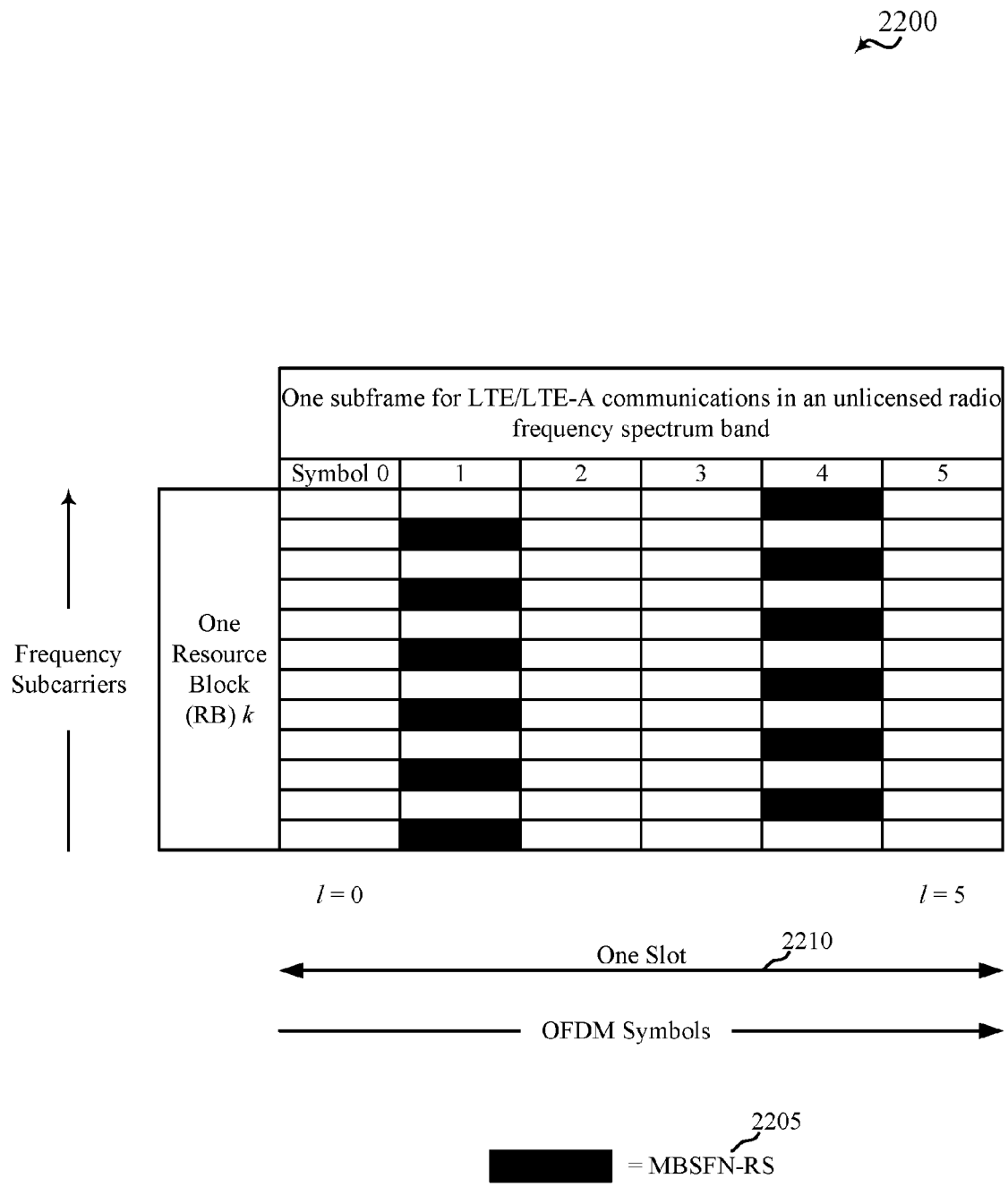
FIG. 22 shows an example of an MBSFN-RS for transmission during a TTI having a duration of 0.5 ms (or one-half or one slot of a one millisecond subframe), in accordance with various aspects of the present disclosure.

FIG. 22 shows an example 2200 of an MBSFN-RS 2205 for transmission during a TTI 2210 having a duration of 0.5 ms (or one-half or one slot of a one millisecond subframe), in accordance with various aspects of the present disclosure. By way of example, the MBSFN-RS 2205 may include twelve reference signal tones per resource block (RB) k.

Although the MBSFN-RS 2205, as shown, may use more overhead than an LTE/LTE-A MBSFN-RS (e.g., twelve reference signal tones per RB over a 0.5 ms TTI 2210 compared to eighteen reference signal tones per RB over a one millisecond TTI), the MBSFN-RS 2205 may be advantageous, in some examples, in that it can be transmitted within a 0.5 ms TTI 2210.

Figure 23:
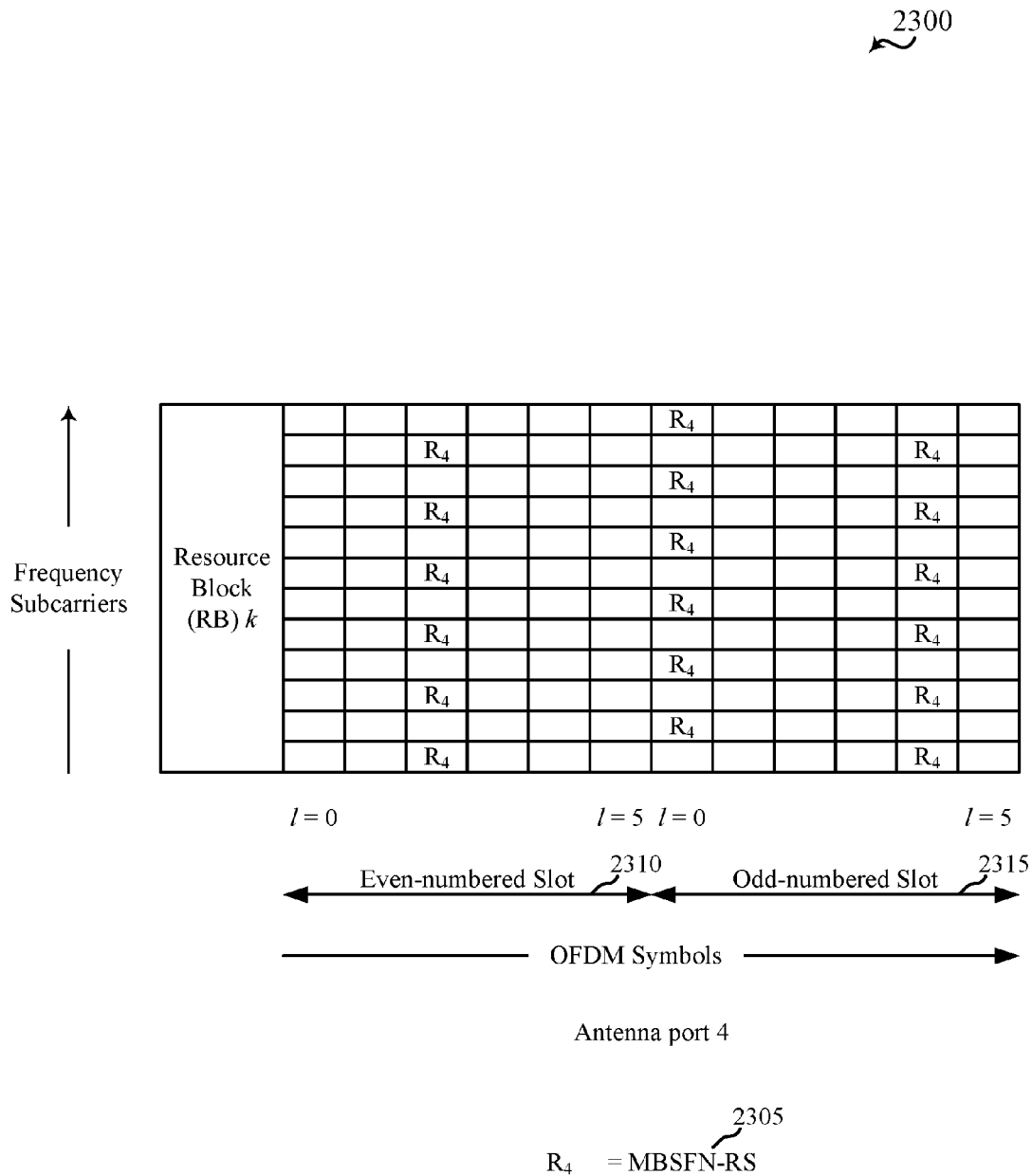
FIG. 23 shows an example of an MBSFN-RS for transmission over a bundled first TTI and second TTI, each of which has a duration of 0.5 ms (or one-half or one slot of a one millisecond subframe), in accordance with various aspects of the present disclosure.

FIG. 23 shows an example 2300 of an MBSFN-RS 2305 for transmission over a bundled first TTI 2310 and second TTI 2315, each of which has a duration of 0.5 ms (or one-half or one slot of a one millisecond subframe), in accordance with various aspects of the present disclosure. By way of example, the MBSFN-RS 2305 may include eighteen reference signal tones per resource block (RB) k, which reference signal tones may be distributed over the first TTI 2310 and the second TTI 2315.

The MBSFN-RS 2305, as shown, uses the same overhead as an LTE/LTE-A MBSFN-RS (e.g., eighteen reference signal tones per RB over two 0.5 millisecond TTIs 2310, 2315 or a one millisecond TTI). The MBSFN-RS 2305 may be advantageous, in some examples, in that it is similar to an LTE/LTE-A MBSFN-RS.

In some examples, a transmitting apparatus (e.g., a base station) may identify at least one reference signal pattern from a plurality of reference signal patterns (e.g., at least the MBSFN-RS 2205 and/or the MBSFN-RS 2305), for transmission of an MBSFN-RS during a plurality of TTIs, based at least in part on whether the TTIs are bundled. The identified at least one reference signal pattern may then be signaled to a device (e.g., a UE). In some examples, the signaling may be provided via a System Information Block (SIB), such as SIB13, and/or via a downlink CET.

With respect to MBSFN signaling, the LTE/LTE-A MBSFN signaling that is used over a licensed radio frequency spectrum band for ten millisecond frames having one millisecond subframes (e.g., one millisecond TTIs) may be used over an unlicensed radio frequency spectrum band for five millisecond or shorter frames having 0.5 ms TTIs. However, when transmitting ten millisecond frames having 0.5 ms subframes, the bitwidth of MBSFN signaling may need to be increased to cover more TTIs per frame. An example of how the bitwidth of MBSFN signaling may be increased is shown in FIGS. 24 & 25.

Figure 24:
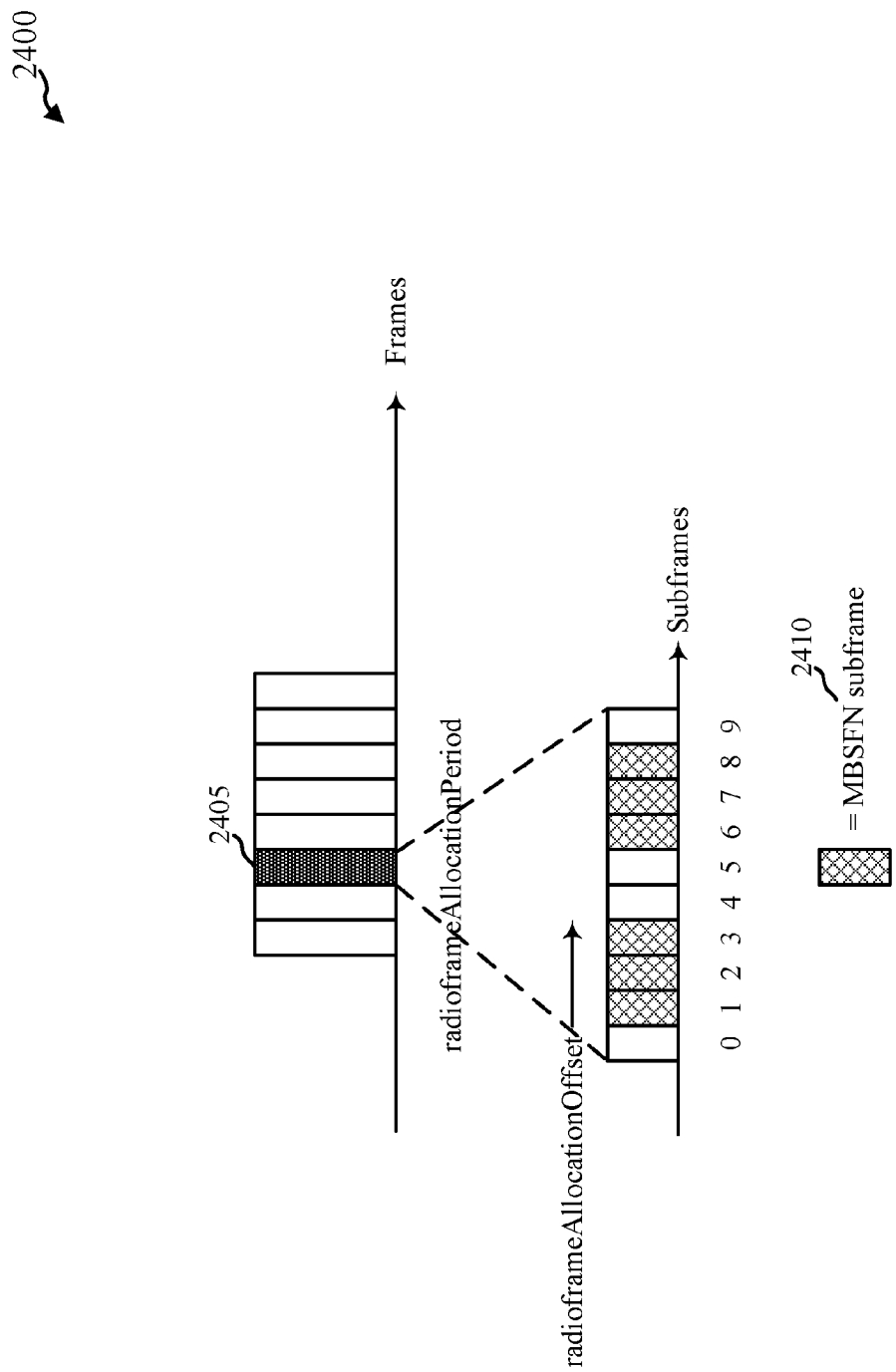
FIG. 24 shows an example of a 1-frame MBSFN frame pattern, wherein the 1-frame MBSFN frame pattern includes six MBSFN subframes, in accordance with various aspects of the present disclosure.
Figure 25:
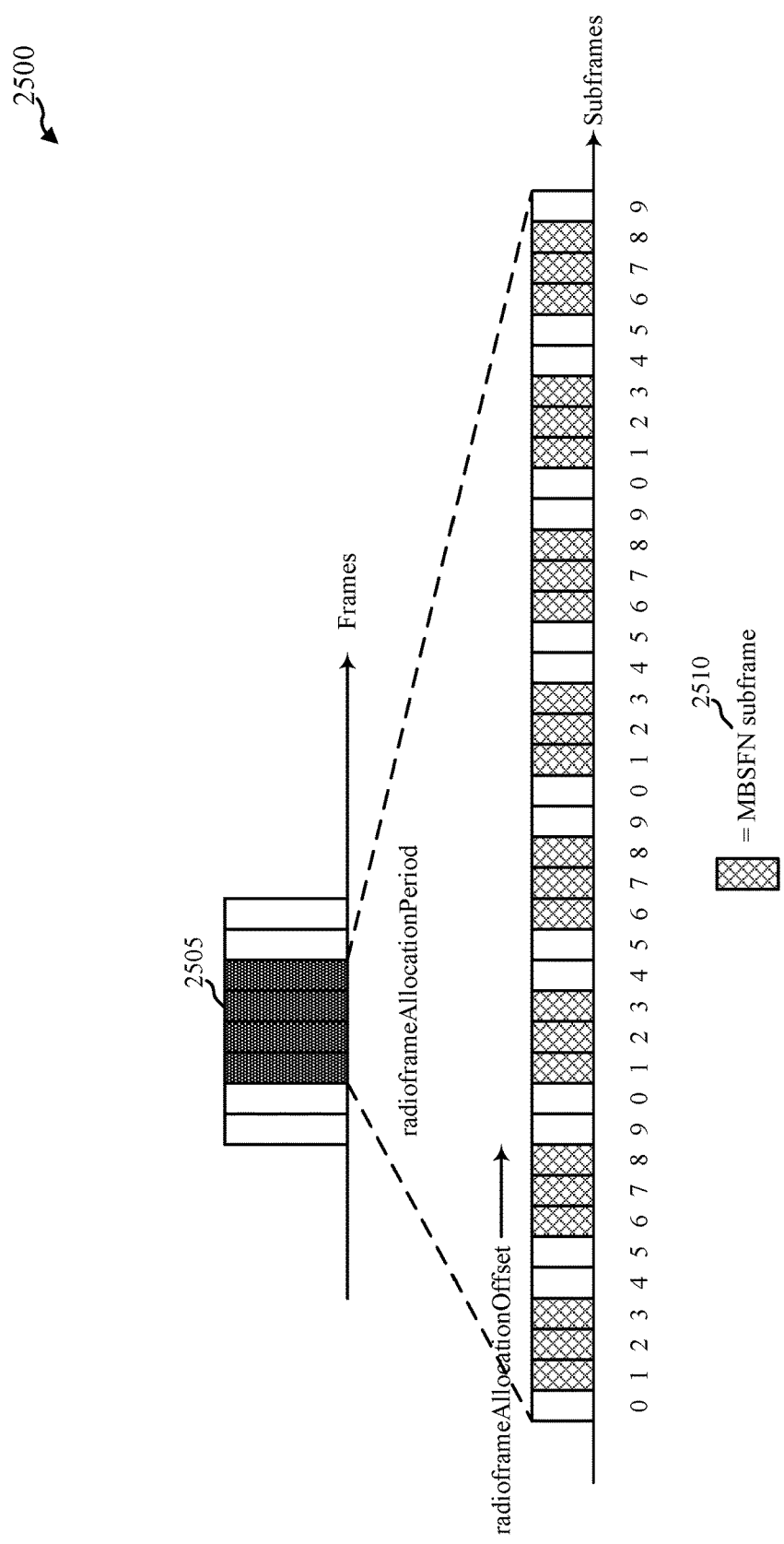
FIG. 25 shows an example of a 4-frame MBSFN frame pattern, wherein the 4-frame MBSFN frame pattern includes twenty-four MBSFN subframes, in accordance with various aspects of the present disclosure.

FIG. 24 shows an example 2400 of a 1-frame MBSFN frame pattern 2405, wherein the 1-frame MBSFN frame pattern 2405 includes six MBSFN subframes 2410, in accordance with various aspects of the present disclosure. FIG. 25 shows an example 2500 of a 4-frame MBSFN frame pattern 2505, wherein the 4-frame MBSFN frame pattern 2505 includes twenty-four MBSFN subframes 2510, in accordance with various aspects of the present disclosure.

The MBSFN control channel (MCCH) allocates MBSFN subframes for each physical multicast channel (PMCH). More particularly, the MCCH specifies the MBSFN subframes allocated to each PMCH within each common subframe allocation period (e.g., each commonsf-AllocPeriod). The maximum commonsf-AllocPeriod for LTE/LTE-A networks is 256 radio frames, and the maximum number of MBSFN subframes within a commonsf-AllocPeriod is 1536. When transmitting ten millisecond frames having 0.5 ms subframes, the bitwidth of the MCCH may need to be increased to cover more TTIs per frame.

The multicast channel (MCH) scheduling information (MSI) allocates MBSFN subframes for each MBMS traffic channel (MTCH) within a PMCH. More particularly, the MSI specifies the MBSFN subframes allocated to each MTCH within each PMCH. For LTE/LTE-A networks, eleven bits of MSI are used to indicate up to 1536 MBSFN subframes. When transmitting ten millisecond frames having 0.5 ms subframes, the bitwidth of the MSI may need to be increased to cover more TTIs per frame.

Figure 26:
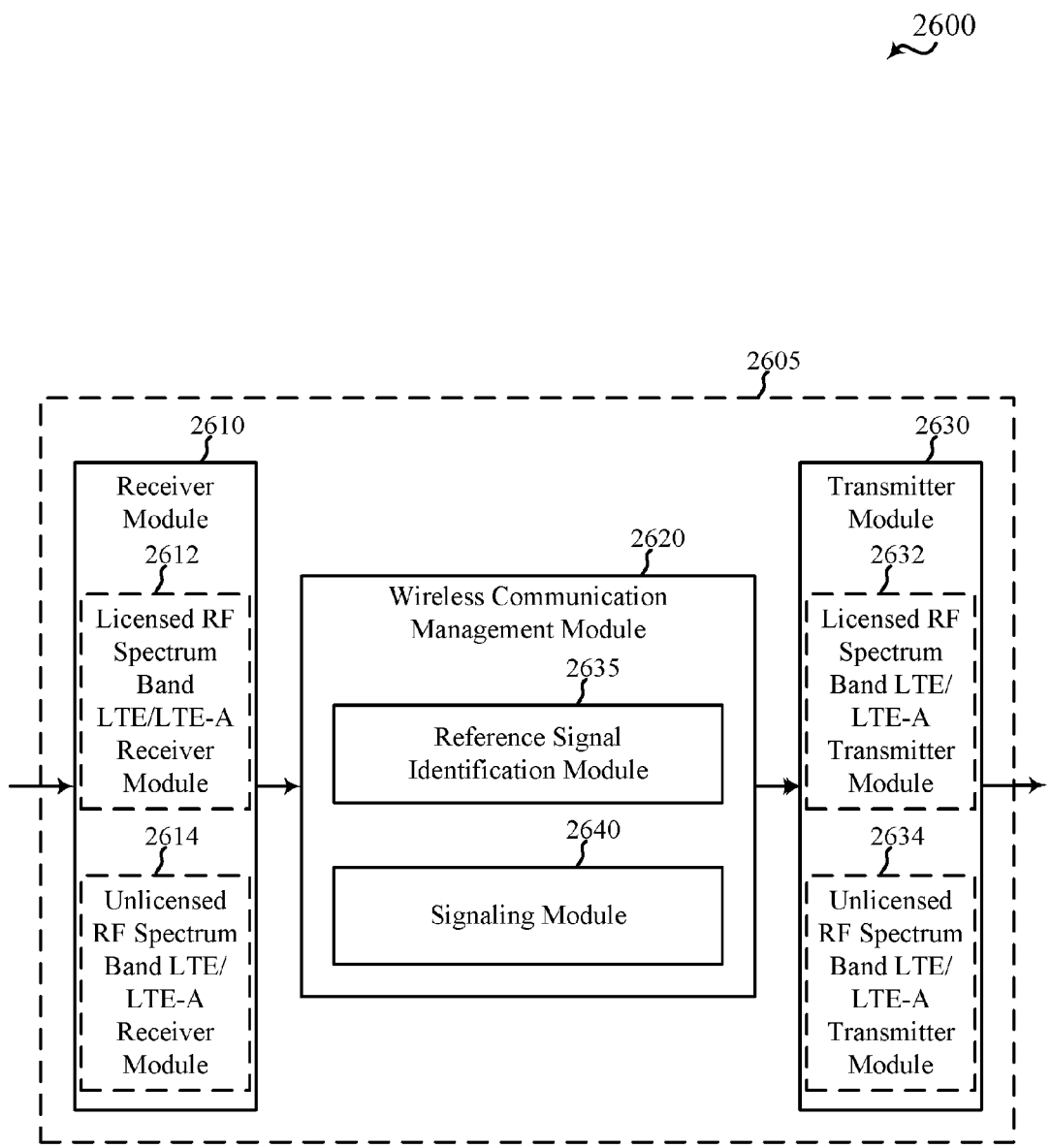
FIG. 26 shows a block diagram of an apparatus for use in wireless communication, in accordance with various aspects of the present disclosure.

FIG. 26 shows a block diagram 2600 of an apparatus 2605 for use in wireless communication, in accordance with various aspects of the present disclosure. In some examples, the apparatus 2605 may be an example of aspects of one or more of the base stations 105, 205, 205-*a*, and/or 1405 described with reference to FIGS. 1, 2, and/or 14, and/or an example of aspects of the apparatus 705 described with reference to FIG. 7. The apparatus 2605 may also be a processor. The apparatus 2605 may include a receiver module 2610, a wireless communication management module 2620, and/or a transmitter module 2630. Each of these components may be in communication with each other.

The components of the apparatus 2605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2610 may be an example of one or more aspects of the receiver module 710 described with reference to FIG. 7. In some examples, the receiver module 2610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 2610 may in some cases include separate receivers for the licensed radio frequency spectrum band and the unlicensed radio frequency spectrum band. The separate receivers may, in some examples, take the form of a licensed RF spectrum band LTE/LTE-A receiver module 2612 for communicating over the licensed radio frequency spectrum band, and an unlicensed RF spectrum band LTE/LTE-A receiver module 2614 for communicating over the unlicensed radio frequency spectrum band. The receiver module 2610, including the licensed RF spectrum band LTE/LTE-A receiver module 2612 and/or the unlicensed RF spectrum band LTE/LTE-A receiver module 2614, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2630 may be an example of one or more aspects of the transmitter module 730 described with reference to FIG. 7. In some examples, the transmitter module 2630 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 2630 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2632 for communicating over the licensed radio frequency spectrum band, and an unlicensed RF spectrum band LTE/LTE-A transmitter module 2634 for communicating over the unlicensed radio frequency spectrum band. The transmitter module 2630, including the licensed RF spectrum band LTE/LTE-A transmitter module 2632 and/or the unlicensed RF spectrum band LTE/LTE-A transmitter module 2634, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2620 may be an example of one or more aspects of the wireless communication management module 720 described with reference to FIG. 7. The wireless communication management module 2620 may include a reference signal identification module 2635, and/or a signaling module 2640. Each of these components may be in communication with each other.

In some examples, the reference signal identification module 2635 may be used to identify at least one reference signal pattern from a plurality of reference signal patterns based at least in part on whether a plurality of transmission time intervals are bundled. In some examples, the plurality of transmission time intervals may include a first transmission time interval and a second transmission time interval. In some examples, the first transmission time interval may be adjacent the second transmission time interval; and in some examples, the first transmission time interval may be bundled with the second transmission time interval.

In some examples, the transmission time intervals may include 0.5 ms, one slot, and/or half-subframe transmission time intervals of the unlicensed radio frequency spectrum band.

In some examples, the signaling module 2640 may be used to signal the identified at least one reference signal pattern to a device (e.g., to a UE). In some examples, the signaling may be provided via a SIB and/or a downlink CET.

In some examples, the plurality of reference signal patterns may include a first reference signal pattern having twelve reference signal tones per resource block of a transmission time interval in an unlicensed radio frequency spectrum band. In some examples, the plurality of reference signal patterns may also or alternately include a second reference signal pattern having eighteen reference signal tones per resource block, wherein the eighteen reference signal tones are distributed over a first transmission time interval and a second transmission time interval, and wherein the first transmission time interval and the second transmission time interval are bundled in an unlicensed radio frequency spectrum band.

In some examples, the wireless communication management module 2620 may transmit at least one reference signal to a device, in the plurality of transmission time intervals, based at least in part on the at least one reference signal pattern determined by the reference signal identification module 2635. When the plurality of transmission time intervals are not bundled, the at least one reference signal transmitted to the device may include a separate reference signal in each of the plurality of transmission time intervals. When the plurality of transmission time intervals are bundled, the at least one reference signal transmitted to the device may include a reference signal distributed over each of the transmission time intervals in the plurality of transmission time intervals.

Figure 27:
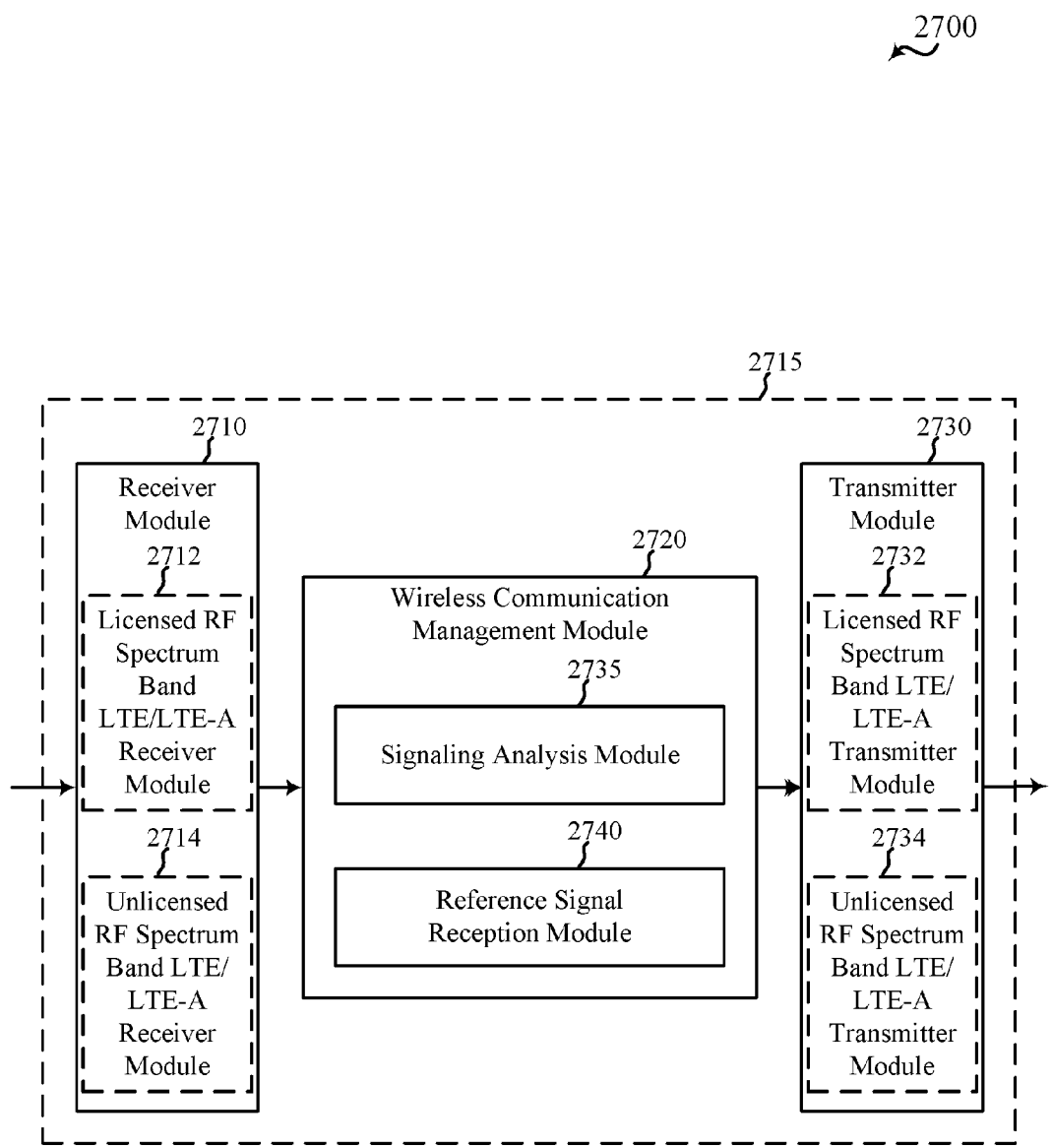
FIG. 27 shows a block diagram of an apparatus for use in wireless communication, in accordance with various aspects of the present disclosure.

FIG. 27 shows a block diagram 2700 of an apparatus 2715 for use in wireless communication, in accordance with various aspects of the present disclosure. In some examples, the apparatus 1315 may be an example of aspects of one or more of the UEs 115, 215,215-*a*, 215-*b*, 215-*c*, and/or 1515 described with reference to FIGS. 1, 2, and/or 15, and/or an example of aspects of the apparatus 705 described with reference to FIG. 7. The apparatus 2715 may also be a processor. The apparatus 2715 may include a receiver module 2710, a wireless communication management module 2720, and/or a transmitter module 2730. Each of these components may be in communication with each other.

The components of the apparatus 2715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2710 may be an example of one or more aspects of the receiver module 710 described with reference to FIG. 7. In some examples, the receiver module 2710 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1 and/or 2. The receiver module 2710 may in some cases include separate receivers for the licensed radio frequency spectrum band and the unlicensed radio frequency spectrum band. The separate receivers may, in some examples, take the form of a licensed RF spectrum band LTE/LTE-A receiver module 2712 for communicating over the licensed radio frequency spectrum band, and an unlicensed RF spectrum band LTE/LTE-A receiver module 2714 for communicating over the unlicensed radio frequency spectrum band. The receiver module 2710, including the licensed RF spectrum band LTE/LTE-A receiver module 2712 and/or the unlicensed RF spectrum band LTE/LTE-A receiver module 2714, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2730 may be an example of one or more aspects of the transmitter module 730 described with reference to FIG. 7. In some examples, the transmitter module 2730 may include at least one RF transmitter, such as at least one RF transmitter operable to transmit over the licensed radio frequency spectrum band and/or the unlicensed radio frequency spectrum band. In some examples, the licensed radio frequency spectrum band and/or the unlicensed radio frequency spectrum band may be used for LTE/LTE-A communications, as described, for example, with reference to FIGS. 1 and/or 2. The transmitter module 2730 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2732 for communicating over the licensed radio frequency spectrum band, and an unlicensed RF spectrum band LTE/LTE-A transmitter module 2734 for communicating over the unlicensed radio frequency spectrum band. The transmitter module 2730, including the licensed RF spectrum band LTE/LTE-A transmitter module 2732 and/or the unlicensed RF spectrum band LTE/LTE-A transmitter module 2734, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2720 may be an example of one or more aspects of the wireless communication management module 720 described with reference to FIG. 7. The wireless communication management module 2720 may include a signaling analysis module 2735, and/or a reference signal reception module 2740. Each of these components may be in communication with each other.

In some examples, the signaling analysis module 2735 may be used to receive signaling indicating whether a plurality of transmission time intervals are bundled. In some examples, the signaling may be received via a SIB and/or a downlink CET.

In some examples, the plurality of transmission time intervals may include a first transmission time interval and a second transmission time interval. In some examples, the first transmission time interval may be adjacent the second transmission time interval; and in some examples, the first transmission time interval may be bundled with the second transmission time interval.

In some examples, the transmission time intervals may include 0.5 ms, one slot, and/or half-subframe transmission time intervals of an unlicensed radio frequency spectrum band.

In some examples, the reference signal reception module 2740 may be used to receive a reference signal distributed over each of the plurality of transmission time intervals (e.g., over a first transmission time interval and a second transmission time interval) when the plurality of transmission time intervals are bundled. In some examples, the reference signal reception module 2740 may be used to receive separate reference signals for each of the plurality of transmission time intervals (e.g., for a first transmission time interval and for a second transmission time interval) when the plurality of transmission time intervals are not bundled.

Figure 28:
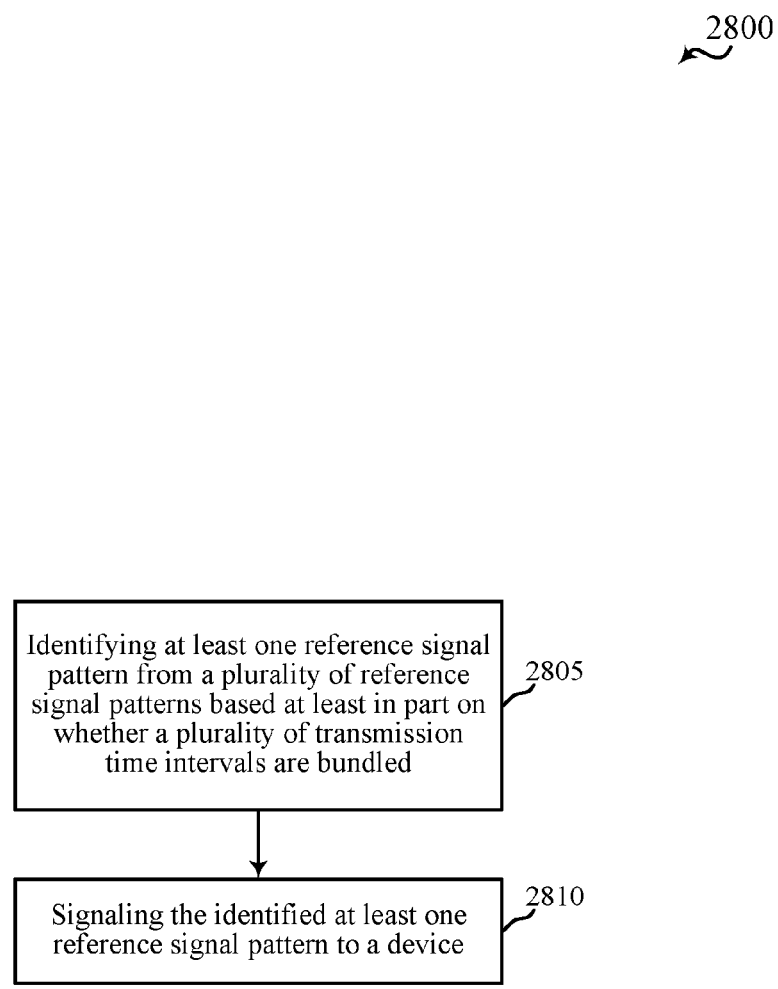
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the base stations 105, 205, 205-a, and/or 1405 described with reference to FIGS. 1, 2, and/or 14, and/or aspects of one or more of the apparatuses 705 and/or 2605 described with reference to FIGS. 7 and/or 26. In some examples, a base station and/or apparatus may execute one or more sets of codes to control the functional elements of the base station and/or apparatus to perform the functions described below.

At block 2805, the method 2800 may include identifying at least one reference signal pattern from a plurality of reference signal patterns based at least in part on whether a plurality of transmission time intervals are bundled. In some examples, the plurality of transmission time intervals may include a first transmission time interval and a second transmission time interval. In some examples, the first transmission time interval may be adjacent the second transmission time interval; and in some examples, the first transmission time interval may be bundled with the second transmission time interval.

In some examples, the transmission time intervals may include 0.5 ms, one slot, and/or half-subframe transmission time intervals of an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use).

The operation(s) at block 2805 may be performed using the wireless communication management module 720, 1460, and/or 2620 described with reference to FIGS. 7, 14, and/or 26, and/or the reference signal identification module 2635 described with reference to FIG. 26.

At block 2810, the method 2800 may include signaling the identified at least one reference signal pattern to a device (e.g., to a UE). In some examples, the signaling may be provided via a SIB and/or a downlink CET. The operation(s) at block 2810 may be performed using the wireless communication management module 720, 1460, and/or 2620 described with reference to FIGS. 7, 14, and/or 26, and/or the signaling module 2640 described with reference to FIG. 26.

In some examples of the method 2800, the plurality of reference signal patterns may include a first reference signal pattern having twelve reference signal tones per resource block of a transmission time interval in an unlicensed radio frequency spectrum band. In some examples of the method 2800, the plurality of reference signal patterns may also or alternately include a second reference signal pattern having eighteen reference signal tones per resource block, wherein the eighteen reference signal tones are distributed over a first transmission time interval and a second transmission time interval, and wherein the first transmission time interval and the second transmission time interval are bundled in an unlicensed radio frequency spectrum band.

In some examples of the method 2800, the method 2800 may include transmitting at least one reference signal to a device, in the plurality of transmission time intervals, based at least in part on the at least one reference signal pattern determined at block 2805. When the plurality of transmission time intervals are not bundled, transmitting at least one reference signal to the device may include transmitting a separate reference signal in each of the plurality of transmission time intervals. When the plurality of transmission time intervals are bundled, transmitting at least one reference signal to the device may include transmitting a reference signal distributed over each of the transmission time intervals in the plurality of transmission time intervals.

Thus, the method 2800 may provide for wireless communication. It should be noted that the method 2800 is just one implementation and that the operations of the method 2800 may be rearranged or otherwise modified such that other implementations are possible.

Figure 29:
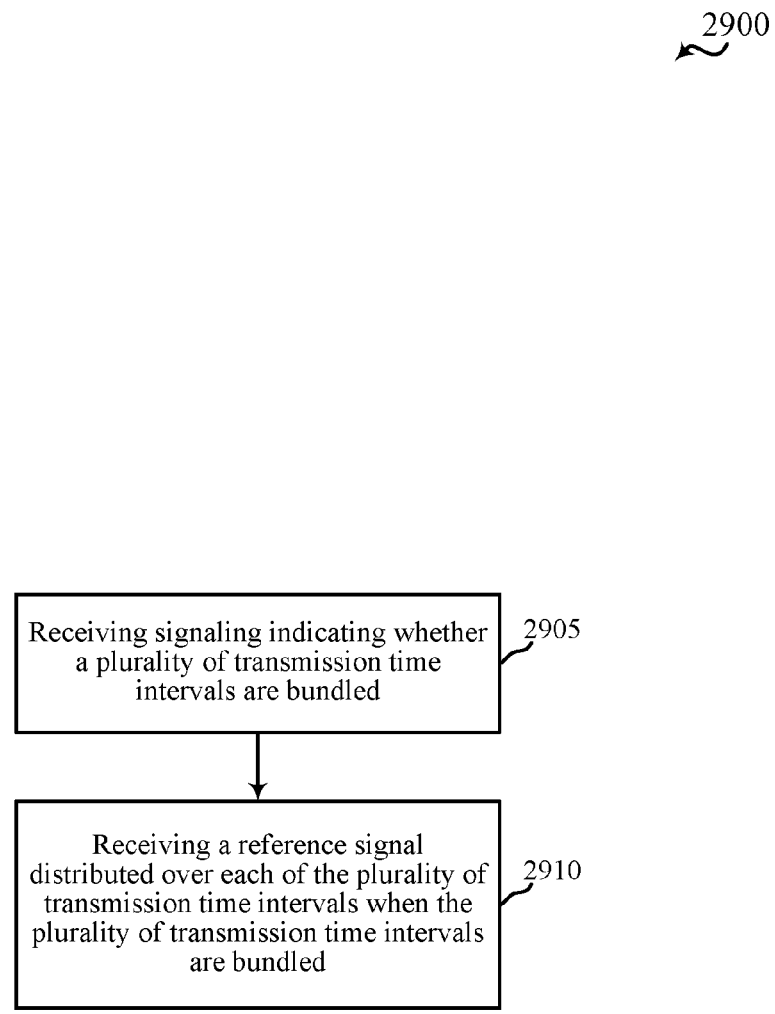
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the UEs 115, 215, 215-*a*, 215-*b*, 215-*c*, and/or 1515 described with reference to FIGS. 1, 2, and/or 15, and/or aspects of one or more of the apparatuses 705 and/or 2715 described with reference to FIGS. 7 and/or 27. In some examples, a UE and/or apparatus may execute one or more sets of codes to control the functional elements of the UE and/or apparatus to perform the functions described below.

At block 2905, the method 2900 may include receiving signaling indicating whether a plurality of transmission time intervals are bundled. In some examples, the signaling may be received via a SIB and/or a downlink CET.

In some examples, the plurality of transmission time intervals may include a first transmission time interval and a second transmission time interval. In some examples, the first transmission time interval may be adjacent the second transmission time interval; and in some examples, the first transmission time interval may be bundled with the second transmission time interval.

In some examples, the transmission time intervals may include 0.5 ms, one slot, and/or half-subframe transmission time intervals of an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use).

The operation(s) at block 2905 may be performed using the wireless communication management module 720, 1560, and/or 2720 described with reference to FIGS. 7, 15, and/or 27, and/or the signaling analysis module 2735 described with reference to FIG. 27.

At block 2910, the method 2900 may include receiving a reference signal distributed over each of the plurality of transmission time intervals (e.g., over a first transmission time interval and a second transmission time interval) when the plurality of transmission time intervals are bundled. The operation(s) at block 2910 may be performed using the wireless communication management module 720, 1560, and/or 2720 described with reference to FIGS. 7, 15, and/or 27, and/or the reference signal reception module 2740 described with reference to FIG. 27.

In some examples of the method 2900, the method 2900 may include receiving separate reference signals for each of the plurality of transmission time intervals (e.g., for a first transmission time interval and for a second transmission time interval) when the plurality of transmission time intervals are not bundled.

Thus, the method 2900 may provide for wireless communication. It should be noted that the method 2900 is just one implementation and that the operations of the method 2900 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication by a wireless communication device, comprising:
monitoring a window of a plurality of frames during a time period of an unlicensed radio frequency spectrum band for transmission of a paging instance to the wireless communication device;
determining the paging instance failed to transmit during a first frame of the window of the unlicensed radio frequency spectrum band due to unavailability of the unlicensed radio frequency spectrum band; and
monitoring a second frame of the window in the time period of the unlicensed radio frequency spectrum band for transmission of the paging instance based at least in part on the determining the paging instance failed to transmit.

2. The method of claim 1, further comprising:
monitoring the window of the plurality of frames for transmission of paging instances of other devices; and
acquiring paging information for the wireless communication device based at least in part on a second paging instance that is not associated with the wireless communication device.

3. The method of claim 2, further comprising:
monitoring a sub-window within the window of the plurality of frames for transmission of the paging instance before monitoring the window of the plurality of frames for transmission of paging instances of other devices.

4. The method of claim 1, further comprising:
determining that the paging instance failed to transmit to the wireless communication device during a first set of scheduled paging instances of the window associated with the wireless communication device;
monitoring a second set of scheduled paging instances of the window associated with a second device based at least in part on determining that the paging instance failed to transmit to the wireless communication device during the first set of scheduled paging instances; and
acquiring paging information for the wireless communication device based at least in part on receiving a second paging instance associated with the second device during the second set of scheduled paging instances.

5. The method of claim 1, wherein the determining comprises:
determining the paging instance failed to transmit during the first frame based at least in part on a blind detection of a channel usage beacon signal (CUBS) for the first frame.

6. The method of claim 5, further comprising:
monitoring each frame in the time period, until determining at least one paging instance has been transmitted.

7. The method of claim 1, further comprising:
monitoring each frame in the window of the plurality of frames, until determining the paging instance has been transmitted.

8. The method of claim 1, further comprising:
monitoring each frame in the window of the plurality of frames, until determining the paging instance will not be transmitted.

9. The method of claim 1, further comprising:
detecting transmission of the paging instance in a clear channel assessment (CCA)-exempt transmission (CET) in the time period.

10. The method of claim 1, further comprising:
detecting transmission of the paging instance in a listen-before-talk (LBT) frame in the time period.

11. The method of claim 1, wherein transmission of the paging instance during the second frame is based at least in part on a change in a pattern of signal transmissions for the time period.

12. An apparatus for wireless communication by a wireless communication device, comprising:
a processor;
memory in electronic communication with the processor; and
instructions stored in the memory and executable by the processor to cause the apparatus to:
monitor a window of a plurality of frames during a time period of an unlicensed radio frequency spectrum band for transmission of a paging instance to the wireless communication device;
determine the paging instance failed to transmit during a first frame of the window of the unlicensed radio frequency spectrum band due to unavailability of the unlicensed radio frequency spectrum band; and
monitor a second frame of the window in the time period of the unlicensed radio frequency spectrum band for transmission of the paging instance based at least in part on the determining the paging instance failed to transmit.

13. The apparatus of claim 12, wherein the instructions are further executable by the processor to cause the apparatus to:
monitor the window of the plurality of frames for transmission of paging instances of other devices; and
acquire paging information for the wireless communication device based at least in part on a second paging instance that is not associated with the wireless communication device.

14. The apparatus of claim 13, wherein the instructions are further executable by the processor to cause the apparatus to:
monitor a sub-window within the window of the plurality of frames for transmission of the paging instance before monitoring the window of the plurality of frames for transmission of paging instances of other devices.

15. The apparatus of claim 12, wherein the instructions are further executable by the processor to cause the apparatus to:

determine that the paging instance failed to transmit to the wireless communication device during a first set of scheduled paging instances of the window associated with the wireless communication device;

monitor a second set of scheduled paging instances of the window associated with a second device based at least in part on determining that the paging instance failed to transmit to the wireless communication device during the first set of scheduled paging instances; and acquire paging information for the wireless communication device based at least in part on receiving a second paging instance associated with the second device during the second set of scheduled paging instances.

\* \* \* \* \*